US012034930B2

(12) United States Patent
Lim et al.

(10) Patent No.: US 12,034,930 B2
(45) Date of Patent: *Jul. 9, 2024

(54) METHOD AND APPARATUS FOR ENCODING/DECODING IMAGE USING QUANTIZATION PARAMETER, AND RECORDING MEDIUM STORING BITSTREAM

(71) Applicants: Electronics and Telecommunications Research Institute, Daejeon (KR); INDUSTRY ACADEMY COOPERATION FOUNDATION OF SEJONG UNIVERSITY, Seoul (KR); INDUSTRY-UNIVERSITY COOPERATION FOUNDATION KOREA AEROSPACE UNIVERSITY, Goyang-si (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR); Yung Lyul Lee, Seoul (KR); Myung Jun Kim, Seoul (KR); Nam Uk Kim, Seoul (KR); Ji Youn Jung, Seoul (KR); Yang Woo Kim, Seoul (KR); Jae Gon Kim, Goyang-si (KR)

(73) Assignees: Electronics and Telecommunications Research Institute, Daejeon (KR); INDUSTRY ACADEMY COOPERATION FOUNDATION OF SEJONG UNIVERSITY, Seoul (KR); INDUSTRY-UNIVERSITY COOPERATION FOUNDATION KOREA AEROSPACE UNIVERSITY, Goyang-si (KR)

( * ) Notice: Subject to any disclaimer, the term of this patent is extended or adjusted under 35 U.S.C. 154(b) by 7 days.

This patent is subject to a terminal disclaimer.

(21) Appl. No.: 17/589,400

(22) Filed: Jan. 31, 2022

(65) Prior Publication Data
US 2022/0150500 A1    May 12, 2022

Related U.S. Application Data

(63) Continuation of application No. 17/256,150, filed as application No. PCT/KR2019/007675 on Jun. 25, 2019, now Pat. No. 11,277,612.

(30) Foreign Application Priority Data

Jun. 25, 2018   (KR) .................... 10-2018-0072999
Nov. 2, 2018    (KR) .................... 10-2018-0133494
(Continued)

(51) Int. Cl.
*H04N 19/124*  (2014.01)
*H04N 19/119*  (2014.01)
*H04N 19/176*  (2014.01)

(52) U.S. Cl.
CPC ......... *H04N 19/124* (2014.11); *H04N 19/119* (2014.11); *H04N 19/176* (2014.11)

(58) Field of Classification Search
CPC .. H04N 19/124; H04N 19/119; H04N 19/176; H04N 19/70; H04N 19/147; H04N 19/51; H04N 19/593
See application file for complete search history.

(56) References Cited

U.S. PATENT DOCUMENTS

2013/0034157 A1* 2/2013 Helle .................. H04N 19/159
375/240.12
2018/0020241 A1   1/2018 Li et al.

FOREIGN PATENT DOCUMENTS

KR        100772576 B1    11/2007
KR       1020170121125 A  11/2017
(Continued)

OTHER PUBLICATIONS

Feng Wu et al., Description of SDR video coding technology proposal by University of Science and Technology of China, Peking University, Harbin Institute of Technology, and Wuhan University (IEEE 1857.10 Study Group), Joint Video Experts Team (JVET) of ITU-T SG 16 WP 3 and ISO/IEC JTC 1/SC 29/WG 11, JVET-J0032-v2, Apr. 10-20, 2018, San Diego, U.S.

*Primary Examiner* — Nam D Pham
(74) *Attorney, Agent, or Firm* — BROADVIEW IP LAW, PC

(57) ABSTRACT

There is provided an image encoding/decoding method and apparatus. The image decoding method comprises decoding size information of a quantization group from a bitstream, acquiring a delta quantization parameter of a current block on the basis of the size information of the quantization (Continued)

group, and deriving a quantization parameter for the current block on the basis of the delta quantization parameter.

3 Claims, 31 Drawing Sheets

(30) Foreign Application Priority Data

Dec. 13, 2018 (KR) .......................... 10-2018-0161324
Mar. 7, 2019 (KR) .......................... 10-2019-0026208

(56) References Cited

FOREIGN PATENT DOCUMENTS

| WO | 0186962 | A1 | 11/2001 |
| WO | 2011129673 | A2 | 10/2011 |
| WO | 2013062194 | A1 | 5/2013 |

* cited by examiner (a)

| | |
|---|---|
| coding_quadtree(x0, y0, log2CbSize, cqtDepth, treeType) { | |
|   cbSubdiv = 2 * cqtDepth | |
|   if(cbSubdiv < cu_qp_delta_subdiv){ | |
|     CuQpDeltaVal = 0 | |
|   } | |
|   if( qt_split_cu_flag[ x0 ][ y0 ] ) { | |
|     coding_quadtree( x0, y0, log2CbSize − 1, cqtDepth + 1, treeType ) | |
|     if( x1 < pic_width_in_luma_samples ) | |
|       coding_quadtree( x1, y0, log2CbSize − 1, cqtDepth + 1, treeType ) | |
|     if( y1 < pic_height_in_luma_samples ) | |
|       coding_quadtree( x0, y1, log2CbSize − 1, cqtDepth + 1, treeType ) | |
|     if( x1 < pic_width_in_luma_samples ) | |
|       coding_quadtree( x1, y1, log2CbSize − 1, cqtDepth + 1, treeType ) | |
|   } else | |
|     multi_type_tree( x0, y0, 1 << log2CbSize, 1 << log2CbSize, cqtDepth, 0, cbSubdiv, 1, 0, treeType ) | |
| } // coding_quadtree() | |

FIG. 32

| multi_type_tree( x0, y0, cbWidth, cbHeight, cqtDepth, mttDepth, cbSubdiv, qgEnable, partIdx, treeType ) { | |
|---|---|
| if( qgEnable && cbSubdiv <= cu_qp_delta_subdiv ){ | |
|     CuQpDeltaVal = 0 | |
| } | |
| if( mtt_split_cu_flag ) { | |
|   if( MttSplitMode[ x0 ][ y0 ][ mttDepth ] == SPLIT_BT_VER ) { // same with SPLIT_BT_HOR | |
|     multi_type_tree( x0, y0, cbWidth / 2, cbHeight, cqtDepth, mttDepth - 1, cbSubdiv + 1, qgEnable, 0, treeType ) | |
|     if( x1 < pic_width_in_luma_samples ) | |
|     multi_type_tree( x1, y0, cbWidth / 2, cbHeight, cqtDepth, mttDepth - 1, cbSubdiv + 1, qgEnable, 1, treeType ) | |
|   } else if( MttSplitMode[ x0 ][ y0 ][ mttDepth ] == SPLIT_TT_VER ) { // same with SPLIT_TT_HOR | |
|     qgEnable = qgEnable && ( cbSubdiv - 2 <= cu_qp_delta_subdiv ) | |
|     multi_type_tree( x0, y0, cbWidth / 4, cbHeight, cqtDepth, mttDepth - 1, cbSubdiv + 2, qgEnable, 0, treeType ) | |
|     multi_type_tree( x1, y0, cbWidth / 2, cbHeight, cqtDepth, mttDepth - 1, cbSubdiv + 2, qgEnable, 1, treeType ) | |
|     multi_type_tree( x0, y2, cbWidth, cbHeight / 4, cqtDepth, mttDepth - 1, cbSubdiv + 2, qgEnable, 2, treeType ) | |
|   } | |
|   coding_unit( x0, y0, cbWidth, cbHeight, treeType ) | |
| } // coding_quadtree() | |

METHOD AND APPARATUS FOR ENCODING/DECODING IMAGE USING QUANTIZATION PARAMETER, AND RECORDING MEDIUM STORING BITSTREAM

CROSS-REFERENCE TO RELATED APPLICATIONS

This application is a continuation application of U.S. patent application Ser. No. 17/256,150, filed on Dec. 24, 2020, which was the National Stage of International Application No. PCT/KR2019/007675 filed on Jun. 25, 2019, which claims priority to Korean Patent Applications: KR10-2018-0072999 filed on Jun. 25, 2018, KR10-2018-0133494 filed on Nov. 2, 2018, KR10-2018-0161324 filed on Dec. 13, 2018, and KR10-2019-0026208 filed on Mar. 7, 2019 with the Korean Intellectual Property Office, which are incorporated herein by reference in their entirety.

TECHNICAL FIELD

The present invention relates to an image encoding/decoding method and apparatus and a recording medium in which a bitstream is stored. More particularly, the present invention relates to an image encoding/decoding method and apparatus using quantization parameters and a recording medium in which a bitstream is stored.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

In conventional technology for video encoding/decoding methods and apparatuses using quantization parameters, only quadtree blocks are considered. Therefore, the conventional technology has difficulty dealing with encoding or decoding delta quantization parameters for blocks having various tree structures.

DISCLOSURE

Technical Problem

An objective of the present invention is to provide an image encoding/decoding method and apparatus using quantization parameters.

Another objective of the present invention is to provide an image encoding/decoding method and apparatus adaptively determining a suitable size of a block for which a delta quantization parameter is to be signaled, for according to a block structure, according to size information of a quantization group encoded/decoded on a high-level, to improve signaling and coding efficiency of quantization parameters.

A further objective of the present invention is to provide an image encoding/decoding method and apparatus that determine a quantization parameter for a current block on the basis of a quantization parameter of a neighboring quantization group, to reduce the number of bits required for encoding/decoding of a delta quantization parameter.

A further objective of the present invention is to provide a recording medium in which a bitstream generated by the image encoding/decoding method or apparatus is stored.

Technical Solution

According to the present invention, there is provided an image decoding method comprising: decoding size information of a quantization group from a bitstream; acquiring a delta quantization parameter of a current block on the basis of the size information of the quantization group; and deriving a quantization parameter for the current block on the basis of the delta quantization parameter.

According to one embodiment, the size information of the quantization group includes one or more pieces of information selected from among depth information, length information, area information, ratio information, shape information, and subdivision information of the quantization group.

According to one embodiment, the quantization group includes a square shape or a non-square shape.

According to one embodiment, the non-square shape is any shape based on a binary tree, a ternary tree, or both.

According to one embodiment, the acquiring of the delta quantization parameter of the current block comprises: determining the size of the quantization group on the basis of the size information of the quantization group; and acquiring the delta quantization parameter of the current block on the basis of the size of the quantization group.

According to one embodiment, the delta quantization parameter of the current block is acquired on the basis of a relationship between a depth of the current block and the depth information of the quantization group.

According to one embodiment, the delta quantization parameter of the current block is acquired on the basis of a size relationship between an area of the current block and the area information of the quantization group.

According to one embodiment, the delta quantization parameter of the current block is acquired on the basis of a relationship between a subdivision value of the current block and the subdivision information of the quantization group.

According to one embodiment, the subdivision value of the current block is a value equal to two plus an original subdivision value before partitioning of the current block when the current block is a block generated through quadtree partitioning.

According to one embodiment, the subdivision value of the current block is a value equal to one plus an original subdivision value before partitioning of the current block when the current block is a block generated through binary tree partitioning.

Also, according to the present invention, there is provided an image encoding method comprising: determining a size of a quantization group; determining a quantization parameter for a current block on the basis of the size of the quantization group; deriving a delta quantization parameter of the current block on the basis of the quantization parameter; and encoding size information of the quantization group.

According to one embodiment, the size information of the quantization group includes one or more pieces of information selected from among depth information, length information, area information, ratio information, shape information, and subdivision information of the quantization group.

According to one embodiment, the quantization group includes a square shape or a non-square shape.

According to one embodiment, the non-square shape is any shape based on a binary tree, a ternary tree, or both.

According to one embodiment, the delta quantization parameter of the current block is acquired on the basis of a relationship between a depth of the current block and the depth information of the quantization group.

According to one embodiment, the delta quantization parameter of the current block is acquired on the basis of a size relationship between an area of the current block and the area information of the quantization group.

According to one embodiment, the delta quantization parameter of the current block is derived on the basis of a relationship between a subdivision value of the current block and the subdivision information of the quantization group.

According to one embodiment, the subdivision value of the current block is a value equal to two plus an original subdivision value of the current block before partitioning when the current block is a block generated through quadtree partitioning.

According to one embodiment, the subdivision value of the current block is a value equal to one plus an original subdivision value before partitioning of the current block when the current block is a block generated through binary tree partitioning.

Also, according to the present invention, there is provided a computer-readable non-transitory recording medium in which image data used in an image decoding method is stored, wherein the image data contains size information of a quantization group, and in the image decoding method, the size information of the quantization group is used to acquire a delta quantization parameter of a current block and is used to derive a quantization parameter of the current block on the basis of the delta quantization parameter.

Advantageous Effects

According to the present invention, it is possible to provide an image encoding/decoding method and apparatus using quantization parameters.

According to the present invention, it is possible to provide an image encoding/decoding method and apparatus adaptively determining a suitable size of a block for which a delta quantization parameter is to be signaled, according to size information of a quantization group encoded/decoded on a high-level.

According to the present invention, it is possible to provide an image encoding/decoding method and apparatus determining a quantization parameter for a current block using a quantization parameter of a neighboring quantization group.

According to the present invention, it is possible to provide a recording medium storing a bitstream generated by the encoding/decoding method or apparatus according to the present invention.

DESCRIPTION OF DRAWINGS

FIGS. 31 and 32 are diagrams illustrating examples of syntax element information required for entropy coding/decoding of delta quantization parameters according to one embodiment of the present invention.

BEST MODE

Figure 1:
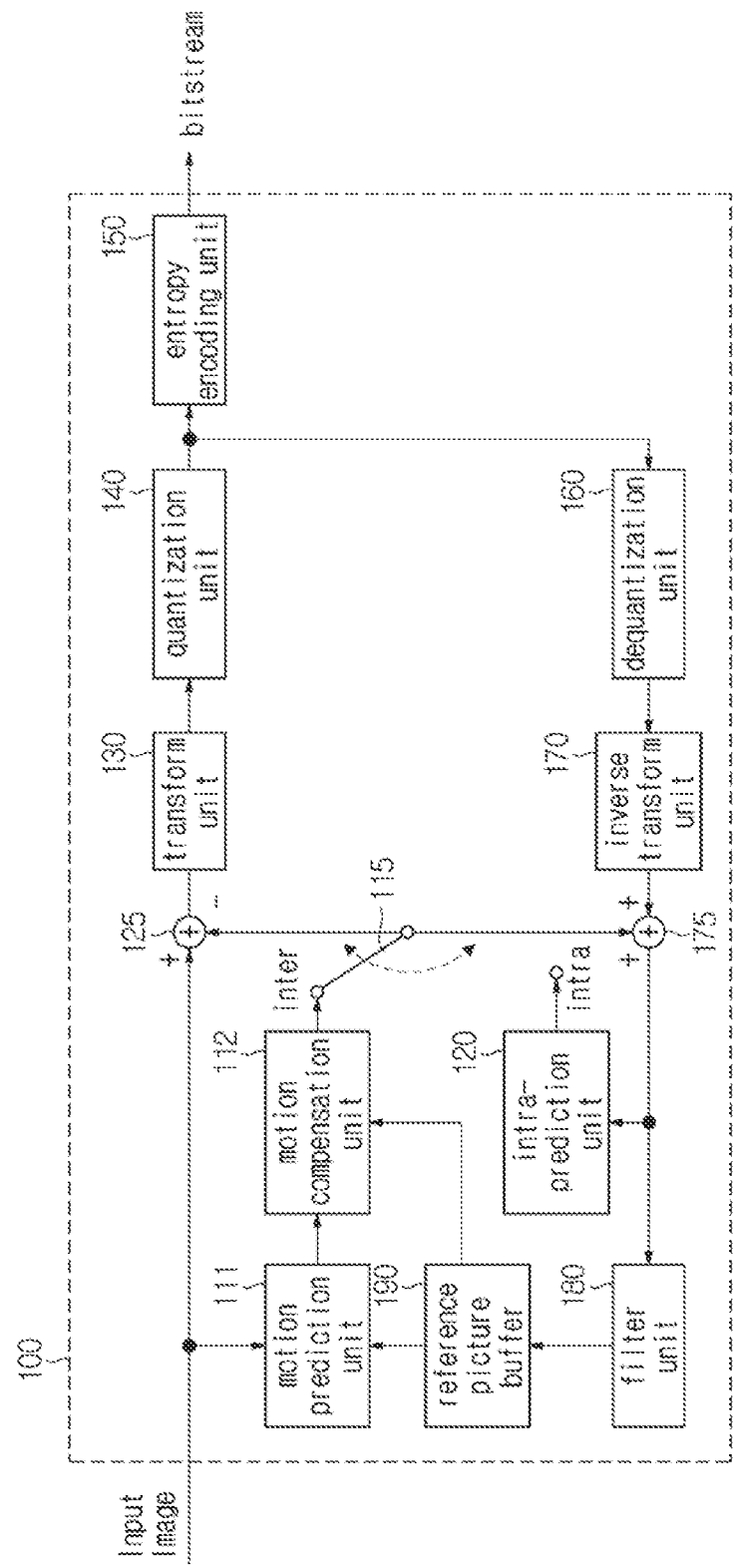
FIG. 1 is a block diagram illustrating the configuration of one embodiment of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

DESCRIPTION OF TERMS

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
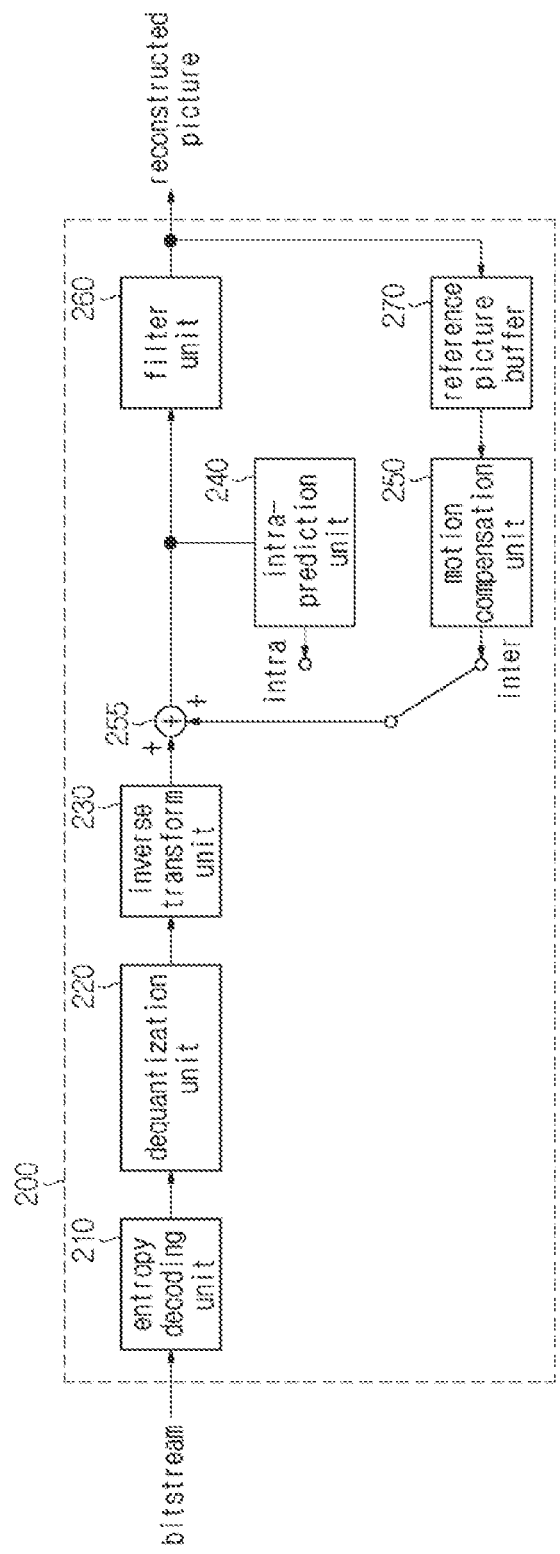
FIG. 2 is a block diagram illustrating the configuration of one embodiment of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
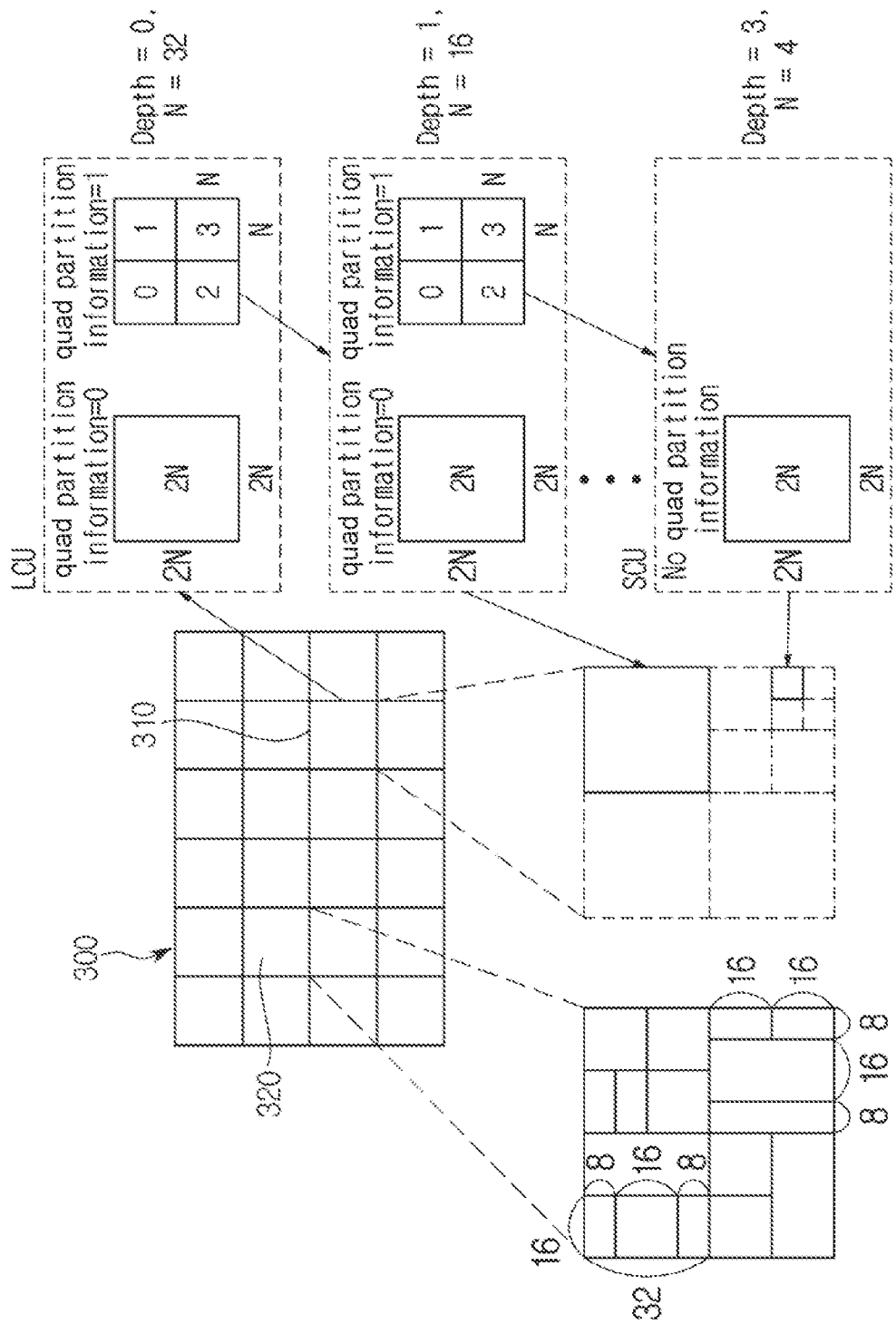
FIG. 3 is a schematic view illustrating a picture partition structure used when encoding decoding an image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding unit corresponding to a node of a multi-type tree, the partition tree information may be signaled. Otherwise, the partition tree information may not be signaled but be deduced from a value indicating a possible partitioning tree structure.

Figure 4:
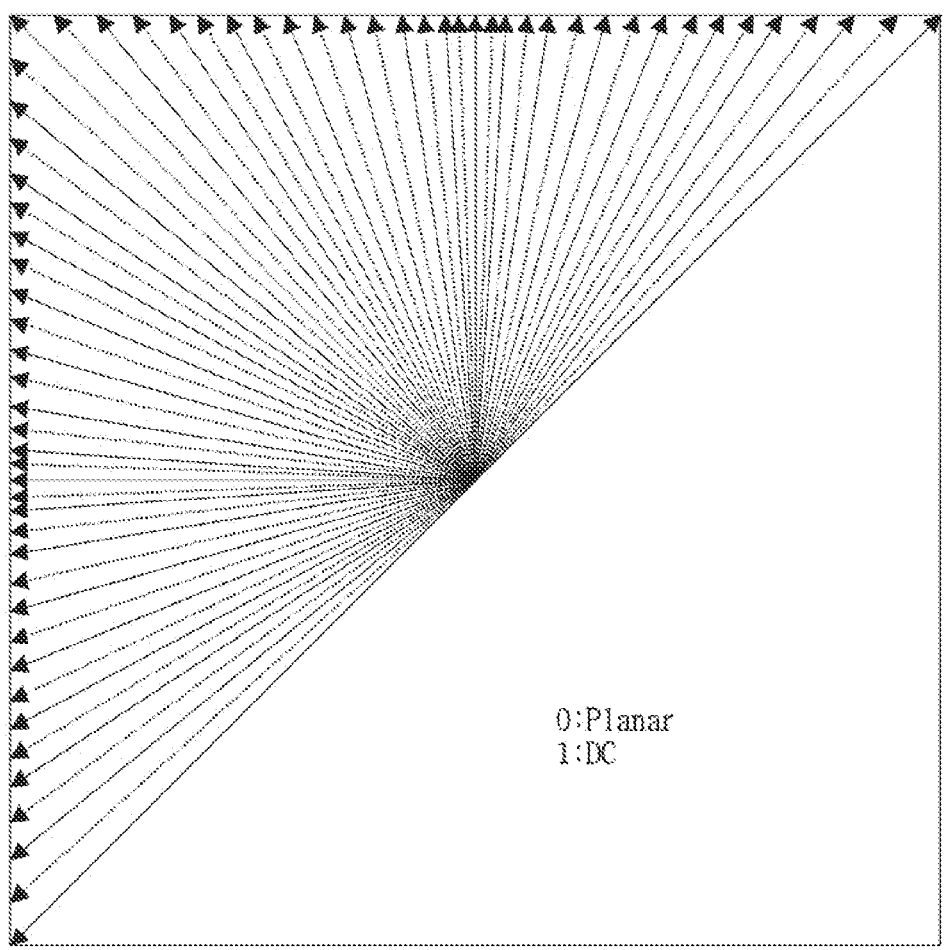
FIG. 4 is a diagram illustrating one embodiment of an intra prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
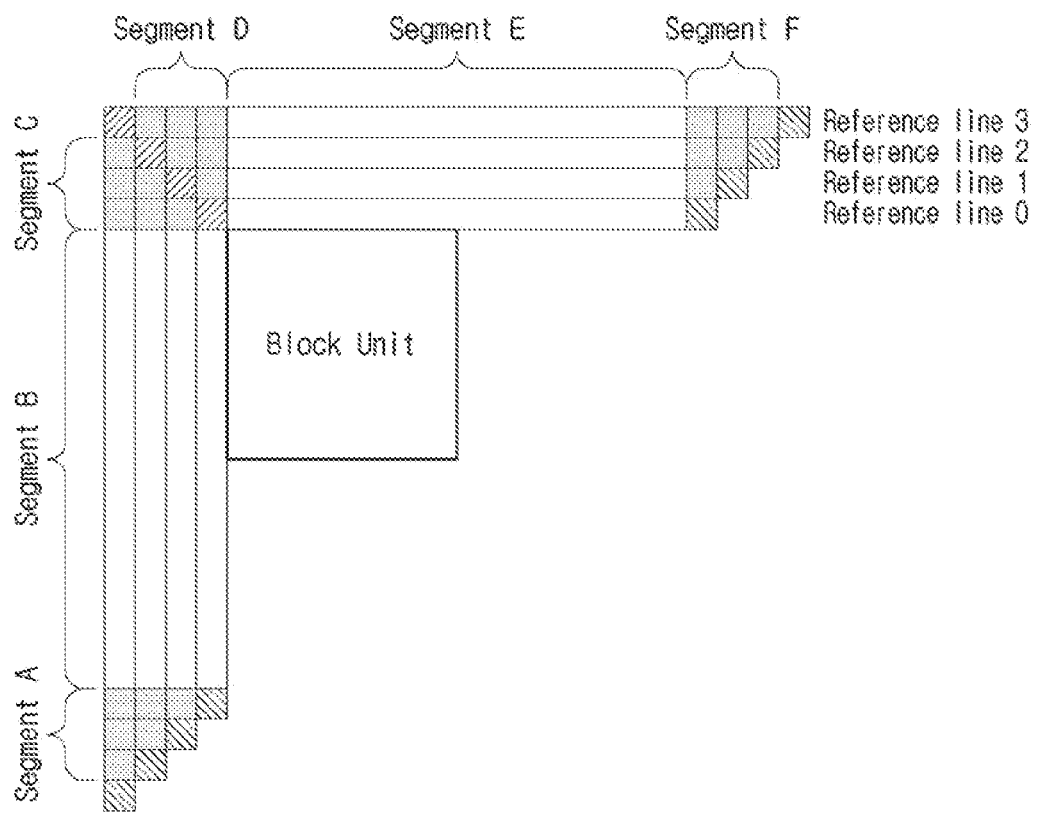
FIG. 7 is a diagram used to describe an available reference sample for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
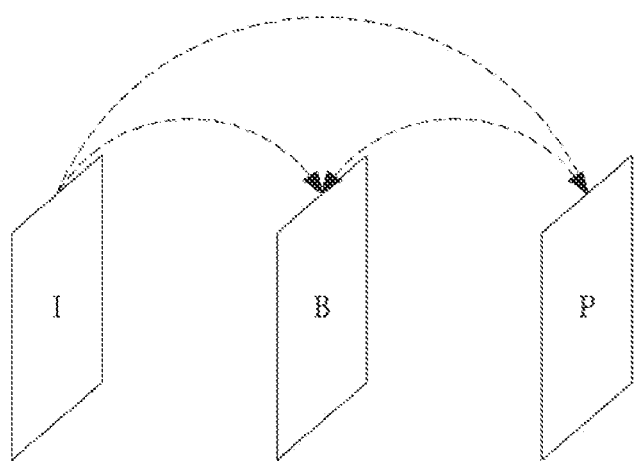
FIG. 5 is a diagram illustrating one embodiment of an inter prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current block may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information existing in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
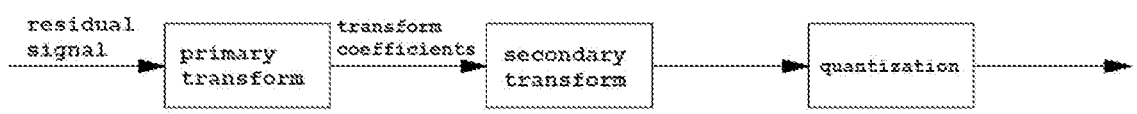
FIG. 6 is a diagram used to describe a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loeve transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Figure 8:
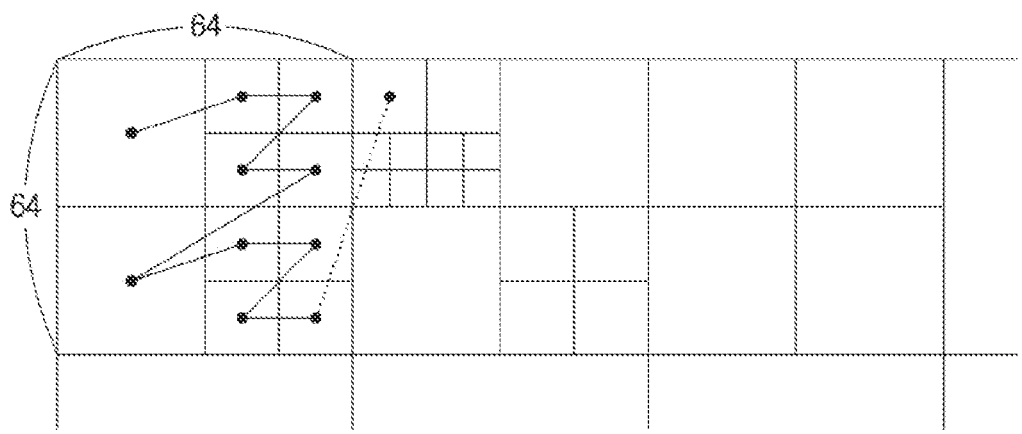
FIG. 8 is a diagram illustrating an image encoding/decoding process performed on a CTU basis, according to one embodiment of the present invention.

FIG. 8 is a diagram illustrating an image encoding/decoding process performed on a CTU basis, according to one embodiment of the present invention.

An image encoding/decoding apparatus divides an input picture into coding tree units (CTUs) and performs encoding/decoding on a CTU basis. Referring to FIG. 8, a 64×64-size CTU may be divided into quadtree (QT) coding units (CUs) and encoding/decoding may be performed on a CU basis. For example, the CUs are encoded/decoded in order indicated by a solid line, starting with the top left CU. The encoding/decoding order illustrated in FIG. 8 is referred to as Z-scan order. In FIG. 8, a dotted line indicates the progress of encoding/decoding from the current CTU to the next CTU. That is, when the encoding/decoding of the current CTU is completed, the next CTU is encoded/decoded.

The largest size of CTUs and the smallest size of CUs vary depending on a value signaled in a high-level syntax such as a sequence parameter set (SPS), an adaptation parameter set (APS), a picture parameter set (PPS), a subpicture header, a tile header, a tile group header, or a sequence parameter set. A residual signal, which is the difference between an input picture (input signal) and a predicted signal, undergoes transform, quantization, and entropy coding in this order, and the resulting signal is transmitted to the image decoding apparatus.

Here, the term "adaption parameter set" refers to a parameter set referred to by several pictures, several subpictures, several tile groups, several tiles, several slices, several CTU lines, several CTUs, and the like.

The term APS also refers to a parameter set referred to and shared by different pictures, subpictures, slices, tile groups, tiles, or CTU lines. Further, subpictures, slices, tile groups, tiles, or CTU lines in a picture may refer to different adaption parameter sets to use information in the different adaption parameter sets.

As to the adaptation parameter sets, subpictures, slices, tile groups, tiles, or CTU lines in a picture may refer to different adaptation parameter sets using adaptation parameter set identifiers.

As to the adaptation parameter sets, slices, tile groups, tiles, or CTU lines in a subpicture may refer to different adaptation parameter sets using adaptation parameter set identifiers.

As to the adaptation parameter sets, tiles or CTU lines in a slice may refer to different adaptation parameter sets using adaptation parameter set identifiers.

As to the adaptation parameter sets, CTU lines in a tile may refer to different adaptation parameter sets using adaptation parameter set identifiers.

The parameter set or header of a subpicture contains information of an adaption parameter set identifier so that an adaption parameter set corresponding to the adaption parameter set identifier can be used for processing of the subpicture.

The parameter set or header of a tile contains an adaption parameter set identifier so that an adaption parameter set corresponding to the adaption parameter set identifier can be used for processing of the tile.

The header of a CTU line includes an adaption parameter set identifier so that an adaption parameter set corresponding to the adaption parameter set identifier can be used for processing of the CTU line.

A picture may be divided into one or more tile rows and one or more tile columns.

A subpicture in a picture may be divided into one or more tile rows and one or more tile columns. A subpicture is a rectangular or square region in a picture and includes one or more CTUs. A subpicture may one or more tiles, CTU lines, and/or slices.

A tile is a rectangular or square region in a picture and includes one or more CTUs. A tile may be divided into one or more CTU lines.

A CTU line may mean one or more CTU rows in a tile. A tile may be divided into one or more CTU lines, and each CTU line may include one or more CTU rows. A tile that is not divided into two or more CTU lines is also referred to as a CTU line. A CTU line may include one or more CTU rows.

A slice in a picture may include one or more tiles. A slice in a tile may include one or more CTU lines.

In a quantization process, quantization is performed on transform coefficients, in which quantized transform coefficients (levels) are determined by a quantization parameter (QP). Here, the term "quantization parameter" means a quantized parameter.

To use quantization parameters on a block basis, a delta quantization parameter enablement flag cu_qp_delta_enabled_flag is signaled in a high-level syntax element.

When the flag has a first value of 1, quantization group size information diff_cu_qp_delta_depth may be signaled. Here, the quantization group size information diff_cu_qp_delta_depth means depth information of a quantization group. Alternatively, the first value may be 0 or an integer. For example, the first value may be 1.

According to one embodiment of the present invention, it is possible to determine the size of a quantization group (QG) on the basis of size information of a quantization group. A delta quantization parameter may be signaled for each quantization group size.

Table 1 shows quantization group sizes determined on the basis of the size of a CTU and size information of a quantization group.

TABLE 1

| diff_cu-delta_depth | size of quantization group according to size of 64×64 CTU | size of quantization group according to size of 32×32 CTU | size of quantization group according to size of 16×16 CTU |
|---|---|---|---|
| 0 | 64×64 | 32×32 | 16×16 |
| 1 | 32×32 | 16×16 | 8×8 |
| 2 | 16×16 | 8×8 | — |
| 3 | 8×8 | — | — |

The delta quantization parameters may be signaled as a syntax elements cu_qb_delta_abs specifying the absolute value of the delta quantization parameter and/or a syntax element cu_gb_delta_sign_flag specifying the sign of the delta quantization parameter. At least one of the syntax elements of the delta quantization parameter may be signaled on a basis of quantization group defined as diff_cu_gb_ delta_depth which is size information of a quantization group.

According to one embodiment, when a size of a block is equal to or larger than a size of a quantization group, at least one delta quantization parameter may be signaled for the block. One or more blocks among the blocks disposed inside a quantization group may share the same delta quantization parameter. A predicted quantization parameter for one or more blocks among blocks disposed inside a quantization group may be derived from one or more quantization parameters of respective neighboring quantization groups. When at least one of the neighboring quantization groups is not available, the immediately previous quantization in encoding/decoding order, or the quantization parameter signaled in a syntax element of a higher level such as a picture, subpicture, slice, tile group, tile, CTU column, CTU row, or CTU line is used instead of the quantization parameter of the non-existing quantization group. In addition, one or more blocks among the blocks disposed inside the quantization group may share a predicted quantization parameter which is equal to the predicted quantization parameter. A quantization parameter is obtained by adding the delta quantization parameter and the predicted quantization parameter. Accordingly, one or more blocks among the blocks disposed inside the quantization group may share the same quantization parameter.

According to one embodiment of the present invention, when the size of a block is smaller than the size of a quantization group, a delta quantization parameter may be signaled from the first block within the quantization group, the first block having a coding block flag coded_block_flag that is not a first value. Here, the first value may be 0.

For example, when the coding block flag of a block is not a second value, a delta quantization parameter may not be signaled. Here, the second value may be 1.

Specifically, for example, in a case where a CTU size is 64×64, where quantization group size information is diff_cu_qp_delta_depth=1, and there are four 16×16 blocks in one 32×32 quantization group, a quantization parameter is signaled only from the first block in the quantization group, and at least one of the other blocks in the quantization group shares a delta quantization parameter signaled from the first block. Here, the first block may mean the first block among blocks of which the coding block flag is not the first value. Here, the first value may be 0.

For another specific example, in a case where a CTU size is 64×64, where quantization group size information is diff_cu_qp_delta_depth=1, and there are four 16×16 blocks in one 32×32 quantization group, a quantization parameter is signaled only from the n-th block in the quantization group, and at least one of the other blocks in the quantization group shares a delta quantization parameter signaled from the n-th block. Here, the n-th block may mean the n-th block of which the coding block flag is not a first value. Here, the first value may be 0. Here, the n is an integer greater than 1.

The coding block flag may mean a coding block flag for at least one of a luma signal (Y) and chroma signals Cb and Cr.

Figure 9A:
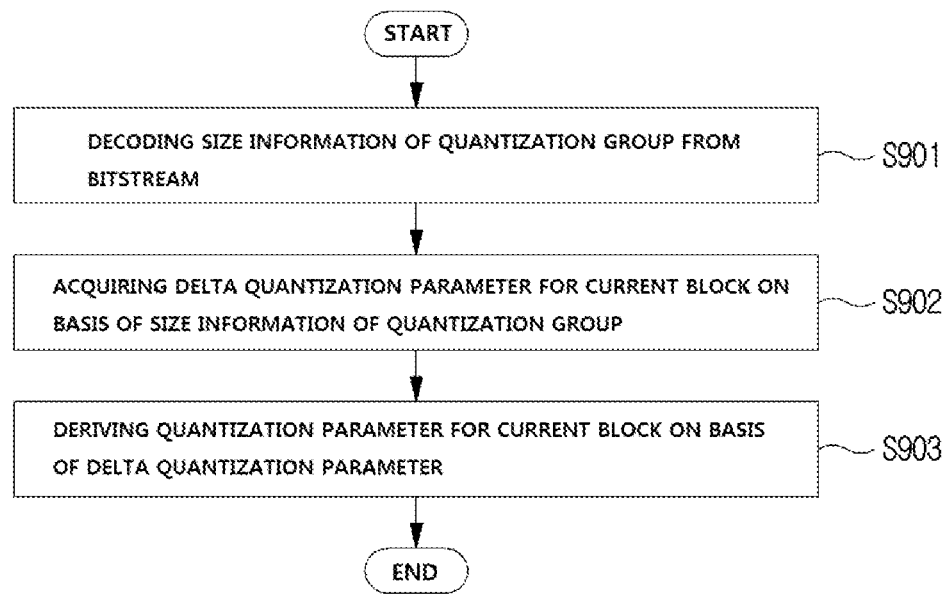
FIG. 9A is a flowchart illustrating an image decoding method according to one embodiment of the present invention.

FIG. 9A is a flowchart illustrating an image decoding method according to one embodiment of the present invention.

Referring to FIG. 9A, an image decoding apparatus decodes size information of a quantization group from a bitstream (S901).

Here, the size information of a quantization group includes at least one of depth information of the quantization group, length information of the quantization group, area information of the quantization group, ratio information of the quantization group, type information of the quantization group, subdivision information of the quantization group.

The quantization group may include a square quantization group or a non-square quantization group.

The non-square quantization group may have a shape based on at least one of a quadtree structure and a ternary tree structure.

The image decoding apparatus may acquire a delta quantization parameter of a current block from size information of the quantization group (S902).

For example, the size of the quantization group may be determined on the basis of the size information of the quantization group, and the delta quantization parameter of the current block may be obtained on the basis of the size of the quantization group. In this case, the delta quantization parameter of the current block may be decoded, on the basis of the size of the quantization group.

The image decoding apparatus may derive a quantization parameter of the current block from the size information of the quantization group (S903).

For example, the delta quantization parameter of the current block may be acquired on the basis of a relationship between the depth of the current block and the depth information of the quantization group.

For example, the delta quantization parameter of the current block may be acquired on the basis of a size relationship of the quantization group which is set between the area of the current block and the area information of the quantization group.

For example, the delta quantization parameter of the current block is acquired on the basis of a relationship between the subdivision value of the current block and the subdivision information of the quantization group.

Here, the subdivision value of the current block is equal to two plus a pre-subdivision value when the current block is quadtree-partitioned.

The subdivision value of the current block is equal to one plus a pre-subdivision value when the current block is a binary tree-partitioned.

The delta quantization parameter and the predicted quantization parameter may be added to derive a quantization parameter of the current block.

Figure 9B:
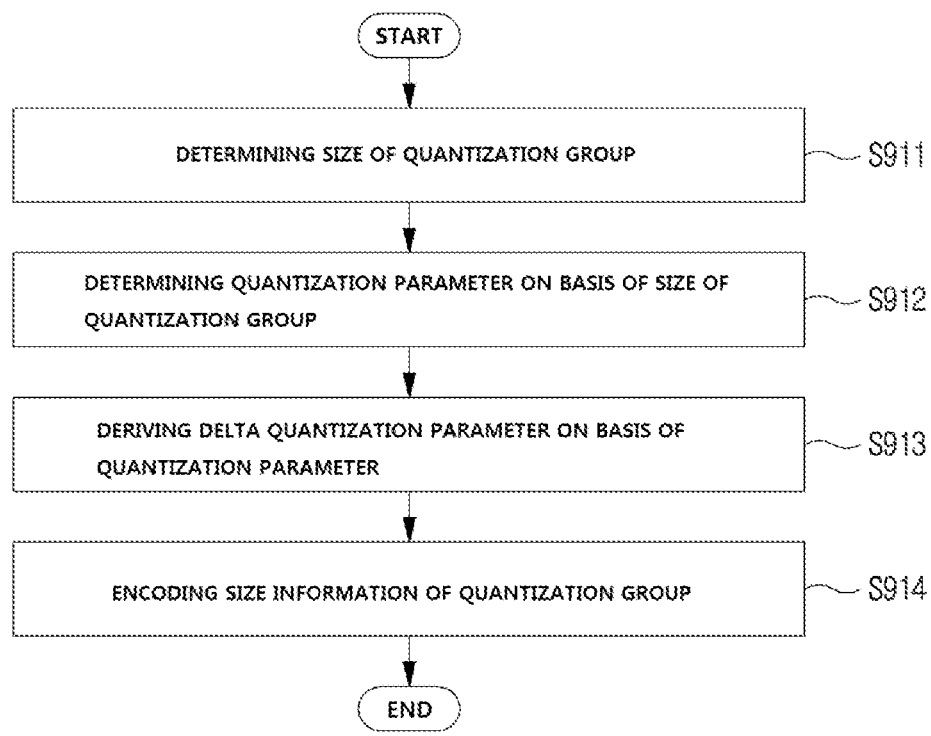
FIG. 9B is a flowchart illustrating an image encoding method according to one embodiment of the present invention.

FIG. 9B is a flowchart illustrating an image encoding method according to one embodiment of the present invention.

Referring to FIG. 9B, the image encoding apparatus determines a size of a quantization group (S911).

Here, the size information of a quantization group includes at least one of depth information of the quantization group, length information of the quantization group, area information of the quantization group, ratio information of the quantization group, type information of the quantization group, subdivision information of the quantization group.

The quantization group may include a square quantization group or a non-square quantization group.

The non-square quantization group may have a shape based on at least one of a binary tree structure and a ternary tree structure.

The image encoding apparatus may determine a quantization parameter of a current block on the basis of the size the quantization group (S912).

The image encoding apparatus may derive a delta quantization parameter of the current block from the quantization parameter (S913).

For example, the delta quantization parameter of the current block may be derived on the basis of the relationship between the depth of the current block and the depth information of the quantization group.

For example, the delta quantization parameter of the current block may be derived on the basis of a size relationship of the quantization group which is set between the area of the current block and the area information of the quantization group.

For example, the delta quantization parameter of the current block may be derived on the basis of a relationship between the subdivision value of the current block and the subdivision information of the quantization group.

Here, the subdivision value of the current block is equal to two plus a pre-subdivision value when the current block is quadtree-partitioned.

The subdivision value of the current block is equal to one plus a pre-subdivision value when the current block is a binary tree-partitioned.

The delta quantization parameter may be derived by subtracting the predicted quantization parameter from the quantization parameter of the current block.

The image encoding apparatus may encode the size information of the quantization group (S914). The delta quantization parameter of the current block may be coded, on the basis of the size information of the quantization group.

According to one embodiment of the present invention, an image encoding/decoding method and apparatus performs the steps of determining a size of a quantization group, determining a quantization parameter, and/or encoding/decoding size information of the quantization group and/or delta quantization parameter information. The encoding/decoding may mean entropy coding/decoding.

Hereinbelow, the step of determining the size of a quantization group will be described.

An encoder/decoder may determine the size of a quantization group.

For example, the encoder determines the size of a quantization group to be used at the time of encoding/decoding by using the size set by the user or the size determined by a predetermined rule.

Alternatively, the decoder may determine the size of a quantization group on the basis of at least one of various sizes indicated by quantization group size information obtained by entropy-decoding a bitstream.

Further alternatively, the decoder may determine the size of a quantization group according to a predetermined rule.

Yet further alternatively, the encoder/decoder may determine the size of a quantization group on the basis of a previously set size.

Here, the term "quantization group" means a region in which one or more processing units share the same quantization parameter. The quantization group may include at least one CU, PU, TU, and/or block. Accordingly, the CU(s), PU(s), TU(s), and/or block(s) within the quantization group uses the same quantization parameter. The block may be a predefined block.

The size of a quantization group (hereinafter, "size of a quantization group" will be referred to as quantization group size for convenience of a description) may be determined according to at least one selected from among the depth, length, area, ratio, shape, and subdivision.

The size information of a quantization group may refer to at least one among depth information, length information, area information, ratio information, shape information, and subdivision information of a quantization group. A quantization group may have a square shape or a non-square shape such as a rectangular shape and a triangular shape.

Examples of the non-square shape include a binary tree, a ternary tree, and at least one block generated through binary tree or ternary tree partitioning.

The size information of a quantization group may refer to any combination of the depth information, the length information, the area information, the ratio information, the shape information, and the subdivision information of the quantization group.

The multi-type tree may refer to a binary tree, a ternary tree, or both.

A block depth (i.e., the depth of a block) may mean at least one of the depth of a quadtree, the depth of a binary tree, and the depth of a ternary tree, or the sum of the depths of two or more trees of those trees.

The depth of a multi-type tree may mean at least one of the depth of a binary tree and the depth of a ternary tree, or the sum of the depths of two or more trees. The depth of a multi-type tree may mean the depth of a binary tree. The depth of a multi-type tree may mean the depth of a ternary tree.

For example, when a block can have a square shape and a non-square shape, the depth of the block may mean at least one of the depth of a quadtree and the depth of a multi-type tree, or the sum of the depths of two or more trees. That is, the depth of a block may mean at least one of the depth of a quadtree, the depth of a binary tree, and the depth of a ternary tree, or the sum of the depths of two or more threes thereamong.

On the other hand, when a block can have only a square shape, the depth of the block means only the depth of a quadtree.

On the other hand, when a block can have only a non-square shape, the depth of the block means only the depth of a multi-type tree. That is, the depth of a block may mean at least one of the depth of a binary tree and the depth of a ternary tree, or may mean the sum of the depths of two or more trees thereamong.

Hereinbelow, the step of determining a quantization parameter will be described.

At the encoder/decoder, the quantization parameter may be determined.

For example, at the encoder, the quantization parameter may be set by the user or may be determined according to a predetermined rule.

For example, at the decoder, the quantization parameter may be obtained by adding a predicted quantization parameter that is derived through prediction on the basis of a neighboring quantization group of a current quantization group and a delta quantization parameter. The delta quantization parameter may mean information of a delta quantization parameter obtained through decoding of a bitstream.

When at least one of the neighboring quantization groups of the current quantization group is not available, the quantization parameter of the quantization group corresponding to the previous position in the encoding/decoding may be used as the predicted quantization parameter of the current quantization group instead of the quantization parameter of the neighboring quantization group corresponding to the unavailable position.

When at least one of the neighboring quantization groups of the current quantization group is not available, the quantization parameter of the quantization group corresponding to the previous position in the decoding/decoding may be used as the quantization parameter that is used for calculation of the predicted quantization parameter of the current quantization group instead of the quantization parameter of the neighboring quantization group corresponding to the unavailable position.

When at least one of the neighboring quantization groups of the current quantization group does not exist, the quantization parameter of the quantization group corresponding to the previous position in decoding/decoding order may be used as a quantization parameter to be used for calculation of the predicted quantization parameter of the current quantization group instead of the quantization parameter of the absent neighboring quantization group. At this time, when a certain neighboring quantization group exists, the quantization parameter transmitted in a high-level syntax element may be used as a predicted quantization parameter. The high-level syntax element may be at least one of a picture, a subpicture, a slice, a tile, a tile group, a tile, a CTU line, a CTU row, a CTU column, and a CTU.

Here, the expression that a neighboring quantization group does not exist means that the current quantization group is positioned at a boundary of at least one of a picture, a subpicture, a slice, a tile, a tile group, a CTU line, a CTU row, a CTU column, and a CTU.

Here, the expression that a neighboring quantization group does not exist means that the neighboring quantization group is positioned outside the boundary of at least one of a picture, a subpicture, a slice, a tile, a tile group, a CTU line, a CTU row, a CTU column, and a CTU.

Here, the expression that a neighboring quantization group does not exist means that the neighboring quantization group and the current quantization group differ in terms of at least one of a picture, a subpicture, a slice, a tile, a tile group, a tile, a CTU line, a CTU row, a CTU column, and a CTU.

For example, when the current quantization group is the first quantization group in at least one of a picture, a subpicture, a slice, a tile, a tile group, a tile, a CTU line, a CTU row, a CTU column, and a CTU, at least one of a picture-based quantization parameter, a subpicture-based quantization parameter, a slice-based quantization parameter, a tile group-based quantization parameter, a tile-based quantization parameter, and a CTU line-based quantization parameter may be used as the predicted quantization parameter.

For example, when the current quantization group is the last quantization group in at least one of a picture, a subpicture, a slice, a tile, a tile group, a tile, a CTU line, a CTU row, a CTU column, and a CTU, at least one of a picture-based quantization parameter, a subpicture-based quantization parameter, a slice-based quantization parameter, a tile group-based quantization parameter, a tile-based quantization parameter, and a CTU line-based quantization parameter may be used as the predicted quantization parameter.

For example, when the current quantization group is the first quantization group in at least one of a picture, a subpicture, a slice, a tile, a tile group, a tile, a CTU line, a CTU row, a CTU column, and a CTU, at least one of a picture-based quantization parameter, a subpicture-based quantization parameter, a slice-based quantization parameter, a tile group-based quantization parameter, a tile-based quantization parameter, and a CTU line-based quantization parameter may be used as a quantization parameter used for calculation of the predicted quantization parameter.

For example, when the current quantization group is the first quantization group in the first CTU row, at least one of a quantization parameter of a picture, a quantization parameter of a subpicture, a quantization parameter of a slice, a quantization parameter of a tile group, a quantization parameter of a tile, and a quantization parameter of a CTU line may be used as a quantization parameter used for calculation of the predicted quantization parameter.

Alternatively, when the current quantization group is the first quantization group in a CTU line, at least one of a quantization parameter of a picture, a quantization parameter of a subpicture, a quantization parameter of a slice, a quantization parameter of a tile group, a quantization parameter of a tile, and a quantization parameter of a CTU line may be used as a quantization parameter used for calculation of the predicted quantization parameter.

For example, when the current quantization group is the last quantization group in at least one of a picture, a subpicture, a slice, a tile, a tile group, a tile, a CTU line, a CTU row, a CTU column, and a CTU, at least one of a quantization parameter of a picture, a quantization parameter of a subpicture, a quantization parameter of a slice, a quantization parameter of a tile group, a quantization parameter of a tile, and a quantization parameter of a CTU line may be used as a quantization parameter used for calculation of the predicted quantization parameter.

Here, the term "quantization group" means a block or a region.

At the decoder, the quantization parameter may be determined by a predetermined rule.

According to one embodiment, for a current quantization group or at least one block in a quantization group, at least one of the quantization parameter of a neighboring quantization group of the current quantization group, the quantization parameter of the previous quantization group in encoding/decoding order, and the quantization parameters signaled on a picture level, a subpicture level, a slice level, a tile group level, a tile level, a CTU line level, a CTU row level, a CTU column level, and a CTU level may be used to derive the predicted quantization parameter.

For example, the predicted quantization parameter of the current quantization group may be derived from at least one of the quantization parameters of the respective neighboring quantization groups of the current quantization group. The process of deriving a predicted quantization parameter for a current quantization group will be described with reference to FIGS. 10 through 13.

Figure 10:
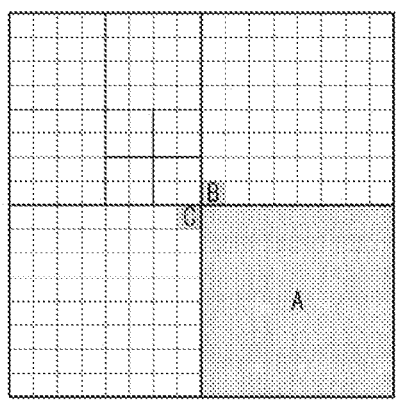
FIG. 10 is a diagram illustrating a process of deriving predicted quantization parameters of a current quantization group, according to one embodiment of the present invention.
Figure 10:
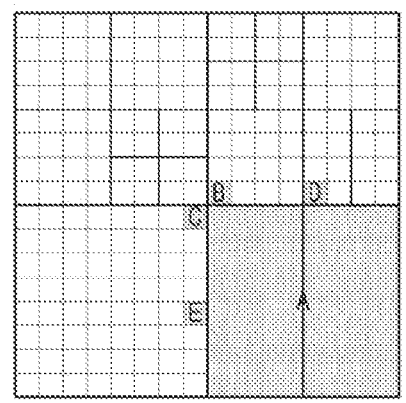
Figure 10:
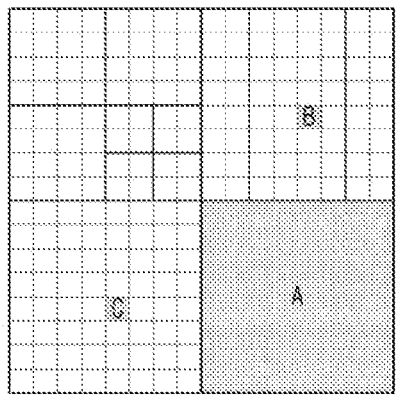
Figure 10:
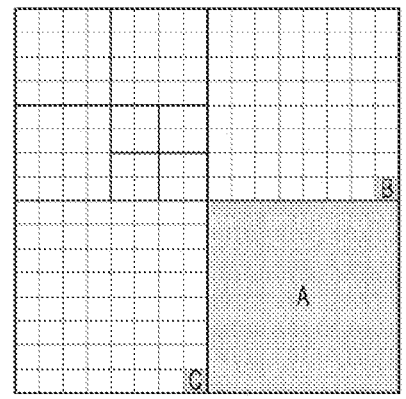

FIG. 10 is a diagram illustrating the process of deriving a predicted quantization parameter for a current quantization group, according to one embodiment of the present invention.

In FIG. 10, the unit size of a quantization group is demarcated by a thick solid line. Sub-blocks resulting from division of a block are demarcated by a thin solid line. A relatively bright solid line demarcates the minimum size of a block that is encoded/decoded. Here, the minimum block size may be set to M×N where M or N is an integer. For example, the minimum block size for a luma component may be 4×4 and the minimum block size for a chroma component may be 2×2. The top left position in a quantization group A may be expressed as (x, y). In addition, curQGwidth and curQGheight represents the horizontal size (width) and the vertical size (height) of the current quantization group.

In (a) of FIG. 10, A represents a current quantization group. Each of B and C represents the position of a block or sample from which a predicted quantization parameter is derived or the position of a neighboring quantization group disposed around the current quantization group. The predicted quantization parameter of the current quantization group may be derived by using the quantization parameter of the quantization group corresponding to at least one of the positions B and C.

For example, the position B may be expressed as (x, y−(1<<minBlklog2size)). The position C may be expressed as (x−(1<<minBlklog2size), y).

Alternatively, the position B may be expressed as (x, y−1). The position C may be expressed as (x−1, y).

The quantization parameters present at the positions B and C are represented as QP_B and QP_C, respectively.

At least one of the quantization parameters QP_B and QP_C or at least one of the statistical values of the quantization parameters QP_B and QP_C may be used to derive the predicted quantization parameter for the current quantization group.

For example, the average of the QP_B and QP_C may be used to derive the predicted quantization parameter of the current quantization group as represented by Expression 1.

$$predcurQP = (QP\_B + QP\_C + 1) \gg 1 \quad \text{[Expression 1]}$$

In (b) of FIG. 10, A represents a current quantization group. Each of B, C, D, and E represents the position of a block or sample from which a predicted quantization parameter is derived or the position of a neighboring quantization group disposed around the current quantization group. The predicted quantization parameter of the current quantization group may be derived by using the quantization parameter of the quantization group corresponding to at least one of the positions B, C, D, and E.

For example, the position B may be expressed as (x, y−(1<<minBlklog2size)). The position C may be expressed as (x−(1<<minBlklog2size), y). The position D may be expressed as (x+(curQGwidth>>1), y−(1<<minBlklog2size)). The position E may be expressed as (x−(1<<minBlklog2size), y+(curQGheight>>1))

Alternatively, the position B may be expressed as (x, y−1). The position C may be expressed as (x−1, y). The position D may be expressed as (x+(curQGwidth>>1), y−1). The position E may be expressed as (x−1, y+(curQGheight>>1)).

The quantization parameters present at the positions B, C, D, and E are expressed as QP_B, QP_C, QP_D, and QP_E, respectively.

At least one of the quantization parameters QP_B, QP_C, QP_D, and QP_E or at least one of the statistical values of the quantization parameters QP_B, QP_C, QP_D, and QP_E may be used to derive the predicted quantization parameter for the current quantization group.

For example, the average of the QP_B, QP_C, QP_D, and QP_E may be used to derive the predicted quantization parameter of the current quantization group as represented by Expression 2.

$$predcurQP = (QP\_B + QP\_C + QP\_D + QP\_E + 2) \gg 2 \quad \text{[Expression 2]}$$

In (c) of FIG. 10, the A represents a current quantization group. Each of B and C represents the position of a block or sample from which a predicted quantization parameter is derived or the position of a neighboring quantization group disposed around the current quantization group. The predicted quantization parameter of the current quantization group may be derived by using the quantization parameter of the quantization group corresponding to at least one of the positions B and C.

For example, the position B may be expressed as (x+(curQGwidth>>1), y−(curQGheight>>1)). The position C may be expressed as (x−(curQGwidth>>1), y+(curQGheight>>1)).

The quantization parameters present at the positions B and C are represented as QP_B and QP_C, respectively.

At least one of the QP_B and QP_C or at least one of the statistical values thereof may be used to derive the predicted quantization parameter of the current quantization group.

For example, the average of the QP_B and QP_C may be used to derive the predicted quantization parameter of the current quantization group as represented by Expression 3.

$$predcurQP = (QP\_B + QP\_C + 1) \gg 1 \quad \text{[Expression 3]}$$

In (d) of FIG. 10, A represents a current quantization group. Each of B and C represents the position of a block or sample from which a predicted quantization parameter is derived or the position of a neighboring quantization group disposed around the current quantization group. The predicted quantization parameter of the current quantization group may be derived by using the quantization parameter of the quantization group corresponding to at least one of the positions B and C.

For example, the position B may be expressed as (x+curQGwidth−(1<<minBlklog2size), y−(1<<minBlklog2size)). The position C may be expressed as (x−(1<<minBlklog2size), y+curQGheight−(1<<minBlklog2size)).

Alternatively, the position B may be expressed as (x+curQGwidth−1, y−1). The position C may be expressed as (x−1, y+curQGheight−1).

The quantization parameters present at the positions B and C are represented as QP_B and QP_C, respectively.

At least one of the QP_B and QP_C or at least one of the statistical values thereof may be used to derive the predicted quantization parameter of the current quantization group.

For example, the average of the QP_B and QP_C may be used to derive the predicted quantization parameter of the current quantization group as represented by Expression 4.

$$predcurQP = (QP\_B + QP\_C + 1) \gg 1 \quad \text{[Expression 4]}$$

Figure 11:
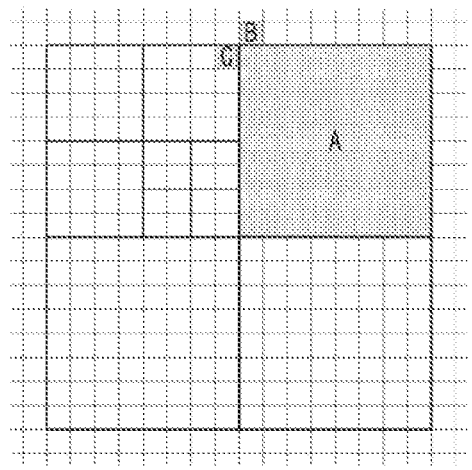
FIG. 11 is a diagram illustrating a process of deriving predicted quantization parameters of a current quantization group, according to another embodiment of the present invention.
Figure 11:
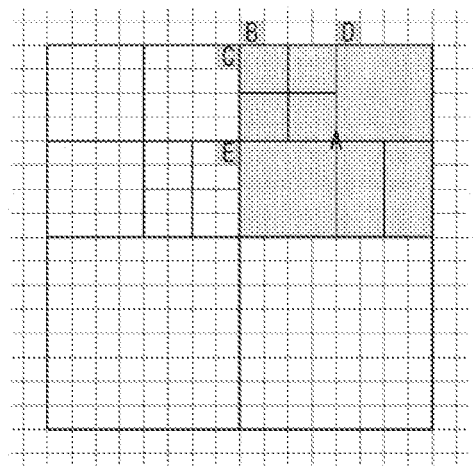
Figure 11:
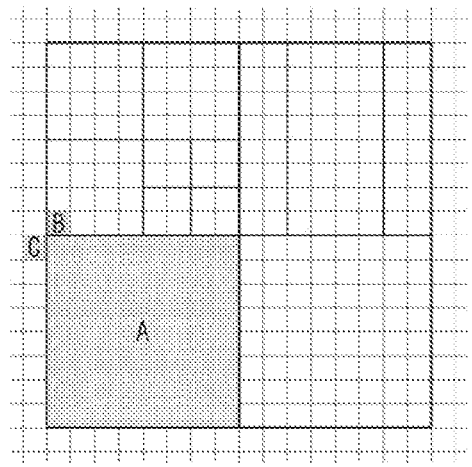
Figure 11:
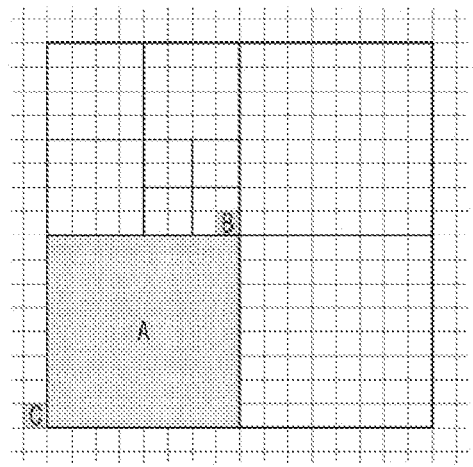

FIG. 11 is a diagram illustrating a process of deriving a predicted quantization parameter for a current quantization group, according to another embodiment of the present invention.

In FIG. 11, the unit size of a quantization group is demarcated by a thick solid line. Sub-blocks resulting from division of a block are demarcated by a thin solid line. A relatively bright solid line demarcates the minimum size of a block that is encoded/decoded. Here, the minimum block size may be set to M×N where M or N is an integer. For example, the minimum block size for a luma component may be 4×4 and the minimum block size for a chroma component may be 2×2. The top left position in a quantization group A may be expressed as (x, y). In addition, curQGwidth and curQGheight represents the horizontal size (width) and the vertical size (height) of the current quantization group. In addition, A represents the first quantization group in a predetermined CTU row. Alternatively, the A represents the first quantization group in at least one CTU row included in a CTU line.

In (a) of FIG. 11, A represents a current quantization group. Each of B and C represents the position of a block or sample from which a predicted quantization parameter is derived or the position of a neighboring quantization group disposed around the current quantization group. The predicted quantization parameter of the current quantization group may be derived by using the quantization parameter of the quantization group corresponding to at least one of the positions B and C.

For example, the position B may be expressed as (x, y−(1<<minBlklog2size)). The position C may be expressed as (x−(1<<minBlklog2size), y).

Alternatively, the position B may be expressed as (x, y−1). The position C may be expressed as (x−1, y).

Here, the position B may be disposed outside the boundary of a picture, a subpicture, a slice, a tile, a tile group, a tile, a CTU line, a CTU row, a CTU column, or a CTU in which the current quantization group is disposed.

For example, since the quantization group corresponding to the position B is disposed outside the boundary, the quantization parameter of the position B may not be used when deriving the predicted quantization parameter. The quantization parameter of the position C may be expressed as QP_C.

By using the QP_C, the predicted quantization parameter of the current quantization group may be derived.

For example, the QP_C may be used to derive the predicted quantization parameter of the current quantization group as represented by Expression 5.

$$predcurQP = QP\_C \quad \text{[Expression 5]}$$

For example, since the quantization group corresponding to the position B is disposed outside the boundary, the quantization parameter of the position B may be replaced with the quantization parameter of the previous quantization group in the encoding/decoding order or with the quantization parameter of a high-level and the replaced quantization parameter may be used. The quantization parameter of the previous quantization group in encoding/decoding order or the quantization parameter of a high-level may be expressed as QP_B. The quantization parameter of the position C may be expressed as QP_C.

In the present embodiment and/or other embodiments of the present invention, the quantization parameter of the high-level may mean at least one of a quantization parameter of a picture, a quantization parameter of a subpicture, a quantization parameter of a slice, a quantization parameter of a tile group, a quantization parameter of a tile, and a quantization parameter of a CTU line.

At least one of the QP_B and QP_C or at least one of the statistical values thereof may be used to derive the predicted quantization parameter of the current quantization group.

For example, the average of the QP_B and QP_C may be used to derive the predicted quantization parameter of the current quantization group as represented by Expression 6.

$$predcurQP = (QP\_B + QP\_C + 1) \gg 1 \quad \text{[Expression 6]}$$

Alternatively, a weighted average may be used to derive the predicted quantization parameter of the current quantization group. In this case, the weighting factor of the QP-B may be set to be smaller than the weighting factor of the QP_C.

In (b) of FIG. 11, A represents a current quantization group. Each of B, C, D, and E represents the position of a block or sample from which a predicted quantization parameter is derived or the position of a neighboring quantization group disposed around the current quantization group. The predicted quantization parameter of the current quantization group may be derived by using the quantization parameter of the quantization group corresponding to at least one of the positions B, C, D, and E.

For example, the position B may be expressed as (x, y−(1<<minBlklog2size)). The position C may be expressed as (x−(1<<minBlklog2size), y). The position D may be expressed as (x+(curQGwidth>>1), y−(1<<minBlklog2size)). The position E may be expressed as (x−(1<<minBlklog2size), y+(curQGheight>>1)).

Alternatively, the position B may be expressed as (x, y−1). The position C may be expressed as (x−1, y). The position D may be expressed as (x+(curQGwidth>>1), y−1). The position E may be expressed as (x−1, y+(curQGheight>>1)).

Here, at least one of the positions of B and D may be disposed outside the boundary of a picture, a subpicture, a slice, a tile, a tile group, a tile, a CTU line, a CTU row, a CTU column, or a CTU in which the current quantization group is included.

For example, since the quantization group corresponding to at least one of the positions of B and D is disposed outside the boundary, the quantization parameter at one or more positions B and D may not be used when deriving the predicted quantization parameter. The quantization parameters at the positions of C and E may be expressed as QP_C and QP_E, respectively.

At least one of the QP_C and QP_E or at least one of the statistical values thereof may be used to derive the predicted quantization parameter of the current quantization group.

For example, the average of the QP_C and QP_E may be used to derive the predicted quantization parameter of the current quantization group as represented by Expression 7.

$$predcurQP = (QP\_C + QP\_E + 1) \gg 1 \quad \text{[Expression 7]}$$

Alternatively, since the quantization group corresponding to the position of at least one of B and D is disposed outside the boundary, the quantization parameter of the position of at least one of B and D may be replaced with the quantization parameter of the previous quantization group in encoding/decoding order or with the quantization parameter of a high-level, and the replaced quantization parameter may be used. The quantization parameter of the previous quantization group in encoding/decoding order or the quantization parameter of the high-level may be expressed as QP_B and QP_D. The quantization parameters at the positions of C and E may be expressed as QP_C and QP_E, respectively.

In this case, at least one of the QP_B, QP_C, QP_D, and QP_E or at least one of the statistical values thereof may be used to derive the predicted quantization parameter of the current quantization group.

For example, as in the example represented by Expression 8, the average of QP_B, QP_C, QP_D, QP_E may be used to derive the predicted quantization parameter of the current quantization group.

$$predcurQP = (QP\_B + QP\_C + QP\_D + QP\_E + 2) \gg 2 \quad \text{[Expression 8]}$$

Alternatively, a weighted average may be used to derive the predicted quantization parameter of the current quantization group. In this case, at least one of the weighting factors of the QP_B and QP_D may be set to be smaller than at least one of the weighting factors of the QP_C and QP_E.

In (c) of FIG. 11, A represents a current quantization group. The A may represent the first quantization group in a predetermined CTU row. Alternatively, the A may represent the first quantization group in at least one CTU row included in a CTU line. Alternatively, the A may represent at least one of the first quantization group in a predetermined slice, the first quantization group in a predetermined subpicture, the first quantization group in a predetermined tile group, and the first quantization group in a predetermined tile.

Each of B and C represents the position of a block or sample from which a predicted quantization parameter is derived or the position of a neighboring quantization group disposed around the current quantization group. The predicted quantization parameter of the current quantization group may be derived by using the quantization parameter of the quantization group corresponding to at least one of the positions B and C.

For example, the position B may be expressed as (x, y−(1<<minBlklog2size)). The position C may be expressed as (x−(1<<minBlklog2size), y).

Alternatively, the position B may be expressed as (x, y−1). The position C may be expressed as (x−1, y).

Here, the position C may be outside the boundary of a picture, a subpicture, a slice, a tile, a tile group, a tile, a CTU line, a CTU row, a CTU column, or a CTU in which the current quantization group is disposed.

For example, since the quantization group corresponding to the position of C is disposed outside the boundary, the quantization parameter of the position of C may not be used for derivation of the predicted quantization parameter. The quantization parameter disposed at the position of B may be expressed as QP_B.

By using the QP_B, the predicted quantization parameter of the current quantization group may be derived.

For example, the QP_B may be used to derive the predicted quantization parameter of the current quantization group as in the example represented by Expression 9.

$$predcurQP = QP\_B \quad \text{[Expression 9]}$$

For example, since the quantization group corresponding to the position C is disposed outside the boundary, the quantization parameter of the position C may be replaced with the quantization parameter of the previous quantization group in the encoding/decoding order or with the quantization parameter of a high-level, and the replaced quantization parameter may be used. The quantization parameter of the previous quantization group in encoding/decoding order or the quantization parameter of a high-level may be expressed as QP_C. The quantization parameter disposed at the position of B may be expressed as QP_B.

At least one of the QP_B and QP_C or at least one of the statistical values thereof may be used to derive the predicted quantization parameter of the current quantization group.

For example, the average of the QP_B and QP_C may be used to derive the predicted quantization parameter of the current quantization group as in the example represented by Expression 10.

$$predcurQP = (QP\_B + QP\_C + 1) \gg 1 \quad \text{[Expression 10]}$$

Alternatively, a weighted average may be used to derive the predicted quantization parameter of the current quantization group. In this case, the weighting factor of the QP_B may be set to be smaller than the weighting factor of the QP_B.

In (d) of FIG. 11, A represents a current quantization group. Each of B and C represents the position of a block or sample from which a predicted quantization parameter is derived or the position of a neighboring quantization group disposed around the current quantization group. The predicted quantization parameter of the current quantization group may be derived by using the quantization parameter of the quantization group corresponding to at least one of the positions B and C.

For example, the position B may be expressed as (x+curQGwidth−(1<<minBlklog2size), y−(1<<minBlklog2size)). The position C may be expressed as (x−(1<<minBlklog2size), y+curQGheight−(1<<minBlklog2size)).

Alternatively, the position B may be expressed as (x+curQGwidth−1, y−1). The position C may be expressed as (x−1, y+curQGheight−1).

Here, the position C may be outside the boundary of a picture, a subpicture, a slice, a tile, a tile group, a tile, a CTU line, a CTU row, a CTU column, or a CTU in which the current quantization group is disposed.

For example, since the quantization group corresponding to the position C is disposed outside the boundary, the quantization parameter of the position C may not be used for derivation of the predicted quantization parameter. The quantization parameter disposed at the position B may be expressed as QP_B.

By using the QP_B, the predicted quantization parameter of the current quantization group may be derived.

For example, the QP_B may be used to derive the predicted quantization parameter of the current quantization group as represented by Expression 11.

$$predcurQP = QP\_B \quad \text{[Expression 11]}$$

For example, since the quantization group corresponding to the position C is disposed outside the boundary, the quantization parameter of the position C may be replaced with the quantization parameter of the previous quantization group in the encoding/decoding order or with the quantization parameter of a high-level, and the replaced quantization parameter may be used. The quantization parameter of the previous quantization group in encoding/decoding order or the quantization parameter of a high-level may be expressed as QP_C. The quantization parameter at the position of the B may be expressed as QP_B.

At least one of the QP_B and QP_C or at least one of the statistical values thereof may be used to derive the predicted quantization parameter of the current quantization group.

For example, the average of the QP_B and QP_C may be used to derive the predicted quantization parameter of the current quantization group as represented by Expression 12.

$$predcurQP = (QP\_B + QP\_C + 1) \gg 1 \quad \text{[Expression 12]}$$

Alternatively, a weighted average may be used to derive the predicted quantization parameter of the current quantization group. In this case, the weighting factor of the QP_C may be set to be smaller than the weighting factor of the QP_B.

Figure 12:
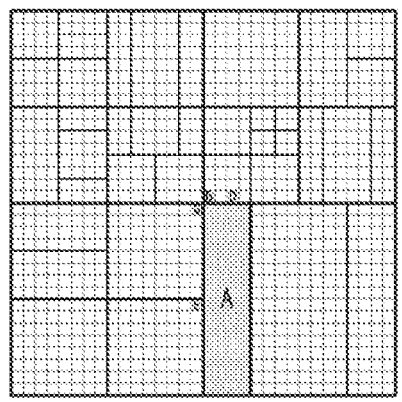
FIG. 12 is a diagram illustrating a process of deriving predicted quantization parameters of a current quantization group, according to a further embodiment of the present invention.
Figure 12:
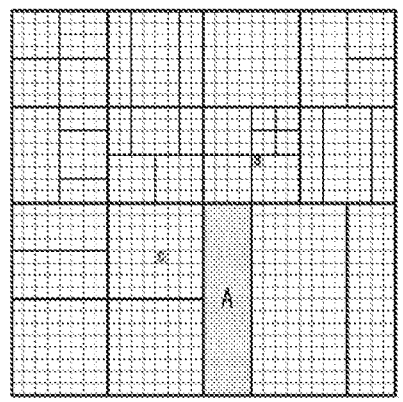
Figure 12:
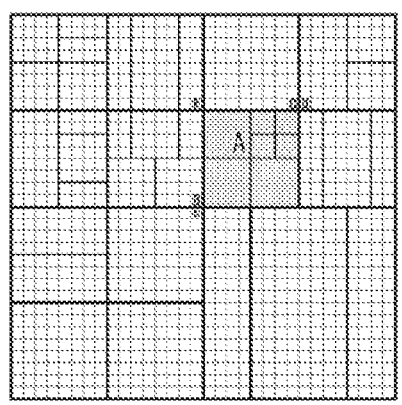
Figure 12:
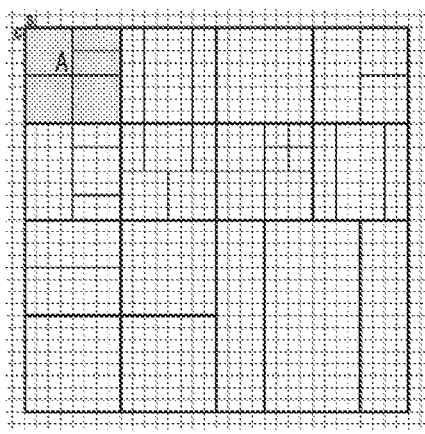

FIG. 12 is a diagram illustrating a process of deriving a predicted quantization parameter for a current quantization group, according to a further embodiment of the present invention.

In FIG. 12, the unit size of a quantization group is demarcated by a thick solid line. Sub-blocks resulting from division of a block are demarcated by a thin solid line. A relatively bright solid line demarcates the minimum size of a block to be encoded/decoded. Here, the minimum block size may be set to M×N where M or N is an integer. For example, the minimum block size for a luma component may be 4×4 and the minimum block size for a chroma component may be 2×2. The top left position in a quantization group A may be expressed as (x, y). In addition, curQGwidth and curQGheight represents the horizontal size (width) and the vertical size (height) of the current quantization group, respectively.

In (a) of FIG. 12, A represents a current quantization group. Each of B, C, D, and E represents the position a block or sample from which a predicted quantization parameter is derived or the position of a neighboring quantization group disposed around the current quantization group. In this case, a quantization parameter of a quantization group corresponding to at least one of the positions of B, C, D, and E may be used to derive a predicted quantization parameter for a current quantization group. The current quantization group A may have a non-square shape. A method of deriving a quantization parameter for a non-square quantization group may be similar to the method of deriving a quantization parameter for a square quantization group.

For example, the position B may be expressed as (x, y−(1<<minBlklog2size)). The position C may be expressed as (x−(1<<minBlklog2size), y). The position D may be expressed as (x+(curQGwidth>>1), y−(1<<minBlklog2size)). The position E may be expressed as (x−(1<<minBlklog2size), y+(curQGheight>>1)).

Alternatively, the position B may be expressed as (x, y−1). The position C may be expressed as (x−1, y). The position D may be expressed as (x+(curQGwidth>>1), y−1). The position E may be expressed as (x−1, y+(curQGheight>>1)).

The quantization parameters present at the positions B, C, D, and E are expressed as QP_B, QP_C, QP_D, and QP_E, respectively.

At least one of the QP_B, QP_C, QP_D, and QP_E or at least one of the statistical values thereof may be used to derive the predicted quantization parameter of the current quantization group.

For example, as represented by Expression 13, the average of the QP_B, QP_C, QP_D, and QP_E may be used to derive the predicted quantization parameter of the current quantization group.

$$predcurQP = (QP\_B + QP\_C + QP\_D + QP\_E + 2) \gg 2 \quad \text{[Expression 13]}$$

In (b) of FIG. 12, A represents a current quantization group. Each of B and C represents the position of a block or sample from which a predicted quantization parameter is derived or the position of a neighboring quantization group disposed around the current quantization group. The predicted quantization parameter of the current quantization group may be derived by using the quantization parameter of the quantization group corresponding to at least one of the positions B and C. The current quantization group A may have a non-square shape. A method of deriving a quantization parameter for a non-square quantization group may be similar to the method of deriving a quantization parameter for a square quantization group. Alternatively, a predicted quantization parameter for a non-square quantization group may be derived on the basis of the width and/or the height of the non-square quantization group.

For example, the position B may be expressed as (x+(BQGwidth>>1), y−(BQGheight>>1)). The position C may be expressed as (x−(CQGwidth>>1), y+(CQGheight>>1)). Here, XQGwidth and XQGheight may represent the width and height of a neighboring quantization group disposed around the current quantization group, respectively. For example, the width and height of the quantization group at the position B may be expressed by replacing the character "X" with the character "B", for example, BQGwidth and BQGheight, respectively. The width and height of the quantization group at the position C may be expressed by replacing the character "X" with the character "C", for example, CQGwidth and CQGheight, respectively.

The quantization parameters present at the positions B and C are expressed as QP_B and QP_C, respectively.

At least one of the QP_B and QP_C or at least one of the statistical values thereof may be used to derive the predicted quantization parameter of the current quantization group.

For example, the average of the QP_B and QP_C may be used to derive the predicted quantization parameter of the current quantization group as represented by Expression 14.

$$predcurQP = (QP\_B + QP\_C + 1) \gg 1 \qquad \text{[Expression 14]}$$

In (c) of FIG. 12, A represents a current quantization group. Each of B, C, D, E, and F represents the position of a block or sample from which a predicted quantization parameter is derived or the position of a neighboring quantization group disposed around the current quantization group. The predicted quantization parameter of the current quantization group may be derived by using the quantization parameter of the quantization group corresponding to at least one of the B, C, D, E, and F.

For example, the position B may be expressed as (x−(1<<minBlklog2size), y+curQGheight−(1<<minBlklog2size)). The position of the C may be expressed as (x+curQGwidth−(1<<minBlklog2size), y−(1<<minBlklog2size)). The position D may be expressed as (x+curQGwidth, y−(1<<minBlklog2size)). The position E may be expressed as (x−(1<<minBlklog2size), y+curQGheight). The position F may be expressed as (x−(1<<minBlklog2size), y−(1<<minBlklog2size)).

Alternatively, the position B may be expressed as (x−1, y+curQGheight−1). The position C may be expressed as (x+curQGwidth−1, y−1). The position D may be expressed as (x+curQGwidth, y−1). The position E may be expressed as (x−1, y+curQGheight). The position F may be expressed as (x−1, y−1).

The quantization parameters present at the positions B, C, D, E, and F may be expressed as QP_B, QP_C, QP_D, QP_E, and QP_F, respectively.

At least N quantization parameters of the QP_B, QP_C, QP_D, QP_E, and QP_F or a statistical value of at least N quantization parameters of the QP_B, QP_C, QP_D, QP_E, and QP_F may be used to derive the predicted quantization parameter of the current quantization group. Here, N is a positive integer.

The N quantization parameters may be selected according to a specific order. The specific order may be the encoding/decoding order or the order of specific positions that are processed in the encoder/decoder. The specific order may mean the order of B, C, D, E, and F.

For example, a statistical value (for example, the average) of two quantization parameters QP_B and QP_C among the quantization parameters QP_B, QP_C, QP_D, and QP_E, QP_F may be used to derive the predicted quantization parameter of the current quantization group as represented by Expression 15.

$$predcurQP = (QP\_B + QP\_C + 1) \gg 1 \qquad \text{[Expression 15]}$$

In (d) of FIG. 12, A represents a current quantization group. Each of B and C represents the position of a block or sample from which a predicted quantization parameter is derived or the position of a neighboring quantization group disposed around the current quantization group. Here, when the current quantization group is a quantization group positioned at the top left corner or the first quantization group in at least one of a picture, a subpicture, a slice, a tile group, a tile, a CTU line, a CTU row, and a CTU column, there may not be quantization groups at the positions B and C. In this case, the predicted quantization parameter of the current quantization group may be a value transmitted from the high-level syntax element. Here, the value transmitted from the high-level syntax element may mean at least one of the high-level quantization parameters.

The high-level syntax element may be at least one of a picture, a subpicture, a slice, a tile, a tile group, a tile, a CTU line, a CTU row, a CTU column, and a CTU.

For example, when the value of the transmitted quantization parameter in a picture is picQP, the predicted quantization parameter of the current quantization group may be derived as in the example of Expression 16.

$$predcurQP = picQP \qquad \text{[Expression 16]}$$

Alternatively, when the value of the transmitted quantization parameter in a slice is sliceQP, the predicted quantization parameter of the current quantization group may be derived as in the example of Expression 17.

$$predcurQP = \text{slice } QP \qquad \text{[Expression 17]}$$

Further alternatively, when the value of the transmitted quantization parameter in a tile group is tilegroupQP, the predicted quantization parameter of the current quantization group may be derived as in the example of Expression 18.

$$predcurQP = tilegroupQP \qquad \text{[Expression 18]}$$

Further alternatively, when the value of the transmitted quantization parameter in a tile is tileQP, the predicted quantization parameter of the current quantization group may be derived as in the example of Expression 19.

$$predcurQP = \text{tile } QP \qquad \text{[Expression 19]}$$

Figure 13:
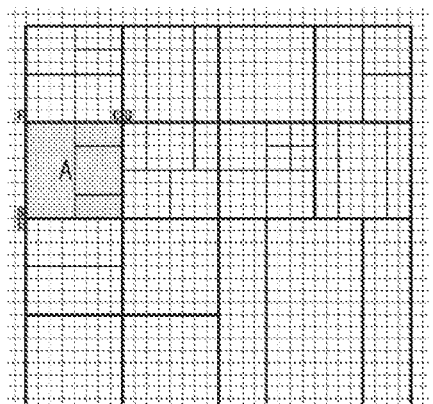
FIG. 13 is a diagram illustrating a process of deriving predicted quantization parameters of a current quantization group, according to a further embodiment of the present invention.
Figure 13:
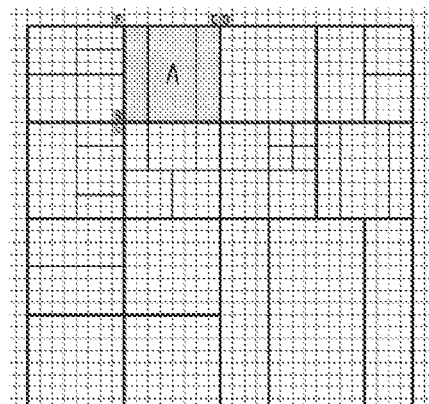
Figure 13:
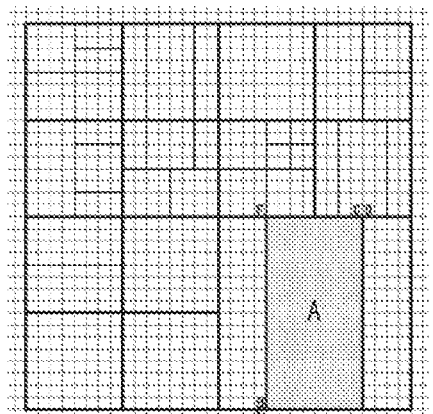

FIG. 13 is a diagram illustrating a process of deriving a predicted quantization parameter of a current quantization group, according to a further embodiment of the present invention.

In FIG. 13, the unit size of a quantization group is demarcated by a thick solid line. Sub-blocks resulting from division of a block are demarcated by a thin solid line. A relatively bright solid line demarcates the minimum size of a block that is encoded/decoded. Here, the minimum block size may be set to M×N where M or N is an integer. For example, the minimum block size for a luma component may be 4×4 and the minimum block size for a chroma component may be 2×2. The top left position in a quantization group A may be expressed as (x, y). In addition, curQGwidth and curQGheight represent the horizontal size (width) and the vertical size (height) of the current quantization group, respectively.

In (a) of FIG. 13, A represents a current quantization group. At least one of B, C, D, E, and F represents the position of a block or sample from which a predictive quantization parameter is derived or may represent the position of a neighboring quantization group disposed around the current quantization group. Here, the quantization parameter of the quantization group corresponding to at least one of the positions B, C, D, E, and F may be used to derive the predictive quantization parameter of the current quantization group.

For example, the position B may be expressed as (x−(1<<minBlklog2size), y+curQGheight−(1<<minBlklog2size)). The position of the C may be expressed as (x+curQGwidth−(1<<minBlklog2size), y−(1<<minBlklog2size)). The position D may be expressed as (x+curQGwidth, y−(1<<minBlklog2size)). The position E may be expressed as (x−(1<<minBlklog2size), y+curQGheight). The position F may be expressed as (x−(1<<minBlklog2size), y−(1<<minBlklog2size)).

Alternatively, the position B may be expressed as (x−1, y+curQGheight−1). The position C may be expressed as (x+curQGwidth−1, y−1). The position D may be expressed as (x+curQGwidth, y−1). The position E may be expressed as (x−1, y+curQGheight). The position F may be expressed as (x−1, y−1).

At least one position among the positions B, E, and F may be outside the boundary of at least one of a current picture, a subpicture, a slice, a tile group, a tile, a CTU line, a CTU row, a CTU column, and a CTU.

Since a quantization group corresponding to at least one of the positions B, E, and F is outside the boundary, a quantization parameter at one or more positions B, E, and F is not used for derivation of the predicted quantization parameter of the current quantization group. On the other hand, the quantization parameters at the positions C and D may be expressed as QP_C and QP_D, respectively.

The predictive quantization parameter of the current quantization group may be derived using at least one of the QP_C and QP_D or at least one statistical value of the QP_C and QP_D.

For example, as in the example of Expression 20, the predicted quantization parameter of the current quantization group may be derived using the average of the QP_C and QP_D.

$$predcurQP = (QP\_C + QP\_D + 1) \gg 1 \quad \text{[Expression 20]}$$

As another example, since the quantization group corresponding to at least one of the positions B, E, and F is outside the boundary, the quantization parameter corresponding to at least one of the positions B, E, and F may be replaced with the quantization parameter of the previous quantization group in encoding/decoding order or with the quantization parameter of a high-level. At this time, the quantization parameter of the previous quantization group in encoding/decoding or the quantization parameter of the higher level may be expressed as QP_B, QP_E, and QP_F. In addition, the quantization parameters at the positions C and D may be expressed as QP_C and QP_D, respectively.

On the other hand, it is possible to derive the predicted quantization parameter of the current quantization group using at least N quantization parameters or a statistical value of the at least N quantization parameters among the QP_B, QP_C, QP_D, QP_E and QP_F. Here, N is a positive integer.

The N quantization parameters may be selected according to a specific order. The specific order is the encoding/decoding order or the order of specific positions that are processed in the encoder/decoder. The specific order may mean the order of B, C, D, E, and F.

For example, the predictive quantization parameter of the current quantization group may be derived using a statistical value (for example, the average) of two quantization parameters QP_B and QP_C among the QP_B, QP_C, QP_D, QP_E and QP_F as represented by Expression 21.

$$predcurQP = (QP\_B + QP\_C + 1) \gg 1 \quad \text{[Expression 21]}$$

Alternatively, a weighted average may be used to derive the predicted quantization parameter of the current quantization group. In this case, the weighting factor of at least one of the QP_B, QP_E, and QP_F may be set to be smaller than the weighting factor of at least one of the QP_C and QP_D.

In (b) of FIG. 13, A represents a current quantization group. At least one of B, C, D, E, and F may represent the position of a block or sample from which a predictive quantization parameter is derived or may represent the position of a neighboring quantization group disposed around the current quantization group. Here, the quantization parameter of the quantization group corresponding to at least one of the positions B, C, D, E, and F may be used to derive the predicted quantization parameter of the current quantization group.

For example, the position B may be expressed as (x−(1<<minBlklog2size), y+curQGheight−(1<<minBlklog2size)). The position C may be expressed as (x+curQGwidth−(1<<minBlklog2size), y−(1<<minBlklog2size)). The position D may be expressed as (x+curQGwidth, y−(1<<minBlklog2size)). The position E may be expressed as (x−(1<<minBlklog2size), y+curQGheight). The position F may be expressed as (x−(1<<minBlklog2size), y−(1<<minBlklog2size)).

Alternatively, the position B may be expressed as (x−1, y+curQGheight−1). The position C may be expressed as (x+curQGwidth−1, y−1). The position D may be expressed as (x+curQGwidth, y−1). The position E may be expressed as (x−1, y+curQGheight). The position F may be expressed as (x−1, y−1).

At least one position among the positions C, D, and F may be outside the boundary of at least one of a current picture, a subpicture, a slice, a tile group, a tile, a CTU line, a CTU row, a CTU column, and a CTU.

For example, since a quantization group corresponding to at least one of the positions C, D, and F is outside the boundary, a quantization parameter of at least one of the positions C, D, and F may not be used for derivation of the predicted quantization parameter of the current quantization group. The quantization parameters at the positions B and E may be expressed as QP_B and QP_E, respectively.

At least one of the QP_B and QP_C or at least one of the statistical values of the QP_B and QP_C may be used to derive the predicted quantization parameter of the current quantization group.

For example, the average of the QP_C and QP_E may be used to derive the predicted quantization parameter of the current quantization group as represented by Expression 22.

$$predcurQP = (QP\_B + QP\_E + 1) \gg 1 \quad \text{[Expression 22]}$$

As another example, since the quantization group corresponding to at least one of the positions C, D, and F is outside the boundary, the quantization parameter corresponding to at least one of the positions C, D, and F may be replaced with the quantization parameter of the previous quantization group in encoding/decoding order or with the quantization parameter of a high-level. At this time, the quantization parameter of the previous quantization group in encoding/decoding or the quantization parameter of the higher level may be expressed as QP_C, QP_D, and QP_F. The quantization parameters at the positions B and E may be expressed as QP_B and QP_E, respectively.

On the other hand, it is possible to derive the predicted quantization parameter of the current quantization group using at least N quantization parameters or a statistical value of the at least N quantization parameters among the QP_B, QP_C, QP_D, QP_E and QP_F. Here, N is a positive integer.

The N quantization parameters may be selected according to a specific order. The specific order may be the encoding/decoding order or the order of specific positions that are processed in the encoder/decoder. The specific order may mean the order of B, C, D, E, and F.

For example, the predictive quantization parameter of the current quantization group may be derived using a statistical value (for example, the average) of four quantization parameters QP_B, QP_C, QP_D, and QP_E among the QP_B, QP_C, QP_D, QP_E and QP_F as represented by Expression 23.

$$predcurQP = (QP\_B + QP\_C + QP\_D + QP\_E + 2) \gg 2 \quad \text{[Expression 23]}$$

Alternatively, a weighted average may be used to derive the predicted quantization parameter of the current quantization group. In this case, the weighting factor of at least one of the QP_C, QP_D, and QP_F may be set to be smaller than the weighting factor of at least one of the QP_B and QP_E.

In (c) of FIG. 13, A represents a current quantization group. Each of B, C, D, E, and F may represent the position of a block or sample from which a predicted quantization parameter is derived or the position of a neighboring quantization group disposed around the current quantization group. Here, the quantization parameter of the quantization group corresponding to at least one of the positions B, C, D, E, and F may be used to derive the predicted quantization parameter of the current quantization group. The current quantization group A may have a non-square shape. A method of deriving a quantization parameter for a non-square quantization group may be similar to the method of deriving a quantization parameter for a square quantization group.

For example, the position B may be expressed as (x−(1<<minBlklog2size), y+curQGheight−(1<<minBlklog2size)). The position C may be expressed as (x+curQGwidth−(1<<minBlklog2size), y−(1<<minBlklog2size)). The position D may be expressed as (x+curQGwidth, y−(1<<minBlklog2size)). The position E may be expressed as (x−(1<<minBlklog2size), y+curQGheight). The position F may be expressed as (x−(1<<minBlklog2size), y−(1<<minBlklog2size)).

Alternatively, the position B may be expressed as (x−1, y+curQGheight−1). The position C may be expressed as (x+curQGwidth−1, y−1). The position D may be expressed as (x+curQGwidth, y−1). The position E may be expressed as (x−1, y+curQGheight). The position F may be expressed as (x−1, y−1).

Here, the position E may be outside the boundary of a picture, a subpicture, a slice, a tile, a tile group, a tile, a CTU line, a CTU row, a CTU column, or a CTU in which the current quantization group is disposed.

For example, since the quantization group corresponding to the position E is disposed outside the boundary, the quantization parameter of the position E may not be used for derivation of the predicted quantization parameter. The quantization parameters present at the positions B, C, D, and F are expressed as QP_B, QP_C, QP_D, and QP_F, respectively.

At least one of the QP_B, QP_C, QP_D, and QP_F or at least one of the statistical values of the QP_B, QP_C, QP_D, and QP_F may be used to derive the predicted quantization parameter of the current quantization group.

For example, the average of the QP_B, QP_C, QP_D, and QP_F may be used to derive the predicted quantization parameter of the current quantization group as represented by Expression 24.

$$predcurQP = (QP\_B + QP\_C + QP\_D + QP\_E + 2) \gg 2 \quad \text{[Expression 24]}$$

For example, since the quantization group corresponding to the position E is disposed outside the boundary, the quantization parameter of the position E may be replaced with the quantization parameter of the previous quantization group in the encoding/decoding order or with the quantization parameter of a high-level, and the replaced quantization parameter may be used. The quantization parameter of the previous quantization group in encoding/decoding order or the quantization parameter of a high-level may be expressed as QP_E. The quantization parameters present at the positions B, C, D, and F are expressed as QP_B, QP_C, QP_D, and QP_F, respectively.

On the other hand, it is possible to derive the predicted quantization parameter of the current quantization group using at least N quantization parameters or a statistical value of the at least N quantization parameters among the QP_B, QP_C, QP_D, QP_E and QP_F. Here, N is a positive integer.

The N quantization parameters may be selected according to a specific order. The specific order may be the encoding/decoding order or the order of specific positions that are processed in the encoder/decoder. The specific order may mean the order of B, C, D, E, and F.

For example, the predictive quantization parameter of the current quantization group may be derived using a statistical value (for example, the average) of four quantization parameters QP_B, QP_C, QP_D, and QP_E among the QP_B, QP_C, QP_D, QP_E and QP_F as represented by Expression 25.

$$predcurQP = (QP\_B + QP\_C + QP\_D + QP\_E + 2) \gg 2 \quad \text{[Expression 25]}$$

Alternatively, a weighted average may be used to derive the predicted quantization parameter of the current quantization group. In this case, the weighting factor of the QP_E may be set to be smaller than at least one of the weighting factors of the QP_B, QP_C, QP_D, and QP_F.

Hereinafter, the step of encoding/decoding the size information of a quantization group and/or the information of a delta quantization parameter will be described below.

The size information of the quantization group may be entropy-coded in the encoder. Here, the size information of a quantization group may be entropy-coded into a bitstream on a level of a video parameter set (VPS), a sequence parameter set (SPS), an adaptation parameter set (APS), a picture parameter set (PPS), a subpicture header, a slice header, a tile group header, a CTU line, a CTU row, a CTU column, a CTU, or a block.

For example, the size of each unit or block for which a delta quantization parameter is signaled may be entropy-coded using at least one of depth, length, area, ratio, shape, and subdivision specifying the size of a quantization group as shown in Table 2. Table 2 shows an example of the size of each unit or block for which a delta quantization parameter that is determined from quantization group size determination information is signaled. Here, the size of each unit or block for which the delta quantization parameter is signaled may mean the size information of a quantization group.

As another example, the size information of the quantization group may be entropy-coded using at least one of the ratio and the shape specifying the size of the quantization group.

The size information of the quantization group may be entropy-coded in the encoder. Here, the size information of the quantization group may be entropy-decoded from a bitstream on a level of a video parameter set (VPS), a sequence parameter set (SPS), an adaptation parameter set (APS), a picture parameter set (PPS), a subpicture header, a slice header, a tile group header, a CTU line, a CTU row, a CTU column, a CTU, or a block.

For example, the size of each unit or block for which a delta quantization parameter is signaled may be entropy-decoded using at least one of depth, length, area, ratio, shape, and subdivision specifying the size of a quantization group as shown in Table 2. Here, the size of each unit or block for which the delta quantization parameter is signaled may mean the size information of a quantization group.

As another example, the size information of the quantization group may be entropy-decoded using at least one of the ratio and the shape specifying the size of the quantization group.

TABLE 2

| information used to determine size of quantization group | a basic unit for which size information of quantization group is signaled | example of syntax element | meaning |
|---|---|---|---|
| depth | video parameter set (VPS), sequence parameter set (SPS), adaption parameter set (APS), picture parameter set (PPS), subpicture header, slice header, tile group header, CTU line, CTU row, CTU column, CTU, block | diff_cu_qp_depth | This may mean a difference value between depth of CTU and depth of quantization group. Here, depth of CTU may mean 0. Depth of quantization group may mean a unit depth on a basis of which delta quantization parameter is signaled. |
| length | | log2_diff_cu_qp_ delta-length | This may mean a difference value between length of CTU and horizontal Or vertical length of quantization group. Here, length may mean horizontal or vertical length of CTU or horizontal or vertical length of quantization group. |
| area | | log4_diff_cu_qp_ delta_area/diff_ cu_qp_delta_area | Length of quantization group may mean a unit length on a basis of which delta quantization parameter is signaled. This may mean a difference value between area of CTU and area of quantization group. In addition, area of quantization group may mean a unit area on a basis of which delta quantization parameter is signaled. |
| subdivision | | cu_qp_delta_ subdiv | This may mean a difference value between depth of CTU and subdivision of quantization group. Here, depth of CTU may be 0. Subdivision of quantization group may mean a unit area on a basis of which delta quantization parameter is signaled. |

The delta quantization parameter information may be entropy-coded in the encoder. At least one entry of the delta quantization parameter information may be entropy-encoded on at least one basis among a quantization group basis, a CU basis, a PU basis, a TU basis, and a block basis.

The delta quantization parameter information may be entropy-decoded in the decoder. At least one entry of the delta quantization parameter information may be entropy-decoded on at least one basis among a quantization group basis, a CU basis, a PU basis, a TU basis, and a block basis.

At least one delta quantization parameter may be entropy-coded/decoded for each quantization group.

At least one delta quantization parameter may be entropy-coded/entropy-decoded for each quantization group by setting whether the delta quantization parameter is entropy-coded/entropy-decoded in a quantization group using a variable or flag such as IsCuDeltaQPCoded. That is, when a delta quantization parameter is entropy-coded/entropy-decoded in a quantization group, the flag or value IsCuDeltaQPCoded is set to a first value. Here, the first value may be 1. At least one delta quantization parameter may be entropy-coded/entropy-decoded for each quantization group depending on the shape of a corresponding one of the quantization groups.

For example, when a CTU has a size of 64×64 and diff_cu_qp_delta_depth is 1, in a case where a current block has a block depth of 1 (i.e., the depth of a quadtree is 1 and the size is 32×32), a delta quantization parameter of the current block may be entropy-coded/entropy-encoded. That is, after the delta quantization parameter of the current block is entropy-coded/entropy-decoded, the flag or value IsCuDeltaQPCoded may be set to a first value. When the diff_cu_qp_delta_depth is 1, the size of a quantization group may be set to 32×32.

For example, when a CTU has a size of 64×64 and the diff_cu_qp_delta_depth is 1, in a case where a current block has a block depth of 2 (i.e., the depth of a quadtree depth is 1 and a block size is 16×16), the delta quantization parameter may be entropy-coded/entropy-encoded for the first block among the blocks resulting from division at the depth of 1 which is the same as the depth information of the quantization group. The variable or flag IsCuDeltaQPCoded may be set to a first value after the delta quantization parameter for the current block is entropy-coded/entropy-decoded so that it is not necessary to entropy-code/entropy-decode the delta quantization parameters for the other blocks in the quantization group. Therefore, the blocks in one quantization group can share the same delta quantization parameter. Since the blocks in one quantization group use the same predicted quantization parameter, the same quantization parameter also can be shared by the blocks in one quantization group. When the diff_cu_qp_delta_depth is 1, the size of a quantization group may be set to 32×32. In addition, the other blocks in the quantization group may determine their delta quantization parameter on the basis of the delta quantization parameter. In addition, the other blocks in the quantization group may determine their delta quantization parameter on the basis of the delta quantization parameter.

For example, when a CTU has a size of 128×128 and diff_cu_qp_delta_depth is 1, in a case where a current block has a block depth of 3 (i.e., the depth of a quadtree is 2, the depth of a binary tree is 1, and the size is 32×16), a delta quantization parameter of the current block may be entropy-coded/entropy-encoded. After the delta quantization parameter of the current block is entropy-coded/entropy-decoded, the flag or value IsCuDeltaQPCoded may be set to a first value. In this case, the size of the quantization group may be set to the size of the current block.

For example, when a CTU has a size of 64×64 and diff_cu_qp_delta_depth is 3, in a case where a current block has a block depth of 2 (i.e., the depth of a quadtree is 1, the depth of a binary tree is 1, and the size is 32×16), a delta quantization parameter of the current block may be entropy-coded/entropy-encoded. After the delta quantization parameter of the current block is entropy-coded/entropy-decoded, the flag or value IsCuDeltaQPCoded may be set to a first value. In this case, the size of the quantization group may be set to the size of the current block.

For example, when a CTU has a size of 64×64 and diff_cu_qp_delta_depth is 3, in a case where a current block has a block depth of 2 (i.e., the depth of a quadtree is 1, the depth of a multi-type tree is 1, and the block size is 32×16), a delta quantization parameter of the current block may be entropy-coded/entropy-encoded. After the delta quantization parameter of the current block is entropy-coded/entropy-decoded, the flag or value IsCuDeltaQPCoded may be set to a first value. In this case, the size of the quantization group may be set to the size of the current block.

For example, when a CTU has a size of 64×64 and diff_cu_qp_delta_depth is 2, in a case where a current block has a block depth of 3 (i.e., the depth of a quadtree depth is 1, the depth of a binary tree is 1, the depth of a ternary tree 3, and the block size is 8×16), the delta quantization parameter may be entropy-coded/entropy-encoded for the first block among the blocks resulting from division at the depth of 2 which is the same as the depth information of the quantization group. The variable or flag IsCuDeltaQPCoded may be set to a first value after the delta quantization parameter for the current block is entropy-coded/entropy-decoded so that it is not necessary to entropy-code/entropy-decode the delta quantization parameters for the other blocks in the quantization group. Therefore, the blocks having a depth the same as or greater than the depth information of the quantization group can share the delta quantization parameter. Since the blocks in one quantization group use the same predicted quantization parameter, the same quantization parameter also can be shared by the blocks in one quantization group. The size of the quantization group may be set on the basis of the quantization group depth information diff_cu_qp_delta_depth.

For example, when a CTU has a size of 64×64 and the diff_cu_qp_delta_depth is 2, in a case where a current block has a block depth of 3 (i.e., the depth of a quadtree depth is 1, the depth of a multi-type tree is 2, and the block size is 8×16), the delta quantization parameter may be entropy-coded/entropy-encoded for the first block among the blocks resulting from division at the depth of 1 which is the same as the depth information of the quantization group. The variable or flag IsCuDeltaQPCoded may be set to a first value after the delta quantization parameter for the current block is entropy-coded/entropy-decoded so that it is not necessary to entropy-code/entropy-decode the delta quantization parameters for the other blocks in the quantization group. Therefore, the blocks having a depth the same as or greater than the depth information of the quantization group can share the delta quantization parameter. Since the blocks in one quantization group use the same predicted quantization parameter, the same quantization parameter also can be shared by the blocks in one quantization group. The size of the quantization group may be set on the basis of the quantization group depth information diff_cu_qp_delta_depth.

Further alternatively, for example, when a CTU has a size of 32×32 and log2_diff_cu_qp_delta_length (quantization group length information) is 1, the size of a quantization group may be set to 16×16. When the size of a current block is 4×12, a delta quantization parameter for the first block in the quantization group may be entropy-coded/entropy-decoded. The variable or flag IsCuDeltaQPCoded may be set to a first value after the delta quantization parameter is entropy-coded/entropy-decoded so that it is not necessary to entropy-code/entropy-decode the delta quantization parameters for the other blocks in the quantization group. Therefore, the blocks in one quantization group can share the same delta quantization parameter. Since the blocks in one quantization group use the same predicted quantization parameter, the same quantization parameter also can be shared by the blocks in one quantization group. In addition, the other blocks in the quantization group may determine their delta quantization parameter on the basis of the delta quantization parameter. In addition, the other blocks in the quantization group may determine their delta quantization parameter on the basis of the delta quantization parameter.

Further alternatively, for example, when a CTU has a size of 128×128 and the log2_diff_cu_qp_delta_length (quantization group length information) is 2, the size of a quantization group may be set to 32×32. When the size of a current block is 16×8, a delta quantization parameter for the first block in the quantization group may be entropy-coded/entropy-decoded. The variable or flag IsCuDeltaQPCoded may be set to a first value after the delta quantization parameter is entropy-coded/entropy-decoded so that it is not necessary to entropy-code/entropy-decode the delta quantization parameters for the other blocks in the quantization group. Therefore, the blocks in one quantization group can share the same delta quantization parameter. Since the blocks in one quantization group use the same predicted quantization parameter, the same quantization parameter also can be shared by the blocks in one quantization group. In addition, the other blocks in the quantization group may determine their delta quantization parameter on the basis of the delta quantization parameter. In addition, the other blocks in the quantization group may determine their delta quantization parameter on the basis of the delta quantization parameter.

Further alternatively, for example, when a CTU has a size of 32×32 and the log2_diff_cu_qp_delta_length (quantization group length information) is 1, the size of a quantization group may be set to 16×16. When the size of a current block is 16×8, a delta quantization parameter for the first block in the quantization group may be entropy-coded/entropy-decoded. The variable or flag IsCuDeltaQPCoded may be set to a first value after the delta quantization parameter is entropy-coded/entropy-decoded so that it is not necessary to entropy-code/entropy-decode the delta quantization parameters for the other blocks in the quantization group. Therefore, the blocks in one quantization group can share the same delta quantization parameter. Since the blocks in one quantization group use the same predicted quantization parameter, the same quantization parameter also can be shared by the blocks in one quantization group. In addition, the other blocks in the quantization group may determine their delta quantization parameter on the basis of the delta quantization parameter. In addition, the other blocks in the quantization group may determine their delta quantization parameter on the basis of the delta quantization parameter.

Further alternatively, for example, when a CTU has a size of 64×64 and the log2_diff_cu_qp_delta_length (quantization group length information) is 2, the size of a quantization group may be set to 16×16. When the size of a current block is 32×16, a delta quantization parameter for the current block may be entropy-coded/entropy-decoded. When the maximum length (maximum value) of the horizontal length (width) and the vertical length (height) of the current block is longer than the length of the quantization group, the size of the quantization group may be set to the size of the current block. Since the maximum length (maximum value) of the horizontal length (width) and the vertical length (height) of the current block is longer than the length of the quantization group, the delta quantization parameter for the current block is entropy-coded/entropy-decoded after the IsCuDeltaQPCoded is set to a first value. When the size of the quantization group is within a size range of the current block, the size of the quantization group may be set to the size of the current block.

Further alternatively, for example, when a CTU has a size of 256×256 and the log2_diff_cu_qp_delta_length (quantization group length information) is 2, the size of a quantization group may be set to 32×32. When the size of a current block is 64×16, a delta quantization parameter for the current block may be entropy-coded/entropy-decoded. When the maximum length (maximum value) of the horizontal length (width) and the vertical length (height) of the current block is longer than the length of the quantization group, the size of the quantization group may be set to the size of the current block. Since the maximum length of the horizontal length (width) and the vertical length (height) of the current block is longer than the length of the quantization group, the delta quantization parameter for the current block may be entropy-coded/entropy-decoded after the IsCuDeltaQPCoded is set to a first value.

Further alternatively, for example, when a CTU has a size of 32×32 and the log2_diff_cu_qp_delta_length (quantization group length information) is 2, the size of a quantization group may be set to 8×8. When the size of a current block is 4×16, a delta quantization parameter for the current block may be entropy-coded/entropy-decoded. When the maximum length of the horizontal length (width) and the vertical length (height) of the current block is longer than the length of the quantization group, the size of the quantization group may be set to the size of the current block. Since the maximum length of the horizontal length (width) and the vertical length (height) of the current block is longer than the length of the quantization group, the delta quantization parameter for the current block may be entropy-coded/entropy-decoded after the IsCuDeltaQPCoded is set to a first value.

Further alternatively, for example, when a CTU has a size of 32×32 and the log4_diff_cu_qp_delta_area (quantization group area information) is 1, the size of a quantization group may be set to 16×16. When the size of a current block is 16×16, a delta quantization parameter for the current block may be entropy-coded/entropy-decoded.

Further alternatively, for example, when a CTU has a size of 128×128 and the log4_diff_cu_qp_delta_area (quantization group area information) is 2, the size of a quantization group may be set to 32×32. When the size of a current block is 16×16, a delta quantization parameter for the first block in the quantization group may be entropy-coded/entropy-decoded. The variable or flag IsCuDeltaQPCoded may be set to a first value after the delta quantization parameter is entropy-coded/entropy-decoded so that it is not necessary to entropy-code/entropy-decode the delta quantization parameters for the other blocks in the quantization group. Therefore, the blocks in one quantization group can share the same delta quantization parameter. Since the blocks in one quantization group use the same predicted quantization parameter, the same quantization parameter also can be shared by the blocks in one quantization group. In addition, the other blocks in the quantization group may determine their delta quantization parameter on the basis of the delta quantization parameter. In addition, the other blocks in the quantization group may determine their delta quantization parameter on the basis of the delta quantization parameter.

Further alternatively, for example, when a CTU has a size of 64×64 and the log4_diff_cu_qp_delta_area (quantization group area information) is 2, the size of a quantization group may be set to 16×16. When the size of a current block is 32×16, a delta quantization parameter for the current block may be entropy-coded/entropy-decoded. When the area of the current block is larger than the area of the quantization group, the size of the quantization group is set to the size of the current block. Since the maximum length of the horizontal length (width) and the vertical length (height) of the current block is longer than the length of the quantization group, the delta quantization parameter for the current block may be entropy-coded/entropy-decoded after the IsCuDeltaQPCoded is set to a first value.

Here, the first block may mean the first block among blocks of which the coding block flag is not the first value. Here, the first value may be 0.

In this case, the size of the quantization group may be set to the size of the current block.

Further alternatively, for example, when a CTU has a size of 64×64 and the log4_diff_cu_qp_delta_area (quantization group area information) is 2, the size of a quantization group may be set to 16×16. When the size of a current block is 16×32, a delta quantization parameter for the current block may be entropy-coded/entropy-decoded. When the area of the current block is larger than the area of the quantization group, the size of the quantization group is set to the size of the current block. Since the maximum length of the horizontal length (width) and the vertical length (height) of the current block is longer than the length of the quantization group, the delta quantization parameter for the current block may be entropy-coded/entropy-decoded after the IsCuDeltaQPCoded is set to a first value.

Further alternatively, for example, when a CTU has a size of 32×32 and ratio information specifying the size of a quantization group is 2, the size of the quantization group may be set to 16×16. When the size of a current block is 4×12, a delta quantization parameter for the first block in the quantization group may be entropy-coded/entropy-decoded. The variable or flag IsCuDeltaQPCoded may be set to the first value after the delta quantization parameter is entropy-coded/entropy-decoded so that it is not necessary to entropy-code/entropy-decode the delta quantization parameters for the other blocks in the quantization group. Therefore, the blocks in one quantization group can share the same delta quantization parameter. Since the blocks in one quantization group use the same predicted quantization parameter, the same quantization parameter also can be shared by the blocks in one quantization group. In addition, the other blocks in the quantization group may determine their delta quantization parameter on the basis of the delta quantization parameter. In addition, the other blocks in the quantization group may determine their delta quantization parameter on the basis of the delta quantization parameter.

Further alternatively, for example, when a CTU has a size of 32×32 and ratio information specifying the size of a quantization group is 2, the size of the quantization group may be set to 16×16. When the size of a current block is 32×16, a delta quantization parameter for the current block may be entropy-coded/entropy-decoded. When the maximum length (maximum value) of the horizontal length (width) and the vertical length (height) of the current block is longer than the length of the quantization group, the size of the quantization group may be set to the size of the current block. Since the maximum length of the horizontal length (width) and the vertical length (height) of the current block is longer than the length of the quantization group, the delta quantization parameter for the current block may be entropy-coded/entropy-decoded after the IsCuDeltaQPCoded is set to a first value.

When a predetermined condition is satisfied, a delta quantization parameter for each quantization group may not be entropy-coded/entropy-decoded. In this case, when the predetermined condition is satisfied, the IsCuDeltaQPCoded is set to 1 so that the delta quantization parameter may not be entropy-coded/entropy-decoded. Here, the first value may be 1. The predetermined condition will be described below.

For example, when a CTU has a size of 64×64 and the diff_cu_qp_delta_depth is 1, in a case where a current block has a block depth of 2 (i.e., a block having a size of 16×16), since the depth of the current block is greater than the depth of the quantization group, the IsCuDeltaQPCoded may be set to the first value so that the delta quantization parameter for the current block may not be entropy-coded/entropy-encoded. In this case, since the IsCuDeltaQPCoded is set to the first value, the delta quantization parameters for the other blocks in the quantization group may not be entropy-coded/entropy-decoded. In this case, the quantization parameter may be derived from at least one of the neighboring quantization group, and the derived quantization parameter may be determined as the quantization parameter for the current block. That is, without performing entropy-coding/entropy-decoding on the delta quantization parameter, the predicted quantization parameter may be used as the quantization parameter for the current block as it is. When the diff_cu_qp_delta_depth is 1, the size of a quantization group may be set to 32×32.

For example, when a CTU has a size of 64×64 and the diff_cu_qp_delta_depth is 1, in a case where a current block has a block depth of 2 (i.e., the depth of a quadtree is 1, the depth of a binary tree is 1, and the block size is 32×16), since the depth of the current block is greater than the depth of the quantization group, the IsCuDeltaQPCoded may be set to the first value so that the delta quantization parameter for the current block may not be entropy-coded/entropy-encoded. In this case, since the IsCuDeltaQPCoded is set to the first value, the delta quantization parameters for the other blocks in the quantization group may not be entropy-coded/entropy-decoded. In this case, the quantization parameter may be derived from at least one of the neighboring quantization groups, and the derived quantization parameter may be determined as the quantization parameter of the current block. That is, without performing entropy-coding/entropy-decoding on the delta quantization parameter, the predicted quantization parameter may be used as the quantization parameter for the current block as it is. The size of the quantization group may be set on the basis of the quantization group depth information diff_cu_qp_delta_depth.

For example, when a CTU has a size of 64×64 and the diff_cu_qp_delta_depth is 1, in a case where a current block has a block depth of 2 (i.e., the depth of a quadtree is 1, the depth of a multi-type tree is 1, and the block size is 32×16), since the depth of the current block is greater than the depth of the quantization group, the IsCuDeltaQPCoded may be set to the first value so that the delta quantization parameter for the current block may not be entropy-coded/entropy-encoded. In this case, since the IsCuDeltaQPCoded is set to the first value, the delta quantization parameters for the other blocks in the quantization group may not be entropy-coded/entropy-decoded. In this case, the quantization parameter may be derived from at least one of the neighboring quantization group, and the derived quantization parameter may be determined as the quantization parameter of the current block. That is, without performing entropy-coding/entropy-decoding on the delta quantization parameter, the predicted quantization parameter may be used as the quantization parameter of the current block as it is. The size of the quantization group may be set on the basis of the quantization group depth information diff_cu_qp_delta_depth.

Further alternatively, for example, when a CTU has a size of 128×128 and log2_diff_cu_qp_delta_length (quantization group length information) is 3, the size of a quantization group may be set to 16×16. When the size of a current block is 4×8, since the maximum length of the horizontal length and the vertical length of the current block is less than the length of the quantization group, the IsCuDeltaQPCoded may be set to the first value so that a delta quantization parameter for the current block may not be entropy-coded/entropy-decoded. In this case, since the IsCuDeltaQPCoded is set to the first value, the delta quantization parameters for the other blocks in the quantization group may not be entropy-coded/entropy-decoded. In this case, the quantization parameter may be derived from at least one of the neighboring quantization group, and the derived quantization parameter may be determined as the quantization parameter of the current block. That is, without performing entropy-coding/entropy-decoding on the delta quantization parameter, the predicted quantization parameter may be used as the quantization parameter of the current block as it is.

Further alternatively, for example, when a CTU has a size of 32×32 and log2_diff_cu_qp_delta_length (quantization group length information) is 1, the size of a quantization group may be set to 16×16. When the size of a current block is 8×4, since the maximum length of the horizontal length and the vertical length of the current block is less than the length of the quantization group, the IsCuDeltaQPCoded may be set to the first value so that a delta quantization parameter for the current block may not be entropy-coded/entropy-decoded. In this case, since the IsCuDeltaQPCoded is set to the first value, the delta quantization parameters for the other blocks in the quantization group may not be entropy-coded/entropy-decoded. In this case, the quantization parameter may be derived from at least one of the neighboring quantization groups, and the derived quantization parameter may be determined as the quantization parameter of the current block. That is, without performing entropy-coding/entropy-decoding on the delta quantization parameter, the predicted quantization parameter may be used as the quantization parameter of the current block as it is.

Further alternatively, for example, when a CTU has a size of 128×128 and log4_diff_cu_qp_delta_area (quantization group area information) is 4, the size of a quantization group may be set to 8×8. When the size of a current block is 4×4, since the area of the current block is smaller than the area of the quantization group, the IsCuDeltaQPCoded may be set to the first value so that a delta quantization parameter for the current block may be entropy-coded/entropy-decoded. In this case, since the IsCuDeltaQPCoded is set to the first value, the delta quantization parameters for the other blocks in the quantization group may not be entropy-coded/entropy-decoded. In this case, the quantization parameter may be derived from at least one of the neighboring quantization groups to determine the quantization parameter of the current block. That is, without performing entropy-coding/entropy-decoding on the delta quantization parameter, the predicted quantization parameter may be used as the quantization parameter of the current block as it is.

Further alternatively, for example, when a CTU has a size of 64×64 and log4_diff_cu_qp_delta_area (quantization group area information) is 2, the size of a quantization group may be set to 16×16. When the size of a current block is 16×8, since the area of the current block is smaller than the area of the quantization group, the IsCuDeltaQPCoded may be set to the first value so that a delta quantization parameter for the current block may not be entropy-coded/entropy-decoded. In this case, since the IsCuDeltaQPCoded is set to the first value, the delta quantization parameters for the other blocks in the quantization group may not be entropy-coded/entropy-decoded. In this case, the quantization parameter may be derived from at least one of the neighboring quantization groups, and the derived quantization parameter may be determined as the quantization parameter of the current block. That is, without performing entropy-coding/entropy-decoding on the delta quantization parameter, the predicted quantization parameter may be used as the quantization parameter of the current block as it is.

Further alternatively, for example, when a CTU has a size of 32×32 and log4_diff_cu_qp_delta_area (quantization group area information) is 1, the size of a quantization group may be set to 16×16. When the size of a current block is 32×4, since the area of the current block is smaller than the area of the quantization group, the IsCuDeltaQPCoded may be set to the first value so that a delta quantization parameter for the current block may not be entropy-coded/entropy-decoded. In this case, since the IsCuDeltaQPCoded is set to the first value, the delta quantization parameters for the other blocks in the quantization group may not be entropy-coded/entropy-decoded. In this case, the quantization parameter may be derived from at least one of the neighboring quantization groups, and the derived quantization parameter may be determined as the quantization parameter of the current block. That is, without performing entropy-coding/entropy-decoding on the delta quantization parameter, the predicted quantization parameter may be used as the quantization parameter of the current block as it is.

Further alternatively, for example, when a CTU has a size of 64×64 and log4_diff_cu_qp_delta_area (quantization group area information) is 2, the size of a quantization group may be set to 16×16. When the size of a current block is 8×16, since the area of the current block is smaller than the area of the quantization group, the IsCuDeltaQPCoded may be set to the first value so that a delta quantization parameter for the current block may not be entropy-coded/entropy-decoded. In this case, since the IsCuDeltaQPCoded is set to the first value, the delta quantization parameters for the other blocks in the quantization group may not be entropy-coded/entropy-decoded. In this case, the quantization parameter may be derived from at least one of the neighboring quantization groups, and the derived quantization parameter may be determined as the quantization parameter of the current block. That is, without performing entropy-coding/entropy-decoding on the delta quantization parameter, the predicted quantization parameter may be used as the quantization parameter of the current block as it is.

Further alternatively, for example, when a CTU has a size of 32×32 and log4_diff_cu_qp_delta_area (quantization group area information) is 1, the size of a quantization group may be set to 16×16. When the size of a current block is 4×32, since the area of the current block is smaller than the area of the quantization group, the IsCuDeltaQPCoded may be set to the first value so that a delta quantization parameter for the current block may not be entropy-coded/entropy-decoded. In this case, since the IsCuDeltaQPCoded is set to the first value, the delta quantization parameters for the other blocks in the quantization group may not be entropy-coded/entropy-decoded. In this case, the quantization parameter may be derived from at least one of the neighboring quantization groups, and the derived quantization parameter may be determined as the quantization parameter of the current block. That is, without performing entropy-coding/entropy-decoding on the delta quantization parameter, the predicted quantization parameter may be used as the quantization parameter of the current block as it is.

Further alternatively, for example, according to a predetermined priority among the depth information, the length information, the area information, the ratio information, the shape information of the quantization group, the delta quantization parameter may not be entropy-coded/entropy-decoded.

A method of efficiently signaling delta quantization parameters using quantization group size information in a block structure in which a non-square block (e.g., M×N block) exists will be described below in detail with reference to FIGS. 14 through 23. In FIGS. 14 through 23, M and N are positive integers and may have different values.

Figure 14:
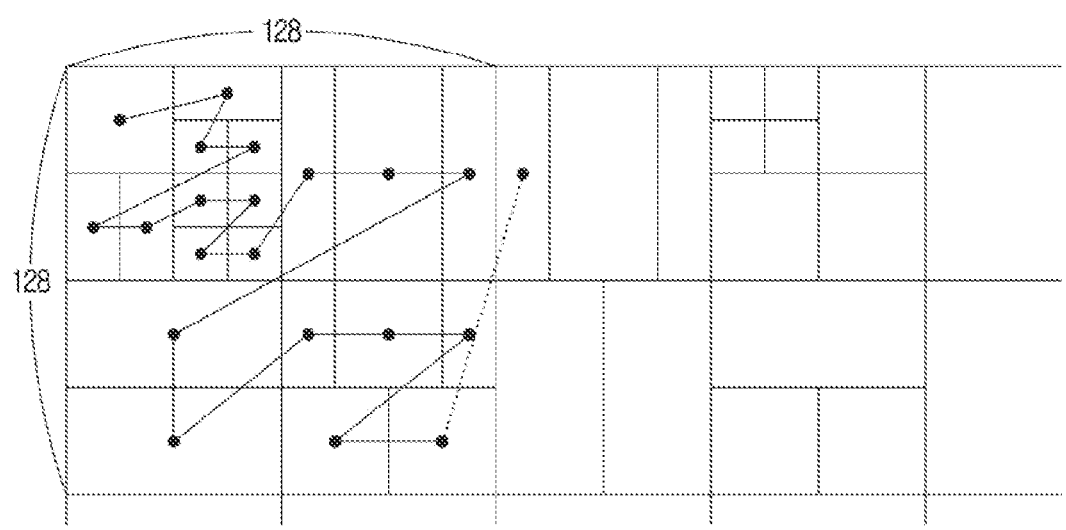
FIG. 14 is a diagram illustrating sequences of encoding/decoding for cases where a CU according to one embodiment of the present invention has a square shape and a non-square shape.

FIG. 14 is a diagram illustrating encoding/decoding order for a case where a CU according to one embodiment of the present invention has a square shape and a case where a CU has a non-square shape.

The size of a quantization group may be determined on the basis of the size information, the depth information, the length information, the area information, the ratio information, the shape information, and the subdivision information of the quantization group. In the present embodiment and/or other embodiments of the present invention, the area may mean the area.

For example, the size of the quantization group may be determined using the depth information diff_cu_qp_delta_depth of the quantization group, and whether to signal the delta quantization parameter may be determined according to the depth information of the quantization group and the depth value of the current M×N block.

As another example, the size of a quantization group may be determined using log2_diff_cu_qp_delta_length, which is the length information of the quantization group, and whether to signal the delta quantization parameter may be determined on the basis of the statistical value of the length information of the quantization group and the minimum value or the maximum value of the horizontal length (M) and the vertical length (N) of the current M×N block.

As a further example, the size of a quantization group may be determined using log4_diff_cu_qp_delta_area, which is the area information of the quantization group, and whether to signal the delta quantization parameter may be determined on the basis of the area information of the quantization group and the product of the horizontal length (M) and the vertical length (N) of the current M×N block.

As a further example, the size of a quantization group may be determined using the subdivision information cu_qp_delta_subdiv of the quantization group, and whether to signal the delta quantization parameter may be determined by comparing the subdivision information of the quantization group and CbSubdiv which is the subdivision value of a block that is currently encoded/decoded.

The delta quantization parameter may be signaled for a block resulting from quadtree partitioning, binary tree partitioning, or ternary tree partitioning. Whether to signal the delta quantization parameter may be determined by comparing the depth of the block and the diff_cu_qp_delta_depth which is the quantization depth information.

For example, the quantization parameters may be signaled when the depth of the block is less than or equal to the quantization depth information.

Here, the size of the quantization group for the current block may be set according to at least one of the delta quantization parameter utilization flag, information on whether the delta quantization parameter is signaled, and the depth information of the quantization group. In this case, the size of the quantization group for the current block may be set equal to the size of the current block.

The shape of the quantization group for the current block may be a square shape when the current block is a block resulting from quadtree partitioning. The shape of the quantization group for the current block may be a non-square shape when the current block is a block resulting from multi-type tree partitioning.

As another example, when the depth of the block is greater than the depth information of the quantization group, the quantization parameter may be signaled from the first block among the blocks resulting from the division. The other blocks except for the first block resulting from the partitioning may share the delta quantization parameter of the first block. Since the blocks in one quantization group use the same predicted quantization parameter, the same quantization parameter also may be shared by the blocks in one quantization group. The depth of the block may be at least one of the depth of a binary tree or the depth of a ternary tree, or may be the sum of at least one of the depths of the trees. The depth of the block may be at least one of the depth of a binary tree and the depth of a ternary tree, or the sum of at least two of the depths of the trees.

Here, the size of the quantization group for the current block may be set according to at least one of the delta quantization parameter utilization flag, information on whether the delta quantization parameter is signaled, the depth information of the quantization group, the size of the current block, and the size of at least one of the parent nodes of the current block. The size of the quantization group for the current block may be set equal to the size of at least one of the parent nodes of the current block corresponding to the depth information of the quantization group.

The shape of the quantization group for the current block may be the same as that of at least one of the parent nodes of the current block corresponding to the depth information of the quantization group. The quantization group for the current block may have a non-square shape.

As another example, the delta quantization parameter may be signaled for each quadtree block. That is, the delta quantization parameter may not be signaled for a binary tree block or a ternary tree block. The binary tree block or the ternary tree block may use the delta quantization parameter signaled for the quadtree block. The binary tree block or the ternary tree block may share the delta quantization parameter signaled for the quadtree block. Alternatively, the quantization parameter of the binary tree block or the ternary tree block may be determined on the basis of the quantization parameter of the quadtree block. Alternatively, the quantization parameter of the quadtree block may be determined as the quantization parameter of the binary tree block or the ternary tree block.

As another example, the quantization parameter may be signaled when the depth of the quadtree block and the binary tree block is less than or equal to the quantization depth information.

Here, the size of the quantization group for the current block may be set according to at least one of the delta quantization parameter utilization flag, information on whether the delta quantization parameter is signaled, and the depth information of the quantization group. In this case, the size of the quantization group for the current block may be set equal to the size of the current block.

The shape of the quantization group for the current block may be a square shape when the current block is a block resulting from quadtree partitioning. The shape of the quantization group for the current block may have a non-square shape when the current block is a block resulting from binary tree partitioning.

As another example, when the depth of a block generated through binary tree partitioning is greater than the depth of the quantization group, the delta quantization parameter may be signaled for only one of the two blocks. The other block may share the delta quantization parameter that is signaled. Since the blocks in one quantization group use the same predicted quantization parameter, the same quantization parameter also may be shared by the blocks in one quantization group. The only one block may be the first block of the two blocks generated through binary tree partitioning. Here, the first block may mean the first block among the blocks of which the coding block flag is not the first value. Here, the first value may be 0.

Here, the size of the quantization group for the current block may be set according to at least one of the delta quantization parameter utilization flag, information on whether the delta quantization parameter is signaled, the depth information of the quantization group, the size of the current block, and the size of at least one of the parent nodes of the current block. The size of the quantization group for the current block may be set equal to the size of at least one of the parent nodes of the current block corresponding to the depth information of the quantization group.

The shape of the quantization group for the current block may be the same as that of at least one of the parent nodes of the current block corresponding to the depth information of the quantization group. The quantization group for the current block may have a non-square shape.

As another example, the delta quantization parameter may be signaled when the depth of a block generated through quadtree partitioning or ternary tree partitioning is less than or equal to the quantization depth information.

Here, the size of the quantization group for the current block may be set according to at least one of the delta quantization parameter utilization flag, information on whether the delta quantization parameter is signaled, and the depth information of the quantization group. In this case, the size of the quantization group for the current block may be set equal to the size of the current block.

The shape of the quantization group for the current block may be a square shape when the current block is a block resulting from quadtree partitioning. The shape of the quantization group for the current block may be a non-square shape when the current block is a block resulting from ternary tree partitioning.

As another example, when the depth of a block generated through ternary tree partitioning is greater than the depth of the quantization group, the delta quantization parameter may be signaled for only one of the three blocks. The other blocks may share the delta quantization parameter that is signaled. Since the blocks in one quantization group use the same predicted quantization parameter, the same quantization parameter also may be shared by the blocks in one quantization group. The only one block may be the first block of the two blocks generated through ternary tree partitioning. The only one block may be a block that has the largest area among the three blocks generated through ternary tree partitioning.

Here, the size of the quantization group for the current block may be set according to at least one of the delta quantization parameter utilization flag, information on whether the delta quantization parameter is signaled, the depth information of the quantization group, the size of the current block, and the size of at least one of the parent nodes of the current block. The size of the quantization group for the current block may be set equal to the size of at least one of the parent nodes of the current block corresponding to the depth information of the quantization group.

The shape of the quantization group for the current block may be the same as that of at least one of the parent nodes of the current block corresponding to the depth information of the quantization group. The quantization group for the current block may have a non-square shape.

As another example, the delta quantization parameter may be signaled when the depth of a block generated through quadtree partitioning or multi-type tree partitioning is less than or equal to the quantization depth information.

Here, the size of the quantization group for the current block may be set according to at least one of the delta quantization parameter utilization flag, information on whether the delta quantization parameter is signaled, and the depth information of the quantization group. In this case, the size of the quantization group for the current block may be set equal to the size of the current block.

The shape of the quantization group for the current block may be a square shape when the current block is a block resulting from quadtree partitioning. The shape of the quantization group for the current block may be a non-square shape when the current block is a block resulting from multi-type tree partitioning.

As another example, when the depth of a block generated through quadtree partitioning or multi-type partitioning is greater than the depth of the quantization group, the delta quantization parameter may be signaled for only one of the two or more blocks. The other block(s) may share the delta quantization parameter that is signaled. Since the blocks in one quantization group use the same predicted quantization parameter, the same quantization parameter also may be shared by the blocks in one quantization group. The only one block may be the first block among the two or more blocks generated through partitioning. The only one block may be a block that has the largest area among the two or more blocks generated through partitioning. The only one block may be a block that has the smallest area among the two or more blocks generated through partitioning.

Here, the size of the quantization group for the current block may be set according to at least one of the delta quantization parameter utilization flag, information on whether the delta quantization parameter is signaled, the depth information of the quantization group, the size of the current block, and the size of at least one of the parent nodes of the current block. The size of the quantization group for the current block may be set equal to the size of at least one of the parent nodes of the current block corresponding to the depth information of the quantization group.

The shape of the quantization group for the current block may be the same as that of at least one of the parent nodes of the current block corresponding to the depth information of the quantization group. The quantization group for the current block may have a non-square shape.

The delta quantization parameter may be signaled for a block resulting from quadtree partitioning, binary tree partitioning, or ternary tree partitioning. Whether to signal the delta quantization parameter may be determined by comparing the area of the block and the size of the quantization group set according to the diff_cu_qp_delta_area, which is the area information of the quantization group.

For example, the delta quantization parameter may be signaled when the area of the block is smaller than or equal to the size of the quantization group.

Here, the size of the quantization group for the current block may be set according to at least one of the delta quantization parameter utilization flag, information on whether the delta quantization parameter is signaled, and the area information of the quantization group. In this case, the size of the quantization group for the current block may be set equal to the size of the current block.

The shape of the quantization group for the current block may be a square shape when the current block is a block resulting from quadtree partitioning. The shape of the quantization group for the current block may be a non-square shape when the current block is a block resulting from multi-type tree partitioning.

As another example, when the area of a block generated through binary tree partitioning is larger than the size of the quantization group, the delta quantization parameter may be signaled for only one of the two blocks resulting from the binary tree partitioning. The quantization parameters for the other blocks may be determined on the basis of the signaled delta quantization parameter.

As another example, when the area of the block is smaller than the size of the quantization group, the quantization parameter may be signaled from the first block among the blocks resulting from the partitioning. The other blocks except for the first block resulting from the partitioning may share the delta quantization parameter of the first block. Since the blocks in one quantization group use the same predicted quantization parameter, the same quantization parameter also may be shared by the blocks in one quantization group. Here, the area of the block may be the area of a quadtree or the area of a multi-type tree.

Here, the size of the quantization group for the current block may be set according to at least one of the delta quantization parameter utilization flag, information on whether the delta quantization parameter is signaled, the area information of the quantization group, the area of the current block, and the size of at least one of the parent nodes of the current block. The size of the quantization group for the current block may be set equal to the size of at least one of the parent nodes of the current block corresponding to the area information of the quantization group.

The shape of the quantization group for the current block may be the same as that of at least one of the parent nodes of the current block corresponding to the area information of the quantization group. The quantization group for the current block may have a non-square shape.

As another example, when the area of a block resulting from ternary tree partitioning is smaller than the size of the quantization group, the delta quantization parameter may be signaled for only one block having the largest area among the three blocks. The other blocks may share the delta quantization parameter that is signaled. As another example, when the area of a block resulting from ternary tree partitioning is smaller than the size of the quantization group, the delta quantization parameter may be signaled for only one block having the smallest area among the three blocks resulting from the partitioning. The other blocks may share the delta quantization parameter of the block having the smallest area.

On the other hand, the shape of the current block that is encoded/decoded may be a quadtree, a binary tree, or a ternary tree. When the shape is a quadtree, an area difference value diff_cur_block_area_minus4 between the quadtree blocks may be acquired by Expression 26.

$$\text{diff\_cur\_block\_area\_minus}4 = \qquad \text{[Expression 26]}$$
$$2 * \log2\_ctu\_size\_minus2 -$$
$$\log2\_current\_block\_area\_minus4$$

In Expression 26, log2_ctu_size_minus2 represents a value that is obtained by performing a log2 function on the maximum CTU size and then subtracting 2 from the result of the log2 function. The log2_current_block_area_minus4 is a value obtained by performing a log2 function on the product of the horizontal length and the vertical length of the current block and subtracting 4 from the result of the log2 function.

For example, when the current block is a block resulting from quadtree partitioning, in a case where the diff_cur_block_area_minus4 is smaller than or equal to the area information of the quantization group, the delta quantization parameter may be signaled.

Here, the size of the quantization group for the current block may be set according to at least one of the delta quantization parameter utilization flag, information on whether the delta quantization parameter is signaled, and the area information of the quantization group. In this case, the size of the quantization group for the current block may be set equal to the size of the current block.

The shape of the quantization group for the current block may be a square shape when the current block is a block resulting from quadtree partitioning.

For example, when the current block is a block resulting from binary tree partitioning, in a case where the diff_cur_block_area_minus4 is smaller than or equal to the area information of the quantization group, the delta quantization parameter may be signaled.

Here, the size of the quantization group for the current block may be set according to at least one of the delta quantization parameter utilization flag, information on whether the delta quantization parameter is signaled, and the area information of the quantization group. In this case, the size of the quantization group for the current block may be set equal to the size of the current block.

The shape of the quantization group for the current block may have a non-square shape when the current block is a block resulting from binary tree partitioning.

For example, when the current block is a block resulting from ternary tree partitioning, in a case where the diff_cur_block_area_minus4 is smaller than or equal to the area information of the quantization group, the delta quantization parameter may be signaled.

Here, the size of the quantization group for the current block may be set according to at least one of the delta quantization parameter utilization flag, information on whether the delta quantization parameter is signaled, and the area information of the quantization group. In this case, the size of the quantization group for the current block may be set equal to the size of the current block.

The shape of the quantization group for the current block may be a non-square shape when the current block is a block resulting from ternary tree partitioning.

For example, when the current block is a block resulting from ternary tree partitioning, in a case where the diff_cur_block_area_minus4 is larger than the area information of the quantization group, the delta quantization parameter may be signaled from the first block among the blocks resulting from the ternary tree partitioning. In this case, in the case of the middle block among the three blocks resulting from ternary tree partitioning, even though the diff_cur_block_area_minus4 is smaller than or equal to the area information of the quantization group, the delta quantization parameter may not be signaled but may be predicted or derived from an already encoded/decoded block. In the case of the last block among the three blocks resulting from ternary tree partitioning, the delta quantization parameter may not be signaled but may be predicted or derived from an already encoded/decoded block.

Here, the size of the quantization group for the current block may be set according to at least one of the delta quantization parameter utilization flag, information on whether the delta quantization parameter is signaled, and the area information of the quantization group.

The shape of the quantization group for the current block may be a non-square shape when the current block is a block resulting from ternary tree partitioning.

For example, when the current block is a block resulting from ternary tree partitioning, in a case where the diff_cur_block_area_minus4 is larger than the area information of the quantization group, the delta quantization parameter may be signaled from the first block among the blocks resulting from the ternary tree partitioning. In this case, in the case of the middle block among the three blocks resulting from ternary tree partitioning, even though the diff_cur_block- _area_minus4 is smaller than or equal to the area information of the quantization group, the delta quantization parameter may not be signaled. In the case of the last block among the three blocks resulting from ternary tree partitioning, the delta quantization parameter may not be signaled but may be predicted or derived from an already encoded/decoded block.

Here, the size of the quantization group for the current block may be set according to at least one of the delta quantization parameter utilization flag, information on whether the delta quantization parameter is signaled, and the area information of the quantization group.

The shape of the quantization group for the current block may be a non-square shape when the current block is a block resulting from ternary tree partitioning.

The delta quantization parameter may be signaled for a block resulting from quadtree partitioning, binary tree partitioning, or ternary tree partitioning. Whether to signal the delta quantization parameter may be determined by comparing the subdivision value of the block and the diff_cu_qp_delta_subdiv which is the subdivision information of the quantization group.

For example, the delta quantization parameter may be signaled when the subdivision value of the current block is less than or equal to the subdivision information of the quantization group.

Here, the size of the quantization group for the current block may be set according to at least one of the delta quantization parameter utilization flag, information on whether the delta quantization parameter is signaled, and the subdivision information of the quantization group. In this case, the size of the quantization group for the current block may be set equal to the size of the current block.

The shape of the quantization group for the current block may be a square shape when the current block is a block resulting from quadtree partitioning. The shape of the quantization group for the current block may be a non-square shape when the current block is a block resulting from multi-type tree partitioning.

As another example, when the subdivision value of the block is greater than the subdivision information of the quantization group, the quantization parameter may be signaled from the first block among the blocks resulting from the partitioning. The other blocks except for the first block resulting from the partitioning may share the delta quantization parameter of the first block. Since the blocks in one quantization group use the same predicted quantization parameter, the same quantization parameter also may be shared by the blocks in one quantization group. Here, the area of the block may be the area of a quadtree or the area of a multi-type tree.

Here, the size of the quantization group for the current block may be set according to at least one of the delta quantization parameter utilization flag, information on whether the delta quantization parameter is signaled, the subdivision information of the quantization group, the subdivision value of the current block, and the size of at least one of the parent nodes of the current block. The size of the quantization group for the current block may be set equal to the size of at least one of the parent nodes of the current block corresponding to the subdivision information of the quantization group.

The shape of the quantization group for the current block may be the same as that of at least one of the parent nodes of the current block corresponding to the subdivision information of the quantization group. The quantization group for the current block may have a non-square shape.

On the other hand, the subdivision value may be allocated every block and may be used together with the depth value of the block.

In addition, the subdivision value may be calculated in a manner described below.

The shape of the current block may be at least one of a quadtree, a binary tree, or a ternary tree, and the current block may be partitioned into a quadtree form, a binary tree form, or a ternary tree form.

For example, when the current block is partitioned into a quadtree form, the subdivision value of each sub-block resulting from the quadtree partitioning may be set to a value obtained by adding 2 to the subdivision value of the current block.

As another example, when the current block is partitioned into a binary tree form, the subdivision value of each sub-block resulting from the binary tree partitioning may be set to a value obtained by adding 1 to the subdivision value of the current block.

As another example, when the current block is divided into a ternary tree form, the subdivision value of each of the left and right sub-blocks among the three sub-block resulting from the ternary tree partitioning may be set to a value obtained by adding 2 to the subdivision value of the current block, and the subdivision value of the middle sub-block among the three sub-blocks resulting from the ternary tree partitioning may be set to a value obtained by adding 1 to the subdivision value of the current block.

As another example, when the current block is divided into a ternary tree form, whether to signal the delta quantization parameter may be determined by comparing the subdivision information of the quantization group with the value obtained by adding two to the subdivision value (hereinafter, also referred to as original subdivision value) of the current block that is not yet partitioned.

As another example, when the current block is a block resulting from quadtree partitioning, in a case where the subdivision value of the current block is smaller than or equal to the subdivision information of the quantization group, the delta quantization parameter may be signaled.

Here, the size of the quantization group for the current block may be set according to at least one of the delta quantization parameter utilization flag, information on whether the delta quantization parameter is signaled, and the subdivision information of the quantization group. In this case, the size of the quantization group for the current block may be set equal to the size of the current block.

The shape of the quantization group for the current block may be a square shape when the current block is a block resulting from quadtree partitioning.

As another example, when the current block is a block resulting from binary tree partitioning, in a case where the subdivision value of the current block is smaller than or equal to the subdivision information of the quantization group, the delta quantization parameter may be signaled.

Here, the size of the quantization group for the current block may be set according to at least one of the delta quantization parameter utilization flag, information on whether the delta quantization parameter is signaled, and the subdivision information of the quantization group. In this case, the size of the quantization group for the current block may be set equal to the size of the current block.

The shape of the quantization group for the current block may have a non-square shape when the current block is a block resulting from binary tree partitioning.

As another example, when the current block is a block resulting from ternary tree partitioning, in a case where the subdivision value of the current block is smaller than or equal to the subdivision information of the quantization group, the delta quantization parameter may be signaled.

Here, the size of the quantization group for the current block may be set according to at least one of the delta quantization parameter utilization flag, information on whether the delta quantization parameter is signaled, and the subdivision information of the quantization group. In this case, the size of the quantization group for the current block may be set equal to the size of the current block.

The shape of the quantization group for the current block may be a non-square shape when the current block is a block resulting from ternary tree partitioning.

As another example, when the current block is a block resulting from ternary tree partitioning, in a case where the subdivision value of the current block is greater than the subdivision information of the quantization group, the delta quantization parameter may be signaled from the first block among the blocks resulting from the partitioning. In this case, in the case of the middle block among the three blocks resulting from ternary tree partitioning, even though the subdivision value of the block is smaller than or equal to the subdivision information of the quantization group, the delta quantization parameter may not be signaled but may be predicted or derived from an already encoded/decoded block. In the case of the last block among the three blocks resulting from ternary tree partitioning, the delta quantization parameter may not be signaled but may be predicted or derived from an already encoded/decoded block.

Here, the size of the quantization group for the current block may be set according to at least one of the delta quantization parameter utilization flag, information on whether the delta quantization parameter is signaled, and the subdivision information of the quantization group. In this case, the size of the quantization group for the current block may be set equal to the size of the current block.

The shape of the quantization group for the current block may be a non-square shape when the current block is a block resulting from ternary tree partitioning.

As another example, when the current block is a block resulting from ternary tree partitioning, in a case where the subdivision value of the block is greater than the subdivision information of the quantization group, the delta quantization parameter may be signaled from the first block among the blocks resulting from the partitioning. In the case of the middle block among the three blocks resulting from ternary tree partitioning, even though the cu_qp_delta_subdiv is less than or equal to the subdivision information of the quantization group, the delta quantization parameter may be signaled. In the case of the last block among the three blocks resulting from ternary tree partitioning, the delta quantization parameter may not be signaled but may be predicted or derived from an already encoded/decoded block.

Here, the size of the quantization group for the current block may be set according to at least one of the delta quantization parameter utilization flag, information on whether the delta quantization parameter is signaled, and the subdivision information of the quantization group. In this case, the size of the quantization group for the current block may be set equal to the size of the current block.

The shape of the quantization group for the current block may be a non-square shape when the current block is a block resulting from ternary tree partitioning.

On the other hand, the delta quantization parameters may be signaled on a per transform unit (TU) basis, on a per block basis, or on a per coding unit (CU) basis. The size of the TU may be equal to the size of the CU. Alternatively, the size of the TU may be smaller than the size of the CU.

Here, the first block may mean the first block among the blocks of which the coding block flag is not a first value. Here, the first value may be 0.

In addition, the delta quantization parameter utilization flag may be cu_qp_delta_enabled_flag.

Also, whether the delta quantization parameter is signaled may be at least one of cu_qp_delta_enabled_flag and IsCuDeltaQPCoded.

The delta quantization parameter may be signaled depending on the size of the CTU, the diff_cu_qp_delta_depth which is the depth information of the quantization group, the log2_diff_cu_qp_delta_length which is the length information of the quantization group, the diff_cu_qp_delta_area which is the area information of the quantization group, the cu_qp_delta_subdiv which is the subdivision information of the quantization group, and/or the size of the quantization group.

Hereinafter, for a case where a CTU has a size of 128×128 and a diff_cu_qp_delta_depth which is the depth information of a quantization group is 2, an embodiment in which a delta quantization parameter is signaled will be described in more detail. In this case, the size of the quantization group may be set to the size of the current block.

For example, when the current block is partitioned two times by quadtree partitioning and one time by binary tree partitioning, the current block may have a depth of 3 and a size of 32×16 or 16×32. When the depth information of the quantization group is 2, since the depth information of the quantization group is less than or equal to the depth of the current block, a delta quantization parameter for the first block among the blocks resulting from the binary tree partitioning may be signaled. Also, the delta quantization parameter of the first block may be shared by the other blocks among the blocks resulting from the binary tree partitioning at the depth of 2. Since the blocks in one quantization group use the same predicted quantization parameter, the same quantization parameter also may be shared by the blocks in one quantization group.

As another example, when the current block is partitioned one time by quadtree partitioning, the current block may have a depth of 1 and a size of 64×64. When the depth information of the quantization group is 2, since the depth information of the quantization group is greater than the depth of the current block, the delta quantization parameter for the current block may be signaled.

As another example, when the current block is partitioned by quadtree partitioning one time, by binary tree partitioning one time, and by ternary tree partitioning one time, the current block may have a depth of 3 and a size of 16×32 or 32×16. When the depth information of the quantization group is 2, since the depth information of the quantization group is less than or equal to the depth of the current block, a delta quantization parameter for the first block among the blocks resulting from the ternary tree partitioning at the depth of 2 may be signaled. The delta quantization parameter for the first block may be shared by the other blocks among the blocks resulting from the ternary tree partitioning at the depth of 2. Since the blocks in one quantization group use the same predicted quantization parameter, the same quantization parameter also may be shared by the blocks in one quantization group.

As another example, when the current block is partitioned by quadtree partitioning one time and by multi-type tree partitioning two times, the current block may have a depth of 3 and a size of 16×16. When the depth information of the quantization group is 2, since the depth information of the quantization group is less than or equal to the depth of the current block, a delta quantization parameter for the first block among the blocks resulting from the multi-type tree partitioning at the depth of 2 may be signaled. The delta quantization parameter for the first block may be shared by the other blocks among the blocks resulting from the multi-type tree partitioning at the depth of 2. Since the blocks in one quantization group use the same predicted quantization parameter, the same quantization parameter also may be shared by the blocks in one quantization group.

As another example, when the current block is partitioned by quadtree partitioning three times and by ternary tree partitioning one time, the current block may have a depth of 4 and a size of 4×16. When the depth information of the quantization group is 2, since the depth information of the quantization group is less than or equal to the depth of the current block, a delta quantization parameter for the first block among the blocks resulting from the quadtree partitioning may be signaled. The delta quantization parameter of the first block may be shared by the other blocks among the blocks resulting from the binary tree partitioning at the depth of 2. Since the blocks in one quantization group use the same predicted quantization parameter, the same quantization parameter also may be shared by the blocks in one quantization group.

When the depth information of the current block is greater than the depth information of the quantization group, the depth information of the quantization group may be set as a basic unit on a basis of which encoding/decoding is performed. The size of the quantization group may be set using the depth information of the quantization group.

When the depth information of the current block is equal to or less than the depth information of the quantization group, the current block may be set as a basic unit on a basis of which encoding/decoding is performed. The size of the current block may be set as the size of the quantization group.

The current block may be partitioned in the order of by quadtree partitioning, binary tree partitioning, and ternary tree partitioning.

Here, the first block may mean the first block among the blocks of which the coding block flag is not a first value. Here, the first value may be 0.

Hereinafter, for a case where a CTU has a size of 128×128 and a log2_diff_cu_gp_delta_length which is the length information of a quantization group is 2, an embodiment in which a delta quantization parameter is signaled will be described in more detail. In this case, the size of the quantization group may be determined to be 32×32. That is, as shown in Table 3, the horizontal or vertical length of the quantization group may be determined to be 32, and the size of the quantization group may be determined to be 32×32.

TABLE 3

| log2_diff_cu_qp_delta_length | horizontal or vertical length of quantization group according to 256x256 CTU size | horizontal or vertical length of quantization group according to 128x128 CTU size | horizontal or vertical length of quantization group according to 64x64 CTU sizes |
|---|---|---|---|
| 0 | 256 | 128 | 64 |
| 1 | 128 | 64 | 32 |
| 2 | 64 | 32 | 16 |

TABLE 3-continued

| log2_diff_cu_qp_delta_length | horizontal or vertical length of quantization group according to 256x256 CTU size | horizontal or vertical length of quantization group according to 128x128 CTU size | horizontal or vertical length of quantization group according to 64x64 CTU sizes |
|---|---|---|---|
| 3 | 32 | 16 | 8 |
| 4 | 16 | 8 | 4 |

For example, when the size of the current block resulting from binary tree partitioning is 32×64, since the maximum length among the horizontal length and the vertical length of the current block is greater than the length of the quantization group, the delta quantization parameter for the current block may be signaled. In this case, the size of the quantization group may be set to the size of the current block.

As another example, when the size of the current block resulting from vertical ternary tree partitioning is 24×32, since the maximum length among the horizontal length and the vertical length of the current block is greater than the length of the quantization group, the delta quantization parameter for the current block may be signaled. In this case, the size of the quantization group may be set to the size of the current block. For an 8×32 block that is adjacent to the current block and that results from binary tree partitioning of the same parent node as the current block, a delta quantization parameter may not be signaled. The 8×32 block may use the delta quantization parameter of the current block as it is. That is, the quantization parameter may be shared by a 24×32 block and an 8×32 block. In another case, that is, for an 8×32 block that is adjacent to the current block and that results from binary tree partitioning of the same parent node as the current block, a delta quantization parameter may not be signaled. The delta quantization parameter for the 8×32 block may be determined on the basis of the delta quantization parameter of the current block.

As another example, when the size of the current block is 32×16, since the maximum length among the horizontal length and the vertical length of the current block is greater than the length of the quantization group, the delta quantization parameter for the current block may be signaled. In this case, the size of the quantization group may be set to the size of the current block. In this case, for a 32×16 block that is adjacent to the current block and that results from binary tree partitioning of the same parent node as the current block, a delta quantization parameter may not be signaled. The 32×16 block and the current block may share the same delta quantization parameter. That is, the quantization parameter may be shared by two blocks having a size of 32×16. In another case, that is, for a 32×16 block that is adjacent to the current block and that results from binary tree partitioning of the same parent node as the current block, a delta quantization parameter may not be signaled. The 32×16 block and the current block may share the same delta quantization parameter.

As another example, when the size of the current block that results from horizontal ternary tree partitioning is 16×64, since the maximum length among the horizontal length and the vertical length of the current block is greater than the length of the quantization group, the delta quantization parameter for the current block may be signaled. In this case, the size of the quantization group may be set to the size of the current block.

As another example, when the size of the current block that results from vertical ternary tree partitioning is 8×32, since the maximum length among the horizontal length and the vertical length of the current block is greater than the length of the quantization group, the delta quantization parameter for the current block may be signaled. In this case, the size of the quantization group may be set to the size of the current block. For an 8×32 block and a 16×32 block that are adjacent to the current block and that results from ternary tree partitioning of the same parent node as the current block, a delta quantization parameter may not be signaled. These blocks may share the delta quantization parameter of the current block. That is, the quantization parameter may be shared by two 8×32 blocks and one 16×32 block. In another case, that is, for a 16×32 block and an 8×32 block that are adjacent to the current block and that results from ternary tree partitioning of the same parent node as the current block, delta quantization parameters may not be signaled. The delta quantization parameters may be determined on the basis of the delta quantization parameter of the current block.

When the maximum length among the horizontal length and the vertical length of the current block is greater than the length of the quantization group, the size of the quantization group may be set to the size of the current block.

In addition, when the maximum length among the horizontal length and the vertical length of the current block is equal to the length of the quantization group, the size of the quantization group may be set according to the to the log2_diff_cu_qp_delta_length which is the length information of the quantization group.

In addition, when the maximum length among the horizontal length and the vertical length of the current block has a predetermined relationship with length of the quantization group, the size of the quantization group may be set according to the to the log2_diff_cu_qp_delta_length which is the length information of the quantization group. For example, the predetermined relationship may one of multiples of two.

Hereinafter, for a case where a CTU has a size of 128×128 and where diff_cu_qp_delta_area which is the area information of a quantization group is 3, an embodiment in which a delta quantization parameter is signaled will be described in more detail. As shown in Table 4, the area of a quantization group may be $2^{11}$.

TABLE 4

| diff_cu_qp_delta_depth | area of quantization group according to 256x256 CTU size | area of quantization group according to 128x128 CTU size | area of quantization group according to 64x64 CTU size |
|---|---|---|---|
| 0 | $2^{16}$ (=256*256) | $2^{14}$ | $2^{12}$ |
| 1 | $2^{15}$ | $2^{13}$ | $2^{11}$ |
| 2 | $2^{14}$ | $2^{12}$ | $2^{10}$ |
| 3 | $2^{13}$ | $2^{11}$ | $2^{9}$ |
| 4 | $2^{12}$ | $2^{10}$ | $2^{8}$ |
| 5 | $2^{11}$ | $2^{9}$ | $2^{7}$ |
| 6 | $2^{10}$ | $2^{8}$ | $2^{6}$ |
| 7 | $2^{9}$ | $2^{7}$ | $2^{5}$ |
| 8 | $2^{8}$ | $2^{6}$ | $2^{4}$ |
| 9 | $2^{7}$ | $2^{5}$ | |
| 10 | $2^{6}$ | $2^{4}$ | |
| 11 | $2^{5}$ | | |
| 12 | $2^{4}$ | | |

For example, when the size of the current block resulting from quadtree partitioning is 64×64, the area difference value diff_cur_block_area_minus4 of the current block may be 2. At this time, since the area difference value is less than or equal to the area information of the quantization group, the delta quantization parameter for the current block may be signaled. In this case, the size of the quantization group may be set to the size of the current block.

As another example, when the size of the current block resulting from quadtree partitioning is 32×32, the area difference value diff_cur_block_area_minus4 of the current block may be 4. At this time, since the area difference value is less than or equal to the area information of the quantization group, the delta quantization parameter for the first block among the blocks resulting from quadtree partitioning may be signaled. The other blocks may use the delta quantization parameter signaled from the first block. In this case, the size of the quantization group may be set to 64×64 which is the size of the parent block of the current block.

As another example, when the size of the current block resulting from binary tree partitioning is 32×64, the area difference value diff_cur_block_area_minus4 of the current block may be 3. At this time, since the area difference value is less than or equal to the area information of the quantization group, the delta quantization parameter for the current block may be signaled. In this case, the size of the quantization group may be set to the size of the current block.

As another example, when the size of the current block resulting from binary tree partitioning is 32×16, the area difference value diff_cur_block_area_minus4 of the current block may be 5. In this case, since the area difference value is greater than the area information of the quantization group, the delta quantization parameter for the first block among the blocks resulting from the binary tree partitioning may be signaled. The other blocks may share the delta quantization parameter of the first block. In this case, the size of the quantization group is 32×32 which is the size of the first parent block of the current block. That is, the size of the quantization group is larger than the area information of the quantization group. Thus, the size of the quantization group may be set to 64×64 which is the second parent block.

As another example, when the size of the current block resulting from ternary tree partitioning is 16×64, the area difference value diff_cur_block_area_minus4 of the current block may be 4. In this case, since the area difference value is greater than the area information of the quantization group, when the current block is the first block among the blocks resulting from the ternary tree partitioning, the delta quantization parameter may be signaled. The other blocks having a size of 16×64 may use the delta quantization parameter of the first block. In the case of the middle block having a size of 32×64, the area difference value of the middle block is 3. That is, the area difference value is smaller than or equal to the area information of the quantization group. However, since whether to signal the delta quantization parameter for the middle block is determined on the basis of information of whether the delta quantization parameter for the first block among the blocks resulting from the ternary tree partitioning is signaled, the delta quantization parameter for the middle block may not be signaled, and the delta quantization parameter for another block within the same quantization group may be shared.

As another example, when the size of the current block resulting from ternary tree partitioning is 64×32, the area difference value diff_cur_block_area_minus4 of the current block may be 3. In this case, since the area difference value is less than or equal to the area information of the quantization group, the delta quantization parameter for the current block may be signaled. In this case, the size of the quantization group may be set to the size of the current block.

When the area information of the current block is less than the area information of the quantization group, the current block may be set as a basic unit on a basis of which encoding/decoding is performed. The size of the current block may be set as the size of the quantization group.

The current block may be partitioned by quadtree partitioning, by binary tree partitioning, and ternary tree partitioning in this order.

Here, the first block may mean the first block among the blocks of which the coding block flag is not a first value. Here, the first value may be 0.

Hereinafter, for a case where a CTU has a size of 128×128 and where diff_cu_qp_delta_subdiv which is the subdivision information of a quantization group is 3, an embodiment in which a delta quantization parameter is signaled will be described in more detail. In this embodiment, the subdivision value cbSubdiv of a current block to be encoded/decoded may be used.

For example, when the size of the current block resulting from quadtree partitioning is 64×64, the subdivision value cbSubdiv of the current block may be 2. In this case, since the subdivision value of the current block is less than or equal to the subdivision information of the quantization group, the delta quantization parameter for the current block may be signaled. In this case, the size of the quantization group may be set to the size of the current block.

As another example, when the size of the current block resulting from quadtree partitioning is 32×32, the subdivision value cbSubdiv of the current block may be 4. In this case, since the subdivision value is greater than the subdivision information of the quantization group, the delta quantization parameter for the first block among the blocks resulting from the quadtree partitioning may be signaled. The other blocks may use the delta quantization parameter signaled from the first block. In this case, the size of the quantization group may be set to 64×64 which is the size of the parent block of the current block.

As another example, when the size of the current block resulting from binary tree partitioning is 32×64, the subdivision value cbSubdiv of the current block may be 3. In this case, since the subdivision value is equal to the subdivision information of the quantization group, the delta quantization parameter for the current block may be signaled. In this case, the size of the quantization group may be set to the size of the current block.

As another example, when the size of the current block resulting from binary tree partitioning is 32×16, the subdivision value cbSubdiv of the current block may be 5. In this case, since the subdivision value is greater than the subdivision information of the quantization group, the delta quantization parameter for the first block among the blocks resulting from the binary tree partitioning may be signaled. The other blocks may share the delta quantization parameter of the first block. In this case, the size of the quantization group is 32×32 which is the size of the first parent block of the current block. That is, the size of the quantization group is larger than the area information of the quantization group. Thus, the size of the quantization group may be set to 64×64, which is the second parent block.

As another example, when the size of the current block resulting from ternary tree partitioning is 16×64, the subdivision value cbSubdiv of the current block may be 4. In this case, since the subdivision value is greater than the subdivision information of the quantization group, when the current block is the first block among the blocks resulting from the ternary tree partitioning, the delta quantization parameter may be signaled. The other blocks having a size of 16×64 may use the delta quantization parameter of the first block. In the case of the middle block, it has a size of 32×64. Therefore, the subdivision value of the middle block is 3. That is, the subdivision value of the middle block is smaller than or equal to the subdivision information of the quantization group. However, since whether to signal the delta quantization parameter for the middle block is determined on the basis of information of whether the delta quantization parameter for the first block among the blocks resulting from the ternary tree partitioning is signaled, the delta quantization parameter for the middle block may not be signaled, and the delta quantization parameter for another block within the same quantization group may be shared.

As another example, when the size of the current block resulting from ternary tree partitioning is 64×32, the subdivision value cbSubdiv of the current block may be 3. In this case, since the subdivision value of the current block is less than or equal to the subdivision information of the quantization group, the delta quantization parameter for the current block may be signaled. In this case, the size of the quantization group may be set to the size of the current block.

When the subdivision information of the current block is less than the subdivision information of the quantization group, the current block may be set as a basic unit on a basis of which encoding/decoding is performed. The size of the current block may be set as the size of the quantization group.

The current block may be partitioned in the order of by quadtree partitioning, binary tree partitioning, and ternary tree partitioning.

Here, the first block may mean the first block among the blocks of which the coding block flag is not a first value. Here, the first value may be 0.

Figure 15:
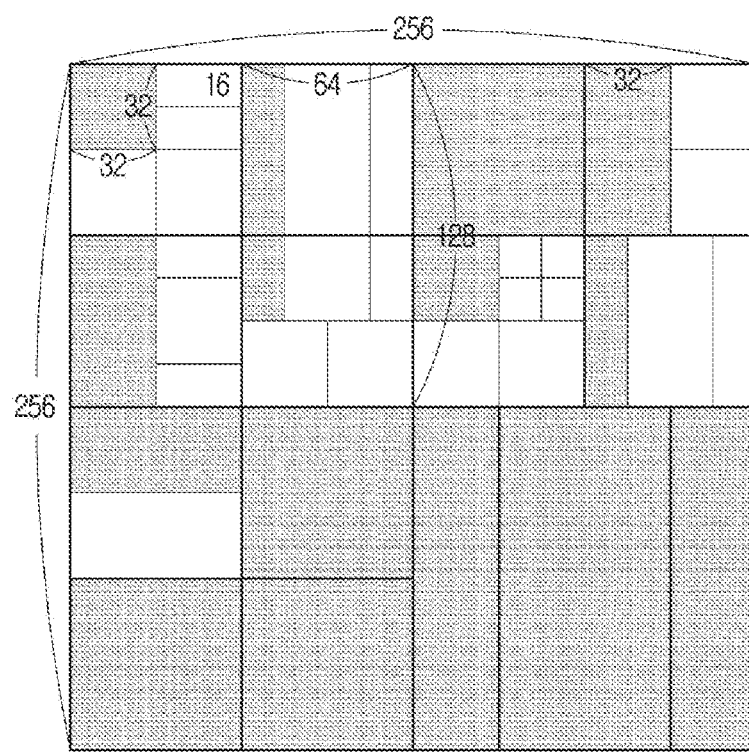
FIG. 15 is a diagram illustrating blocks for each of which a delta quantization parameter is signaled and various quantization groups that can be set when a CTU has a 256×256 size and a diff_cu_qp_delta_depth is 2.

FIG. 15 is a diagram illustrating blocks for each of which a delta quantization parameter is signaled and various quantization groups that can be set when a CTU has a 256×256 size and a diff_cu_qp_delta_depth is 2. Referring to FIG. 15, each block for which a delta quantization parameter is signaled is displayed in grey, and each quantization group is demarcated by a bold solid line.

Figure 16:
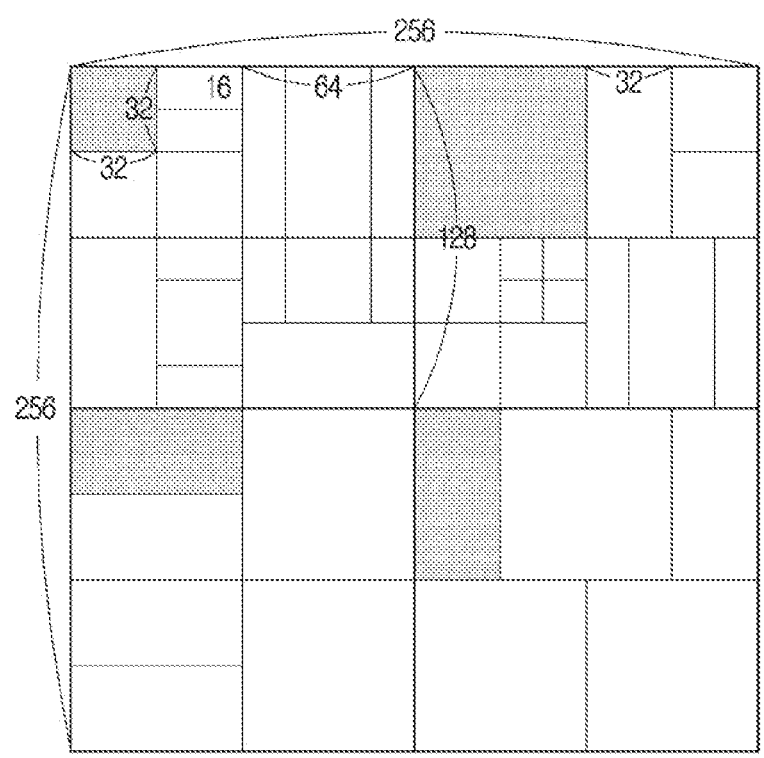
FIG. 16 is a diagram illustrating blocks for each of which a delta quantization parameter is signaled and various quantization groups that can be set when a CTU has a 256×256 size and a log2_diff_cu_qp_delta_length is 1.

FIG. 16 is a diagram illustrating blocks for each of which a delta quantization parameter is signaled and various quantization groups that can be set when a CTU has a 256×256 size and a log2_diff_cu_qp_delta_length is 1. Referring to FIG. 16, each block for which a delta quantization parameter is signaled is colored gray, and each quantization group is demarcated by a bold solid line.

Figure 17:
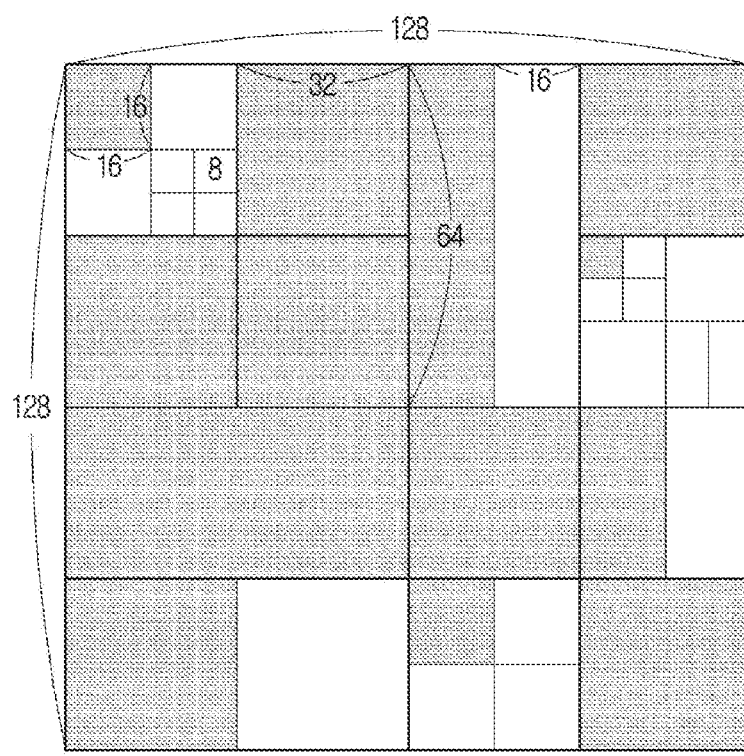
FIG. 17 is a diagram illustrating blocks for each of which a delta quantization parameter is signaled and various sizes of quantization groups that can be set when a CTU has a 128×128 size and a diff_cu_qp_delta_depth is 2.

FIG. 17 is a diagram illustrating blocks for each of which a delta quantization parameter is signaled and various quantization groups that can be set when a CTU has a 128×128 size and a diff_cu_qp_delta_depth is 2. Referring to FIG. 17, each block for which a delta quantization parameter is signaled is colored gray, and each quantization group is demarcated by a bold solid line.

Figure 18:
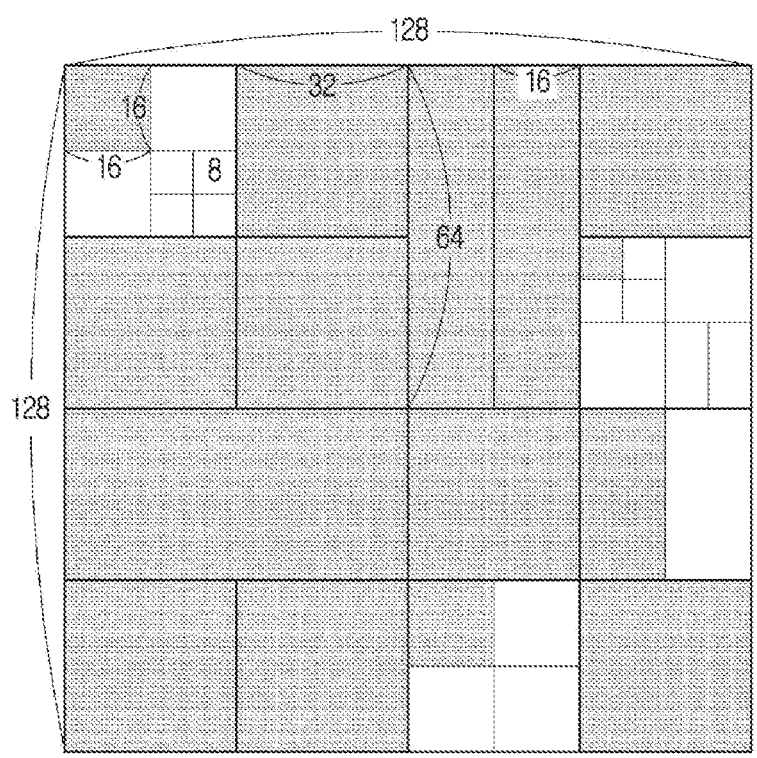
FIG. 18 is a diagram illustrating blocks for each of which a delta quantization parameter is signaled and various quantization groups that can be set when a CTU has a 128×128 size and a log2_diff_cu_qp_delta_length is 2.

FIG. 18 is a diagram illustrating blocks for each of which a delta quantization parameter is signaled and various quantization groups that can be set when a CTU has a 128×128 size and a log2_diff_cu_gp_delta_length is 2. Referring to FIG. 18, each block for which a delta quantization parameter is signaled is colored gray, and each quantization group is demarcated by a bold solid line.

Figure 19:
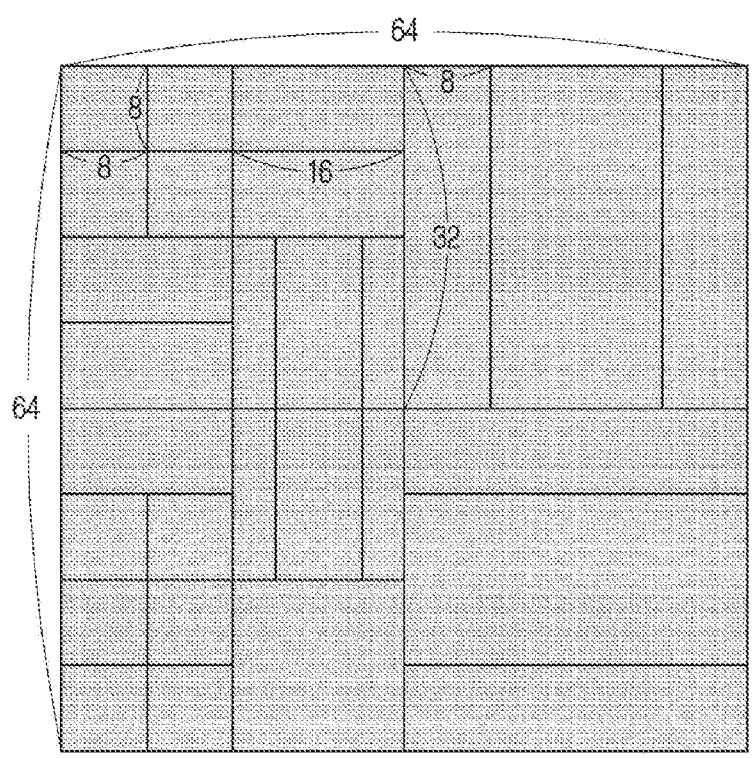
FIG. 19 is a diagram illustrating blocks for each of which a delta quantization parameter is signaled and various quantization groups that can be set when a CTU has a 64×64 size and a log2_diff_cu_qp_delta_length is 3.

FIG. 19 is a diagram illustrating blocks for each of which a delta quantization parameter is signaled and various quantization groups that can be set when a CTU has a 64×64 size and a log2_diff_cu_qp_delta_length is 3. Referring to FIG.

19, each block for which a delta quantization parameter is signaled is displayed in grey, and each quantization group is demarcated by a bold solid line.

Figure 20:
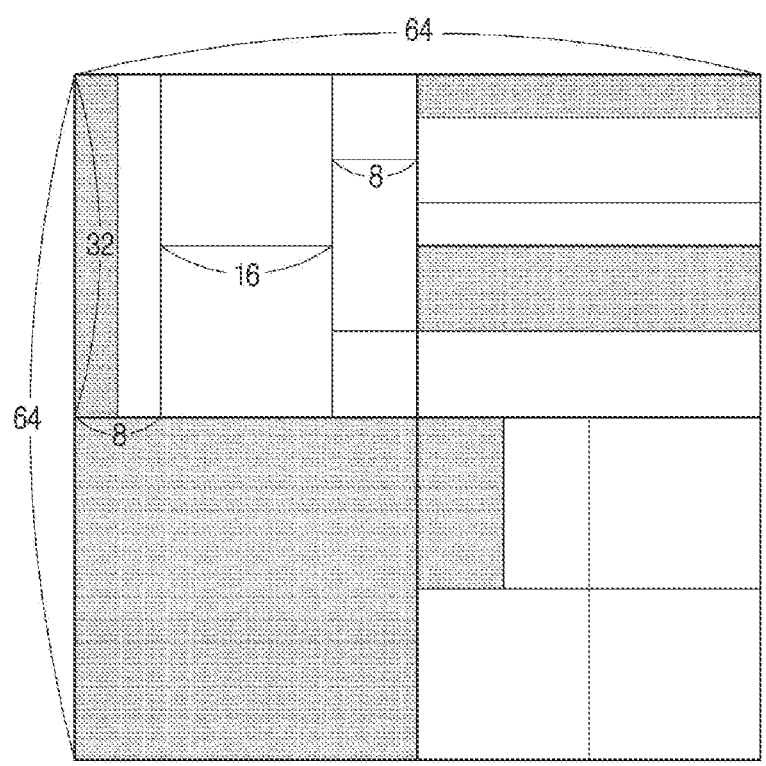
FIG. 20 is a diagram illustrating blocks for each of which a delta quantization parameter is signaled and various quantization groups that can be set when a CTU has a 64×64 size and a diff_cu_qp_delta_area is 3.

FIG. 20 is a diagram illustrating blocks for each of which a delta quantization parameter is signaled and various quantization groups that can be set when a CTU has a 64×64 size and a diff_cu_qp_delta_area is 3. Referring to FIG. 20, each block for which a delta quantization parameter is signaled is displayed in grey, and each quantization group is demarcated by a bold solid line.

Figure 21:
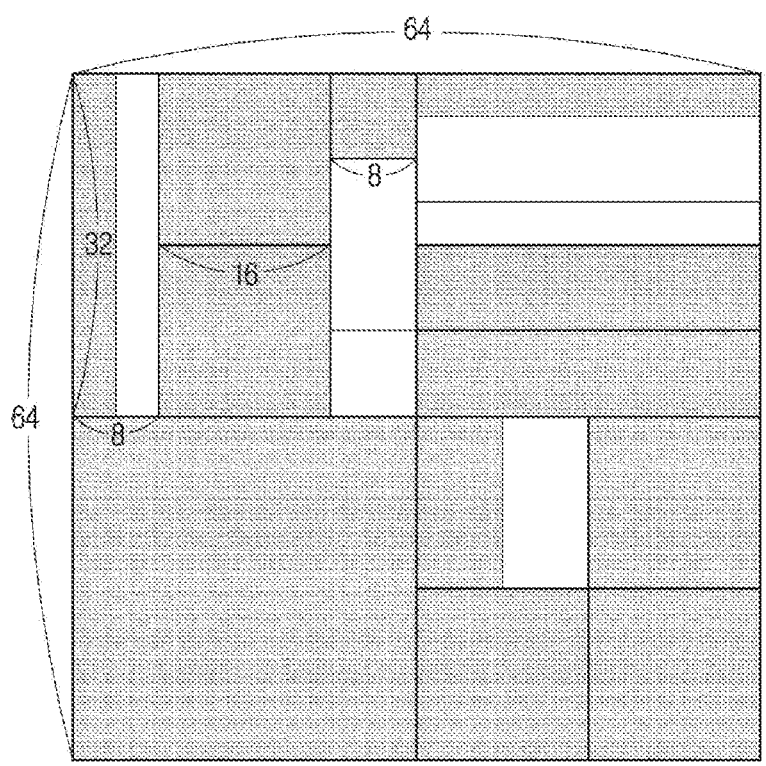
FIG. 21 is a diagram illustrating blocks for each of which a delta quantization parameter is signaled and various quantization groups that can be set when a CTU has a 64×64 size and a diff_cu_qp_delta_area is 4.

FIG. 21 is a diagram illustrating blocks for each of which a delta quantization parameter is signaled and various quantization groups that can be set when a CTU has a 64×64 size and a diff_cu_qp_delta_area is 4. Referring to FIG. 21, each block for which a delta quantization parameter is signaled is displayed in grey, and each quantization group is demarcated by a bold solid line.

Figure 22:
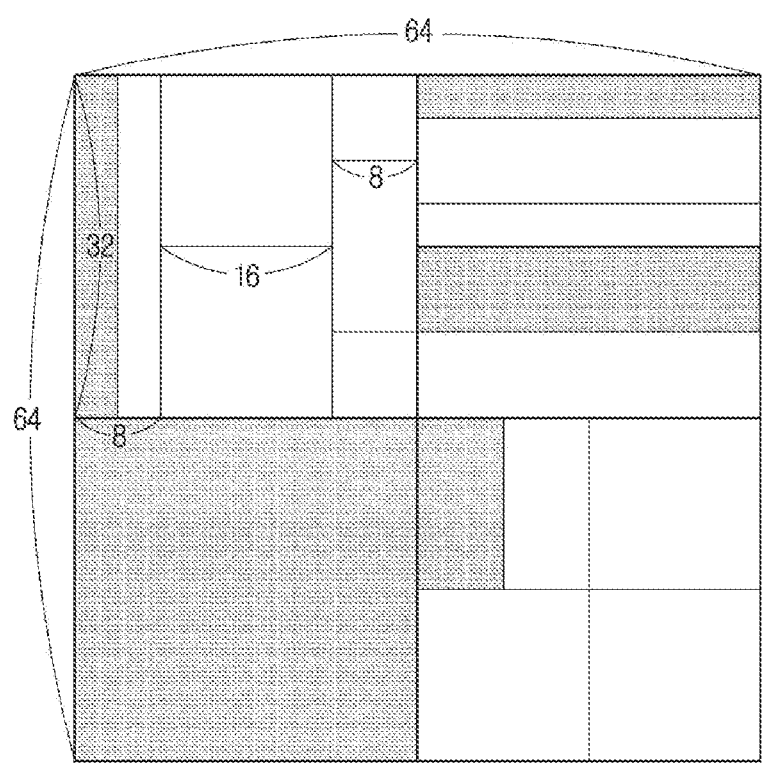
FIG. 22 is a diagram illustrating blocks for each of which a delta quantization parameter is signaled and various quantization groups that can be set when a CTU has a 64×64 size and a cu_qp_delta_subdiv is 3.

FIG. 22 is a diagram illustrating blocks for each of which a delta quantization parameter is signaled and various quantization groups that can be set when a CTU has a 64×64 size and a cu_qp_delta_subdiv is 3. Referring to FIG. 22, each block for which a delta quantization parameter is signaled is displayed in grey, and each quantization group is demarcated by a bold solid line.

Figure 23:
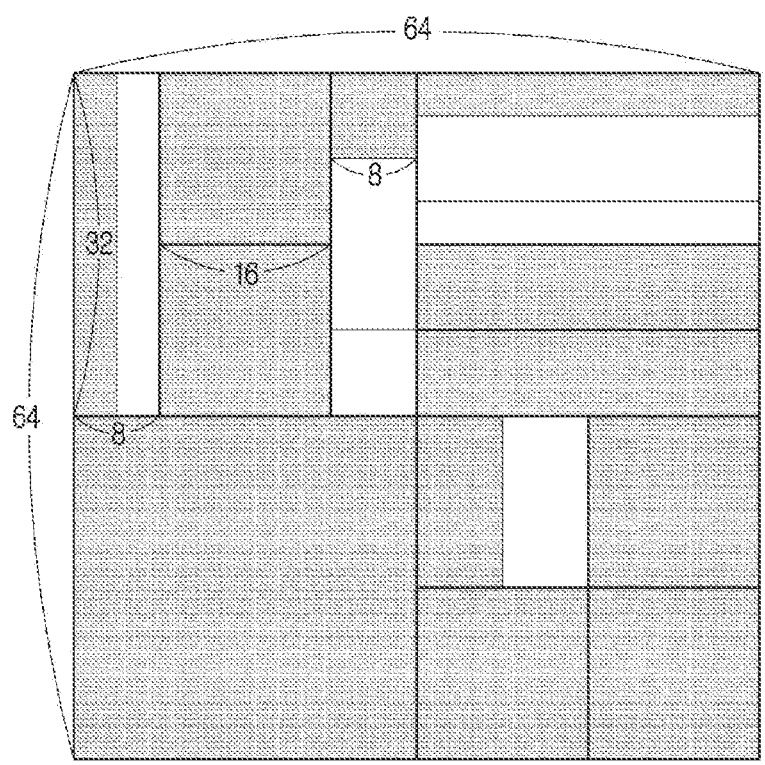
FIG. 23 is a diagram illustrating blocks for each of which a delta quantization parameter is signaled and various quantization groups that can be set when a CTU has a 64×64 size and a cu_qp_delta_subdiv is 4.

FIG. 23 is a diagram illustrating blocks for each of which a delta quantization parameter is signaled and various quantization groups that can be set when a CTU has a 64×64 size and a cu_gp_delta_subdiv is 4. Referring to FIG. 23, each block for which a delta quantization parameter is signaled is displayed in grey, and each quantization group is demarcated by a bold solid line.

Figure 24:
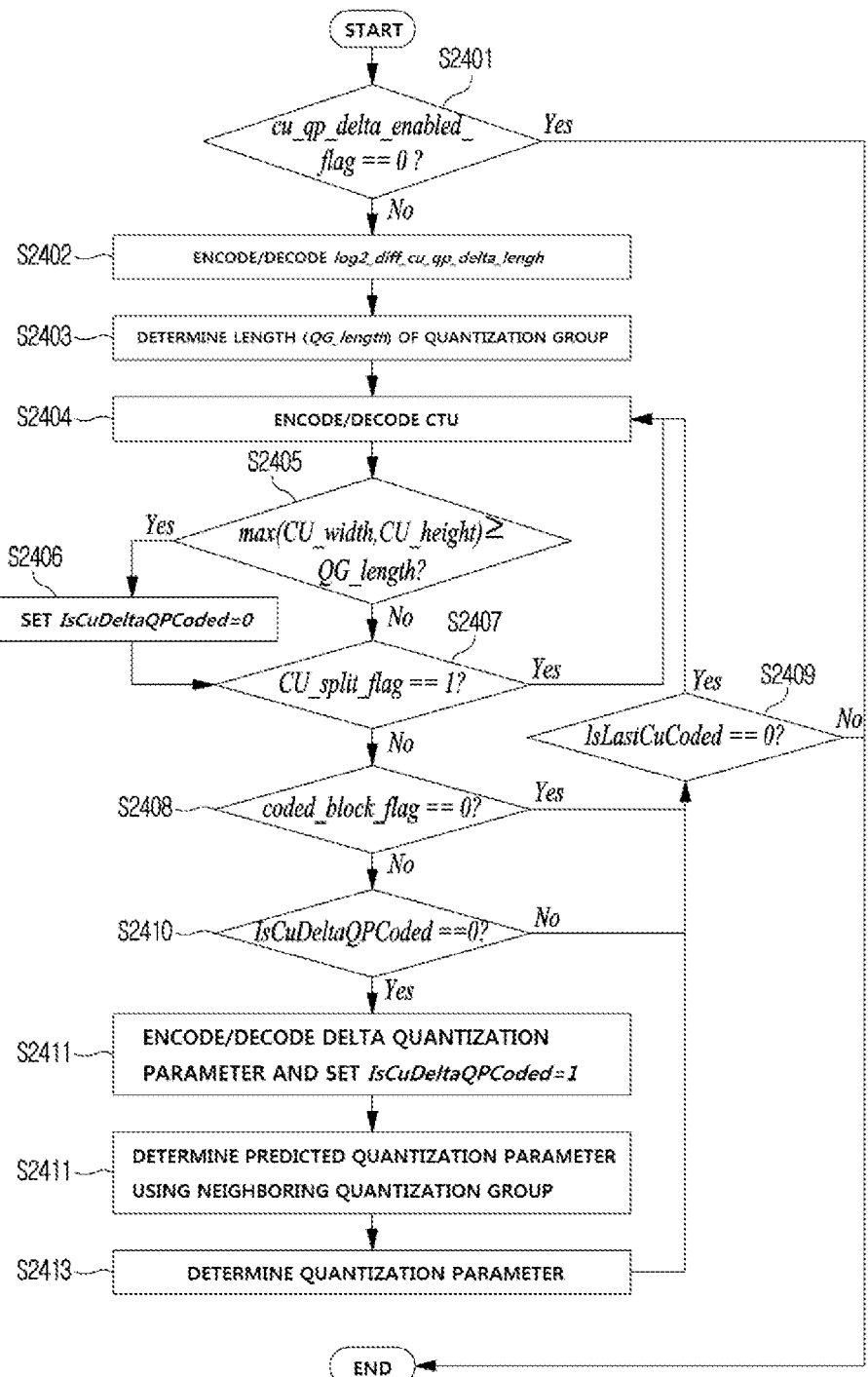
FIG. 24 is a diagram illustrating a method of determining a quantization parameter, using length information of a quantization group according to one embodiment of the present invention.

FIG. 24 is a diagram illustrating a method of determining a quantization parameter, using length information of a quantization group according to one embodiment of the present invention.

In step S2401, cu_qp_delta_enabled_flag may be entropy-coded/entropy-decoded. When the cu_qp_delta_enabled_flag is a first value (Yes in FIG. 24), a delta quantization parameter may not be entropy-coded/entropy-decoded. On the other hand, when the cu_qp_delta_enabled_flag is a second value (No in FIG. 24), a delta quantization parameter may be entropy-coded/entropy-decoded.

When the cu_qp_delta_enabled_flag is the second value, log2_diff_cu_qp_delta_length which is the length information of a quantization group may be entropy-coded/entropy-decoded in step S2402.

Accordingly, in step S2403, at least one of the length (QG_length) of the quantization group and the size of the quantization group may be determined on the basis of the log2_diff_cu_qp_delta_length which is the length information of the quantization group.

In step S2401, encoding/decoding on a CTU may be performed. In this step, the CTU may be recursively partitioned into coding units (CUs) and may be CU by CU. Here, the CU may mean at least one of a prediction unit (PU), a transform unit (TU), and a block. In this step, IsCuDeltaQPCoded may be set to a second value.

When the maximum length (maximum value) among the horizontal length (CU width) and the vertical length (CU_height) of the current block is equal to or greater than the length of the quantization group in step S2405, the IsCuDeltaQPCoded may be set to the first value in step S2406.

In step S2407, when a CU_split_flag is entropy-coded/entropy-decoded into the second value (Yes in FIG. 24), the CTU can be recursively partitioned into CUs. When the CU_split_flag is entropy-coded/entropy-decoded into the first value (No in FIG. 24) in step S2407, a coding block flag coded_block_flag may be entropy-coded/entropy-decoded.

When the coding block flag is the first value (Yes in FIG. 24) in step S2408, the delta quantization parameter may not be entropy-coded/entropy-decoded. In step S2409, a flag (IsLastCuCoded) indicating whether or not the last CU in the CTU has been encoded/decoded may be checked.

When the IsLastCuCoded is the second value (No in FIG. 24) in step S2409, since the last CU has been encoded/decoded, the entropy-coding/entropy-decoding on the delta quantization parameter ends. When the IsLastCuCoded is the first value (Yes in FIG. 24), the next target CU is encoded/decoded.

In step S2408, when the coding block flag is the second value (No in FIG. 24), whether IsCuDeltaQPCoded is set to the first value or the second value may be checked.

In step S2410, when the IsCuDeltaQPCoded is set to the second value (No in FIG. 24), the flag (IsLastCuCoded) indicating whether or not the last CU in the CTU has been encoded/decoded may be checked.

When the IsCuDeltaQPCoded is set to the first value (Yes in FIG. 24) in step S2410, the delta quantization parameter may be entropy-coded/entropy-decoded in step S2411, and then the IsCuDeltaQPCoded may be set to the second value.

In step S2412, a predicted quantization parameter may be determined using neighboring quantization groups.

In step S2413, the delta quantization parameter and the predicted quantization parameter are added to determine the quantization parameter.

In step S2409, the flag (IsLastCuCoded) indicating whether the last CU in the CTU has been encoded/decoded may be checked.

Here, the IsCuDeltaQPCoded may be set for each block or each quantization group. At this time, it is possible to check whether the delta quantization parameter is entropy-coded/entropy-decoded for each block or for each quantization group by using a flag such as IsCuDeltaQPCoded or a variable.

In the embodiment described above, the first value may be 0 and the second value may be 1. Conversely, the first value may be 1 and the second value may be 0.

Figure 25:
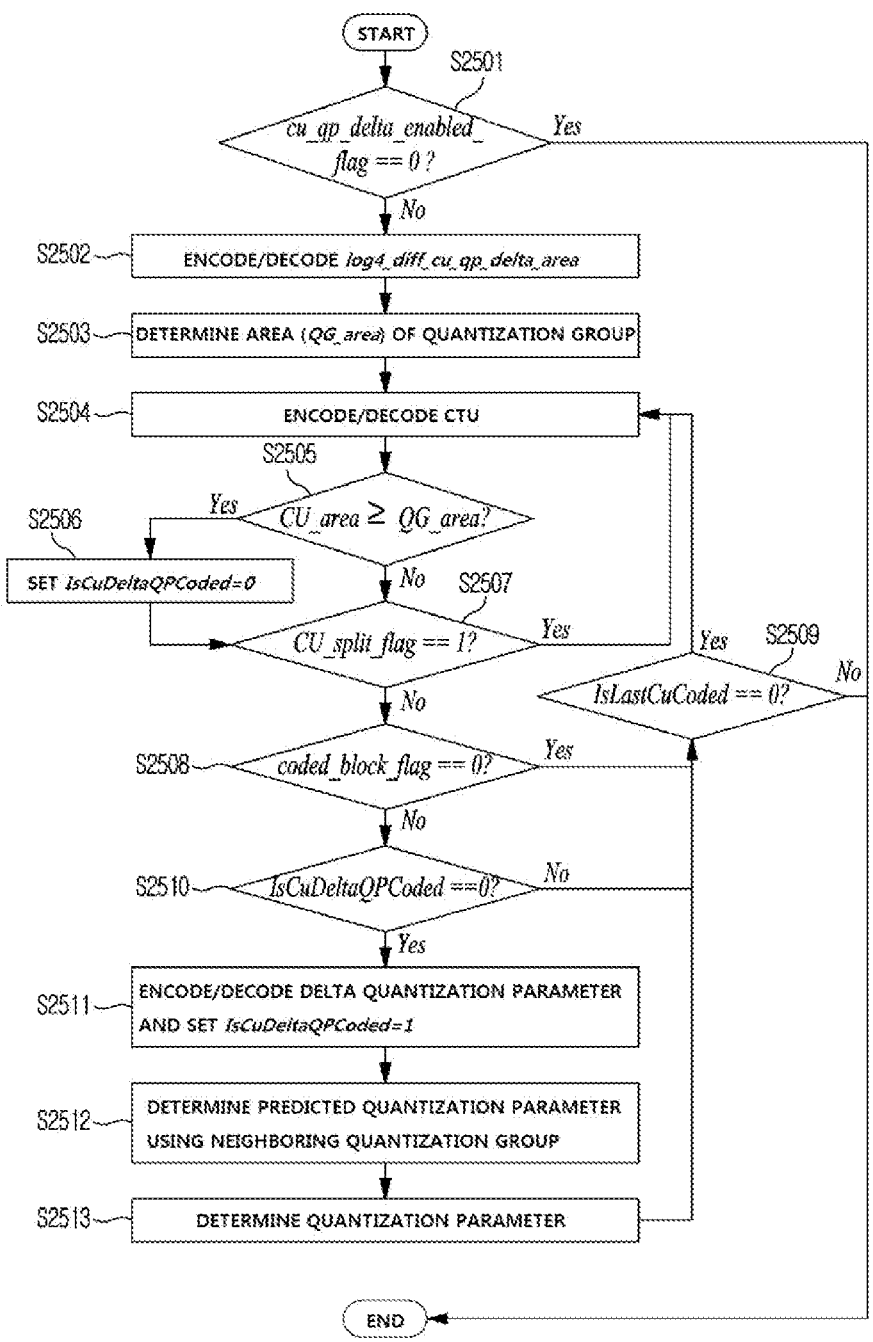
FIG. 25 is a diagram illustrating a method of determining a quantization parameter, using area information of a quantization group according to one embodiment of the present invention.

FIG. 25 is a diagram illustrating a method of determining a quantization parameter, using area information of a quantization group according to one embodiment of the present invention.

In step S2501, cu_qp_delta_enabled_flag may be entropy-coded/entropy-decoded. When the cu_qp_delta_enabled_flag is a first value (Yes in FIG. 25), a delta quantization parameter may not be entropy-coded/entropy-decoded. On the other hand, when the cu_qp_delta_enabled_flag is a second value (No in FIG. 25), a delta quantization parameter may be entropy-coded/entropy-decoded.

When the cu_qp_delta_enabled_flag is the second value, log4_diff_cu_qp_delta_area which is the area information of a quantization group may be entropy-coded/entropy-decoded in step S2502.

Accordingly, in step S2503, at least one of the area (QG_area) of the quantization group and the size of the quantization group may be determined on the basis of the area information of the quantization group, i.e., at least one of the diff_cu_qp_delta_area and the log4_diff_cu_qp_delta_area.

In step S2504, encoding/decoding on a CTU may be performed. In this step, the CTU may be recursively partitioned into coding units (CUs) and then encoded/decoded CU by CU. Here, the CU may mean at least one of a prediction unit (PU), a transform unit (TU), and a block. In this step, IsCuDeltaQPCoded may be set to a second value.

In step S2505, when the area CU_area of the current block is equal to or larger than the area of the quantization group, the IsCuDeltaQPCoded can be set to the first value in step S2506.

In step S2507, when a CU_split_flag is entropy-coded/entropy-decoded into the second value (Yes in FIG. 25), the CTU may be recursively partitioned into CUs. When the CU_split_flag is entropy-coded/entropy-decoded into the first value (No in FIG. 25) in step S2507, a coding block flag coded_block_flag may be entropy-coded/entropy-decoded.

When the coding block flag is the first value (Yes in FIG. 25) in step S2508, the delta quantization parameter may not be entropy-coded/entropy-decoded. In step S2509, a flag (IsLastCuCoded) indicating whether or not the last CU in the CTU has been encoded/decoded may be checked.

When the IsLastCuCoded is the second value (No in FIG. 25) in step S2509, since the last CU has been encoded/decoded, the entropy-coding/entropy-decoding on the delta quantization parameter ends. When the IsLastCuCoded is the first value (Yes in FIG. 25), the next target CU is encoded/decoded.

In step S2508, when the coding block flag is the second value (No in FIG. 25), whether IsCuDeltaQPCoded is set to the first value or the second value may be checked.

In step S2510, when the IsCuDeltaQPCoded is set to the second value (No in FIG. 25), the flag IsLastCuCoded indicating whether or not the last CU in the CTU has been encoded/decoded may be checked.

When the IsCuDeltaQPCoded is set to the first value (Yes in FIG. 25) in step S2510, the delta quantization parameter may be entropy-coded/entropy-decoded in step S2511, and then the IsCuDeltaQPCoded may be set to the second value.

In step S2512, a predicted quantization parameter may be determined using neighboring quantization groups.

In step S2513, the delta quantization parameter and the predicted quantization parameter may be added to determine the quantization parameter.

In step S2509, the flag IsLastCuCoded indicating whether the last CU in the CTU has been encoded/decoded may be checked.

Here, the IsCuDeltaQPCoded may be set for each block or each quantization group. At this time, it is possible to check whether the delta quantization parameter is entropy-coded/entropy-decoded for each block or for each quantization group by using a flag such as IsCuDeltaQPCoded or a variable.

In the embodiment described above, the first value may be 0 and the second value may be 1. Conversely, the first value may be 1 and the second value may be 0.

Figure 26:
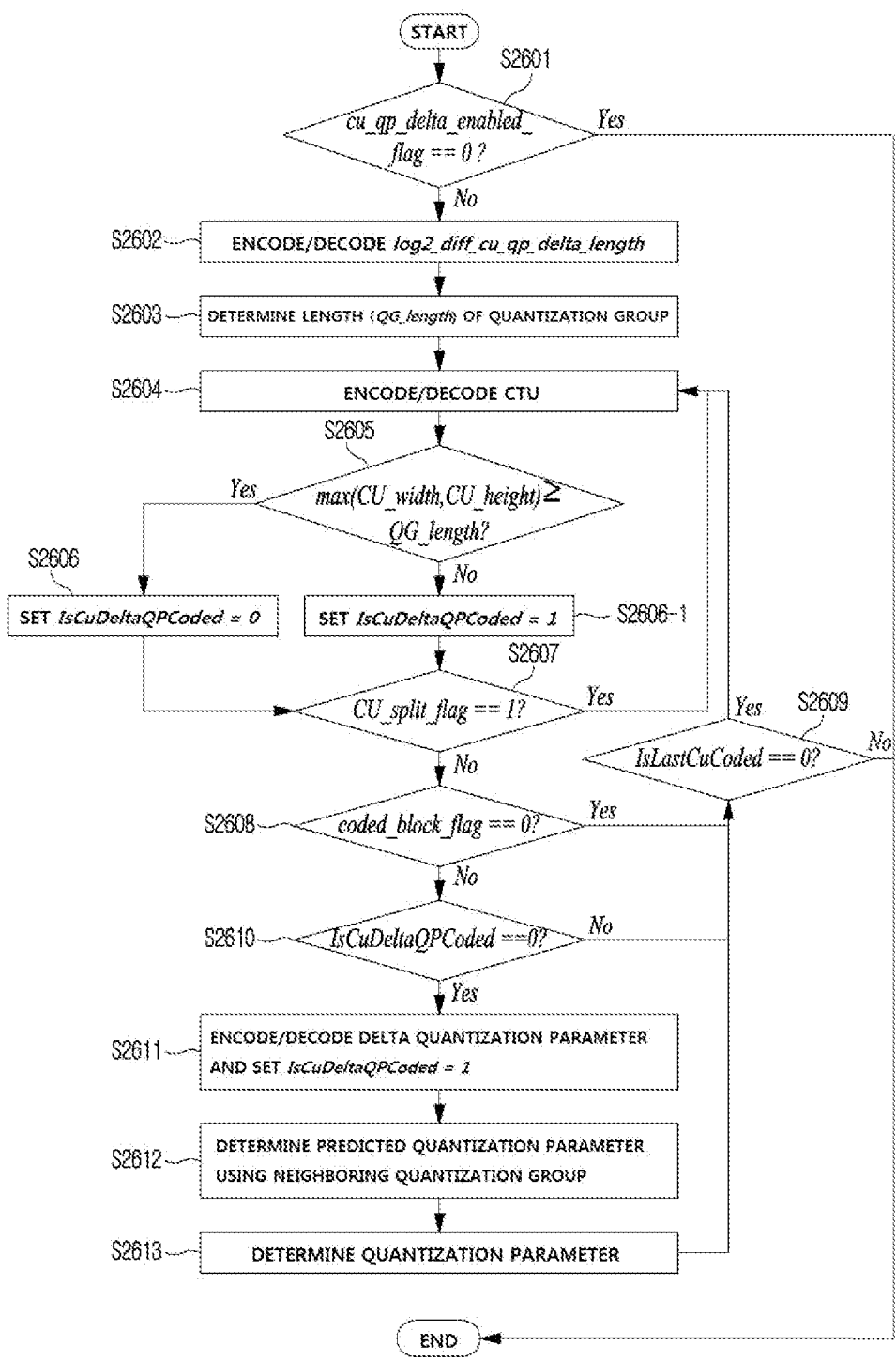
FIG. 26 is a diagram illustrating a method of determining a quantization parameter, using length information of a quantization group according to another embodiment of the present invention.

FIG. 26 is a diagram illustrating a method of determining a quantization parameter, using length information of a quantization group according to another embodiment of the present invention.

In step S2601, a flag cu_gp_delta_enabled_flag may be entropy-coded/entropy-decoded. When the cu_qp_delta_enabled_flag is a first value (Yes in FIG. 26), a delta quantization parameter may not be entropy-coded/entropy-decoded. On the other hand, when the cu_qp_delta_enabled_flag is a second value (No in FIG. 26), a delta quantization parameter may be entropy-coded/entropy-decoded.

When the cu_qp_delta_enabled_flag is the second value, log2diff_cu_qp_delta_length which is the length information of a quantization group may be entropy-coded/entropy-decoded in step S2602.

Accordingly, in step S2603, at least one of the length (QG_length) of the quantization group and the size of the quantization group may be determined on the basis of the log2_diff_cu_qp_delta_length which is the length information of the quantization group.

In step S2604, encoding/decoding on a CTU may be performed. In this step, the CTU may be recursively partitioned into coding units (CUs) and then encoded/decoded CU by CU. Here, the CU may mean at least one of a prediction unit (PU), a transform unit (TU), and a block. In this step, IsCuDeltaQPCoded may be set to a second value.

When the maximum length (maximum value) among the horizontal length (CU width) and the vertical length (CU_height) of the current block is equal to or greater than the length of the quantization group in step S2605, the IsCuDeltaQPCoded may be set to the first value in step S2606.

When the maximum length (maximum value) among the horizontal length (CU width) and the vertical length (CU_height) of the current block is less than the length of the quantization group in step S2605, the IsCuDeltaQP-Coded may be set to the second value in step S2606.

In step S2607, when a CU_split_flag is entropy-coded/entropy-decoded into the second value (Yes in FIG. 26), the CTU may be recursively partitioned into CUs. When the CU_split_flag is entropy-coded/entropy-decoded into the first value (No in FIG. 26) in step S2607, a coding block flag coded_block_flag may be entropy-coded/entropy-decoded.

When the coding block flag is the first value (Yes in FIG. 26) in step S2608, the delta quantization parameter may not be entropy-coded/entropy-decoded. In step S2609, a flag (IsLastCuCoded) indicating whether or not the last CU in the CTU has been encoded/decoded may be checked.

When the IsLastCuCoded is the second value (No in FIG. 26) in step S2609, since the last CU has been encoded/decoded, the entropy-coding/entropy-decoding on the delta quantization parameter ends. When the IsLastCuCoded is the first value (Yes in FIG. 26), the next target CU is encoded/decoded.

In step S2608, when the coding block flag is the second value (No in FIG. 26), whether the IsCuDeltaQPCoded is set to the first value or the second value may be checked.

In step S2610, when the IsCuDeltaQPCoded is set to the second value (No in FIG. 26), the flag IsLastCuCoded indicating whether or not the last CU in the CTU has been encoded/decoded may be checked.

When the IsCuDeltaQPCoded is set to the first value (Yes in FIG. 26) in step S2610, the delta quantization parameter may be entropy-coded/entropy-decoded in step S2611, and then the IsCuDeltaQPCoded may be set to the second value.

In step S2612, a predicted quantization parameter may be determined using neighboring quantization groups.

In step S2613, the delta quantization parameter and the predicted quantization parameter may be added to determine the quantization parameter.

In step S2609, the flag IsLastCuCoded indicating whether the last CU in the CTU has been encoded/decoded may be checked.

Here, the IsCuDeltaQPCoded may be set for each block or each quantization group. At this time, it is possible to check whether the delta quantization parameter is entropy-coded/entropy-decoded for each block or for each quantization group by using a flag such as IsCuDeltaQPCoded or a variable.

In the embodiment described above, the first value may be 0 and the second value may be 1. Conversely, the first value may be 1 and the second value may be 0.

Figure 27:
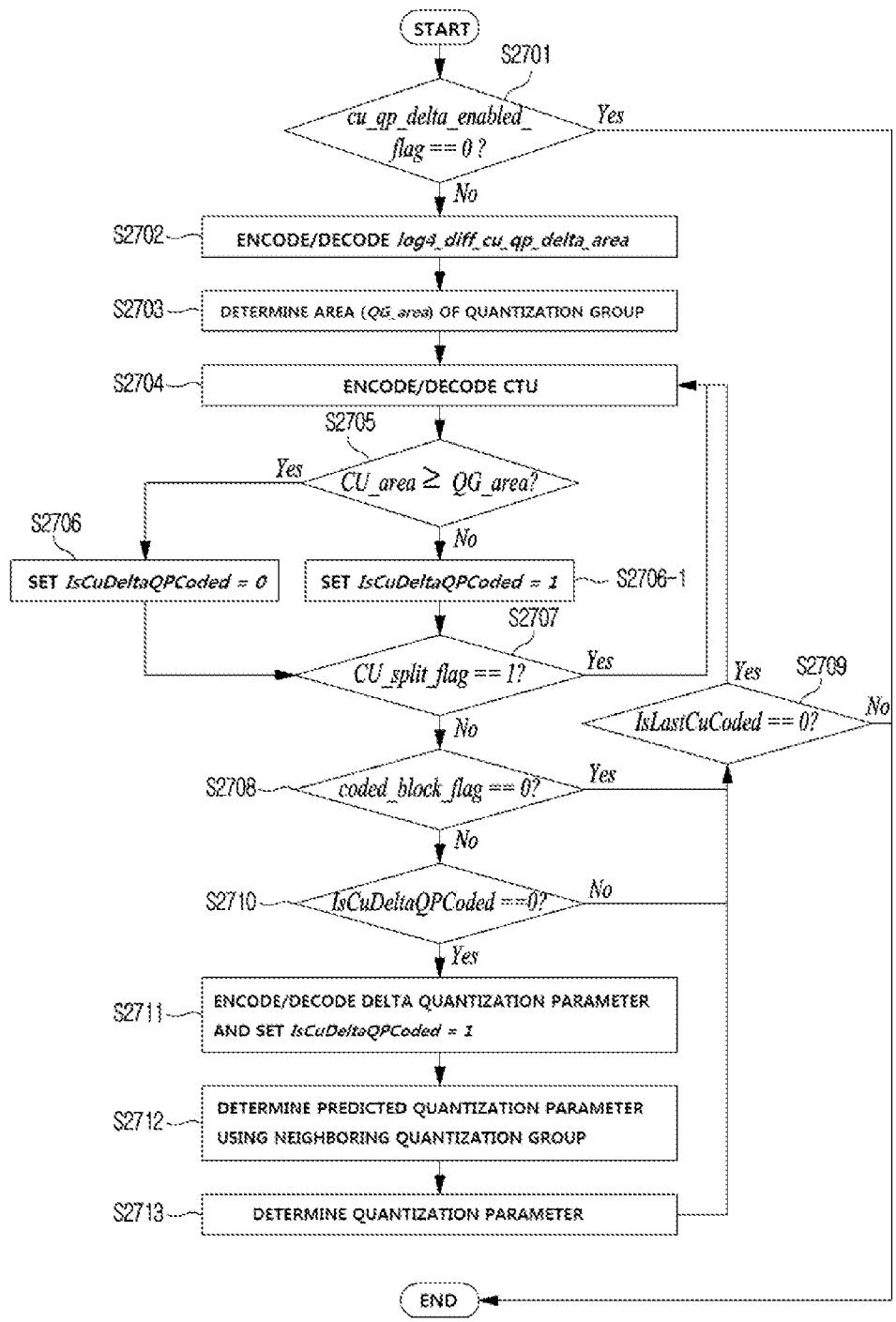
FIG. 27 is a diagram illustrating a method of determining a quantization parameter, using area information of a quantization group according to a further embodiment of the present invention.

FIG. 27 is a diagram illustrating a method of determining a quantization parameter, using area information of a quantization group according to a further embodiment of the present invention.

In step S2701, a flag cu_gp_delta_enabled_flag may be entropy-coded/entropy-decoded. When the cu_qp_delta_enabled_flag is a first value (Yes in FIG. 27), a delta quantization parameter may not be entropy-coded/entropy-decoded. On the other hand, when the cu_qp_delta_enabled_flag is a second value (No in FIG. 27), a delta quantization parameter may be entropy-coded/entropy-decoded.

When the cu_qp_delta_enabled_flag is the second value, log4_diff_cu_qp_delta_area which is the area information of a quantization group may be entropy-coded/entropy-decoded in step S2702.

Accordingly, in step S2703, at least one of the area (QG_area) of the quantization group and the size of the quantization group may be determined on the basis of the area information of the quantization group, i.e., at least one the of diff_cu_qp_delta_area and the log4_diff_cu_qp_delta_area. FIG. 25 is a diagram log4_diff_cu_qp_delta_area used as an example of the area information of a quantization group, and FIG. 27 illustrates diff_cu_qp_delta_area as another example of the area information.

In step S2704, encoding/decoding on a CTU may be performed. In this step, the CTU may be recursively partitioned into coding units (CUs) and then encoded/decoded CU by CU. Here, the CU may mean at least one of a prediction unit (PU), a transform unit (TU), and a block. In this step, IsCuDeltaQPCoded may be set to a second value.

In step S2705, when the area CU_area of the current block is equal to or larger than the area of the quantization group, the IsCuDeltaQPCoded may be set to the first value in step S2706.

In step S2705, when the area CU_area of the current block is smaller than the area of the quantization group, the IsCuDeltaQPCoded may be set to the second value in step S2706.

In step S2707, when a CU_split_flag is entropy-coded/entropy-decoded into the second value (Yes in FIG. 27), the CTU may be recursively partitioned into CUs. When the CU_split_flag is entropy-coded/entropy-decoded into the first value (No in FIG. 27) in step S2707, a coding block flag coded_block_flag may be entropy-coded/entropy-decoded.

When the coding block flag is the first value (Yes in FIG. 27) in step S2708, the delta quantization parameter may not be entropy-coded/entropy-decoded. In step S2709, a flag IsLastCuCoded indicating whether or not the last CU in the CTU has been encoded/decoded may be checked.

When the IsLastCuCoded is the second value (No in FIG. 27) in step S2709, since the last CU has been encoded/decoded, the entropy-coding/entropy-decoding on the delta quantization parameter ends. When the IsLastCuCoded is the first value (Yes in FIG. 27), the next target CU is encoded/decoded.

In step S2708, when the coding block flag is the second value (No in FIG. 27), whether the IsCuDeltaQPCoded is set to the first value or the second value may be checked.

In step S2710, when the IsCuDeltaQPCoded is set to the second value (No in FIG. 27), the flag IsLastCuCoded indicating whether or not the last CU in the CTU has been encoded/decoded may be checked.

When the IsCuDeltaQPCoded is set to the first value (Yes in FIG. 27) in step S2710, the delta quantization parameter may be entropy-coded/entropy-decoded in step S2711, and then the IsCuDeltaQPCoded may be set to the second value.

In step S2712, a predicted quantization parameter may be determined using neighboring quantization groups.

In step S2713, the delta quantization parameter and the predicted quantization parameter may be added to determine the quantization parameter.

In step S2709, the flag IsLastCuCoded indicating whether the last CU in the CTU has been encoded/decoded may be checked.

Here, the IsCuDeltaQPCoded may be set for each block or each quantization group. At this time, it is possible to check whether the delta quantization parameter is entropy-coded/entropy-decoded for each block or for each quantization group by using a flag such as IsCuDeltaQPCoded or a variable.

In the embodiment described above, the first value may be 0 and the second value may be 1. Conversely, the first value may be 1 and the second value may be 0.

Figure 28:
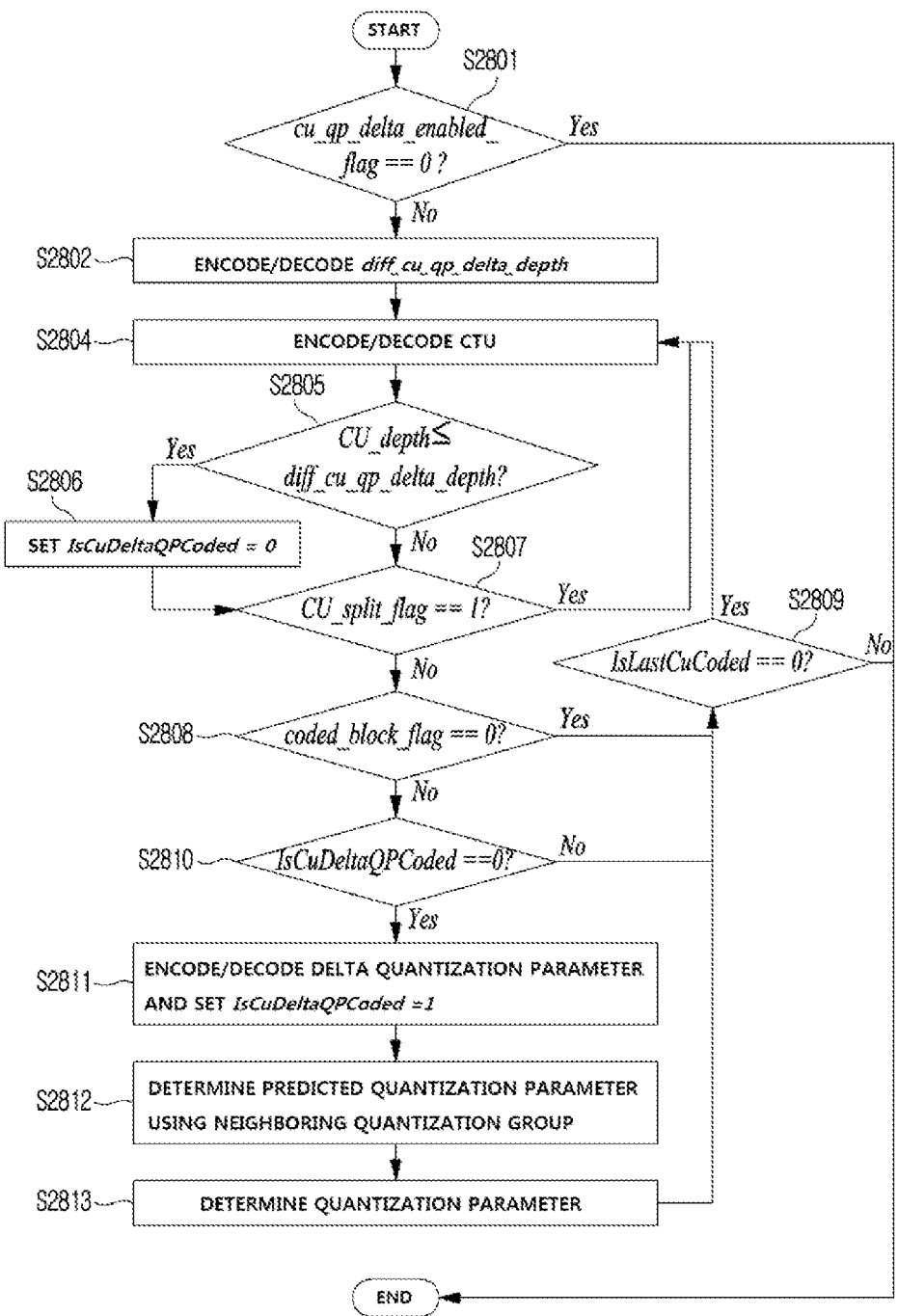
FIG. 28 is a diagram illustrating a method of determining a quantization parameter, using depth information of a quantization group according to one embodiment of the present invention.

FIG. 28 is a diagram illustrating a method of determining a quantization parameter, using depth information of a quantization group according to one embodiment of the present invention.

In step S2801, a flag cu_gp_delta_enabled_flag may be entropy-coded/entropy-decoded. When the cu_qp_delta_enabled_flag is a first value (Yes in FIG. 28), a delta quantization parameter may not be entropy-coded/entropy-decoded. On the other hand, when the cu_qp_delta_enabled_flag is a second value (No in FIG. 28), a delta quantization parameter may be entropy-coded/entropy-decoded.

When the cu_qp_delta_enabled_flag is the second value, diff_cu_qp_delta_depth which is the depth information of a quantization group may be entropy-coded/entropy-decoded in step S2802. Therefore, a basic unit on a basis of which signaling is performed during encoding/decoding may be set on the basis of diff_cu_qp_delta_depth which is the depth information of a quantization group and the depth of a block.

In step S2804, encoding/decoding on a CTU may be performed. In this step, the CTU may be recursively partitioned into coding units (CUs) and then encoded/decoded CU by CU. Here, the CU may mean at least one of a prediction unit (PU), a transform unit (TU), and a block. In this step, IsCuDeltaQPCoded may be set to a second value.

In step S2805, when the depth of the current block is less than or equal to the depth information of the quantization group, the IsCuDeltaQPCoded may be set to the first value in step S2806.

In step S2807, when a CU_split_flag is entropy-coded/entropy-decoded into the second value (Yes in FIG. 28), the CTU may be recursively partitioned into CUs. When the CU_split_flag is entropy-coded/entropy-decoded into the first value (No in FIG. 28) in step S2807, a coding block flag coded_block_flag may be entropy-coded/entropy-decoded.

When the coding block flag is the first value (Yes in FIG. 28) in step S2808, the delta quantization parameter may not be entropy-coded/entropy-decoded. In step S2809, a flag IsLastCuCoded indicating whether or not the last CU in the CTU has been encoded/decoded may be checked.

When the IsLastCuCoded is the second value (No in FIG. 28) in step S2809, since the last CU has been encoded/decoded, the entropy-coding/entropy-decoding on the delta quantization parameter ends. When the IsLastCuCoded is the first value (Yes in FIG. 28), the next target CU is encoded/decoded.

In step S2808, when the coding block flag is the second value (No in FIG. 28), whether the IsCuDeltaQPCoded is set to the first value or the second value may be checked.

In step S2810, when the IsCuDeltaQPCoded is set to the second value (No in FIG. 28), the flag IsLastCuCoded indicating whether or not the last CU in the CTU has been encoded/decoded may be checked.

When the IsCuDeltaQPCoded is set to the first value (Yes in FIG. 28) in step S2810, the delta quantization parameter may be entropy-coded/entropy-decoded in step S2811, and then the IsCuDeltaQPCoded may be set to the second value.

In step S2812, a predicted quantization parameter may be determined using neighboring quantization groups.

In step S2813, the delta quantization parameter and the predicted quantization parameter may be added to determine the quantization parameter.

Next, in step S2809, the flag IsLastCuCoded indicating whether the last CU in the CTU has been encoded/decoded may be checked.

Here, the IsCuDeltaQPCoded may be set for each block or each quantization group. At this time, it is possible to check whether the delta quantization parameter is entropy-coded/entropy-decoded for each block or for each quantization group by using a flag such as IsCuDeltaQPCoded or a variable.

In the embodiment described above, the first value may be 0 and the second value may be 1. Conversely, the first value may be 1 and the second value may be 0.

The depth of the current block may mean at least one of the depth of a quadtree and the depth of a multi-type tree, or the sum of the depths of two or more trees.

Figure 29:
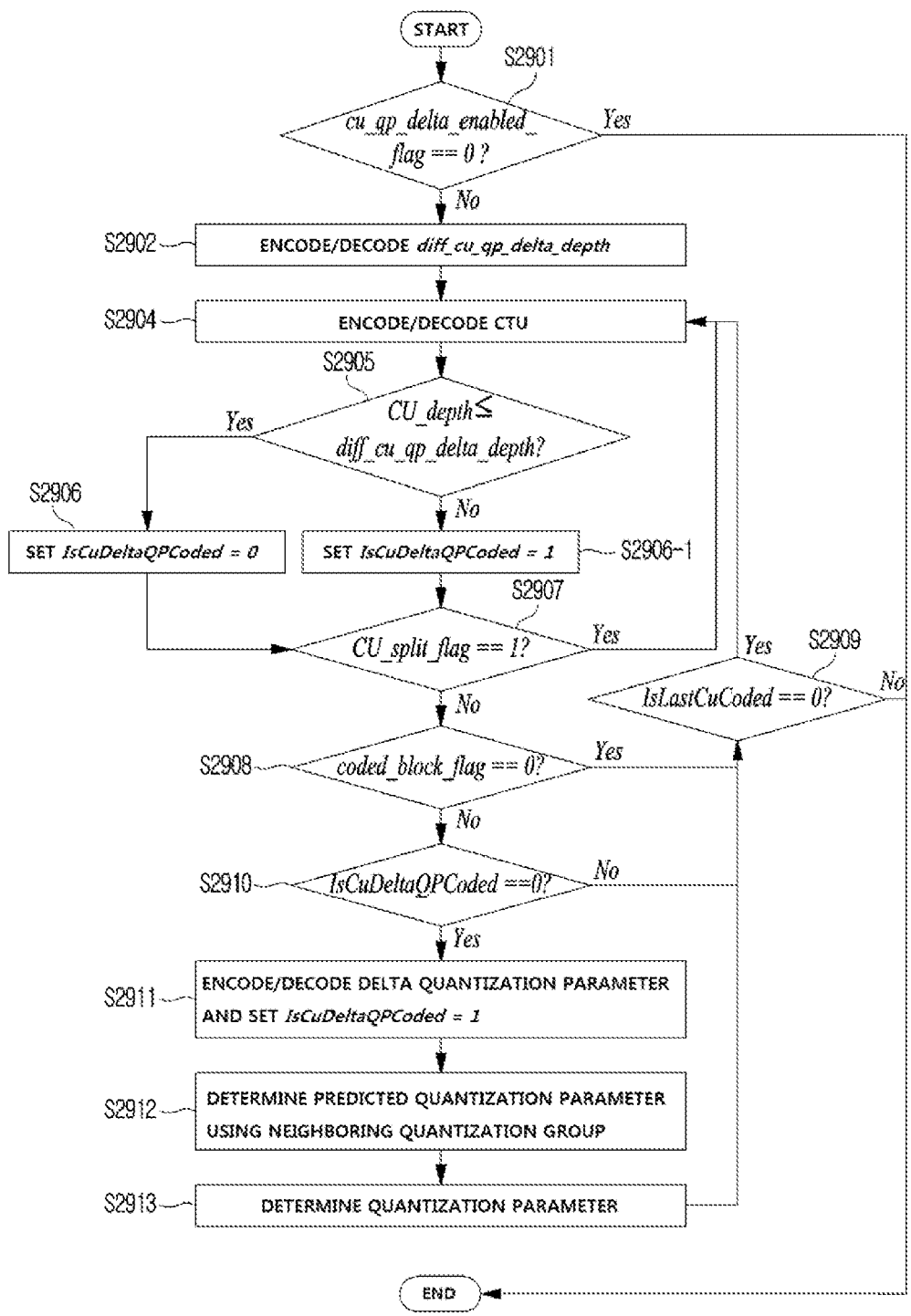
FIG. 29 is a diagram illustrating a method of determining a quantization parameter, using depth information of a quantization group according to another embodiment of the present invention.

FIG. 29 is a diagram illustrating a method of determining a quantization parameter, using depth information of a quantization group according to another embodiment of the present invention.

In step S2901, a flag cu_gp_delta_enabled_flag may be entropy-coded/entropy-decoded. When the cu_qp_delta_enabled_flag is a first value (Yes in FIG. 29), a delta quantization parameter may not be entropy-coded/entropy-decoded. On the other hand, when the cu_qp_delta_enabled_flag is a second value (No in FIG. 29), a delta quantization parameter may be entropy-coded/entropy-decoded.

When the cu_qp_delta_enabled_flag is the second value, diff_cu_qp_delta_depth which is the depth information of a quantization group may be entropy-coded/entropy-decoded in step S2902. Therefore, a basic unit on a basis of which signaling is performed during encoding/decoding may be set according to diff_cu_qp_delta_depth which is the depth information of a quantization group and according to a block depth of a CTU/CU.

In step S2904, encoding/decoding on a CTU may be performed. In this step, the CTU may be recursively partitioned into coding units (CUs) and then encoded/decoded CU by CU. Here, the CU may mean at least one of a prediction unit (PU), a transform unit (TU), and a block. In this step, IsCuDeltaQPCoded may be set to a second value.

In step S2905, when the depth of the current block is less than or equal to the depth information of the quantization group, the IsCuDeltaQPCoded may be set to the first value in step S2906.

In step S2905, when the depth of the current block is greater than the depth of the quantization group, the IsCuDeltaQPCoded may be set to the second value in step S2906-1.

In step S2907, when a CU_split_flag is entropy-coded/entropy-decoded into the second value (Yes in FIG. 29), the CTU may be recursively partitioned into CUs. When the CU_split_flag is entropy-coded/entropy-decoded into the first value (No in FIG. 29) in step S2907, a coding block flag coded_block_flag may be entropy-coded/entropy-decoded.

When the coding block flag is the first value (Yes in FIG. 29) in step S2908, the delta quantization parameter may not be entropy-coded/entropy-decoded. In step S2909, a flag IsLastCuCoded indicating whether or not the last CU in the CTU has been encoded/decoded may be checked.

When the IsLastCuCoded is the second value (No in FIG. 29) in step S2909, since the last CU has been encoded/decoded, the entropy-coding/entropy-decoding on the delta quantization parameter ends. When the IsLastCuCoded is the first value (Yes in FIG. 29), the next target CU is encoded/decoded.

In step S2908, when the coding block flag is the second value (No in FIG. 29), whether the IsCuDeltaQPCoded is set to the first value or the second value may be checked.

In step S2910, when the IsCuDeltaQPCoded is set to the second value (No in FIG. 29), the flag IsLastCuCoded indicating whether or not the last CU in the CTU has been encoded/decoded may be checked.

When the IsCuDeltaQPCoded is set to the first value (Yes in FIG. 29) in step S2910, the delta quantization parameter may be entropy-coded/entropy-decoded in step S2911, and then the IsCuDeltaQPCoded may be set to the second value.

In step S2912, a predicted quantization parameter may be determined using neighboring quantization groups.

In step S2913, the delta quantization parameter and the predicted quantization parameter may be added to determine the quantization parameter.

Next, in step S2909, the flag IsLastCuCoded indicating whether the last CU in the CTU has been encoded/decoded may be checked.

Here, the IsCuDeltaQPCoded may be set for each block or each quantization group. At this time, it is possible to check whether the delta quantization parameter is entropy-coded/entropy-decoded for each block or for each quantization group by using a flag such as IsCuDeltaQPCoded or a variable.

In the embodiment described above, the first value may be 0 and the second value may be 1. Conversely, the first value may be 1 and the second value may be 0.

The depth of the current block may mean at least one of the depth of a quadtree and the depth of a multi-type tree, or the sum of the depths of two or more trees.

Figure 30:
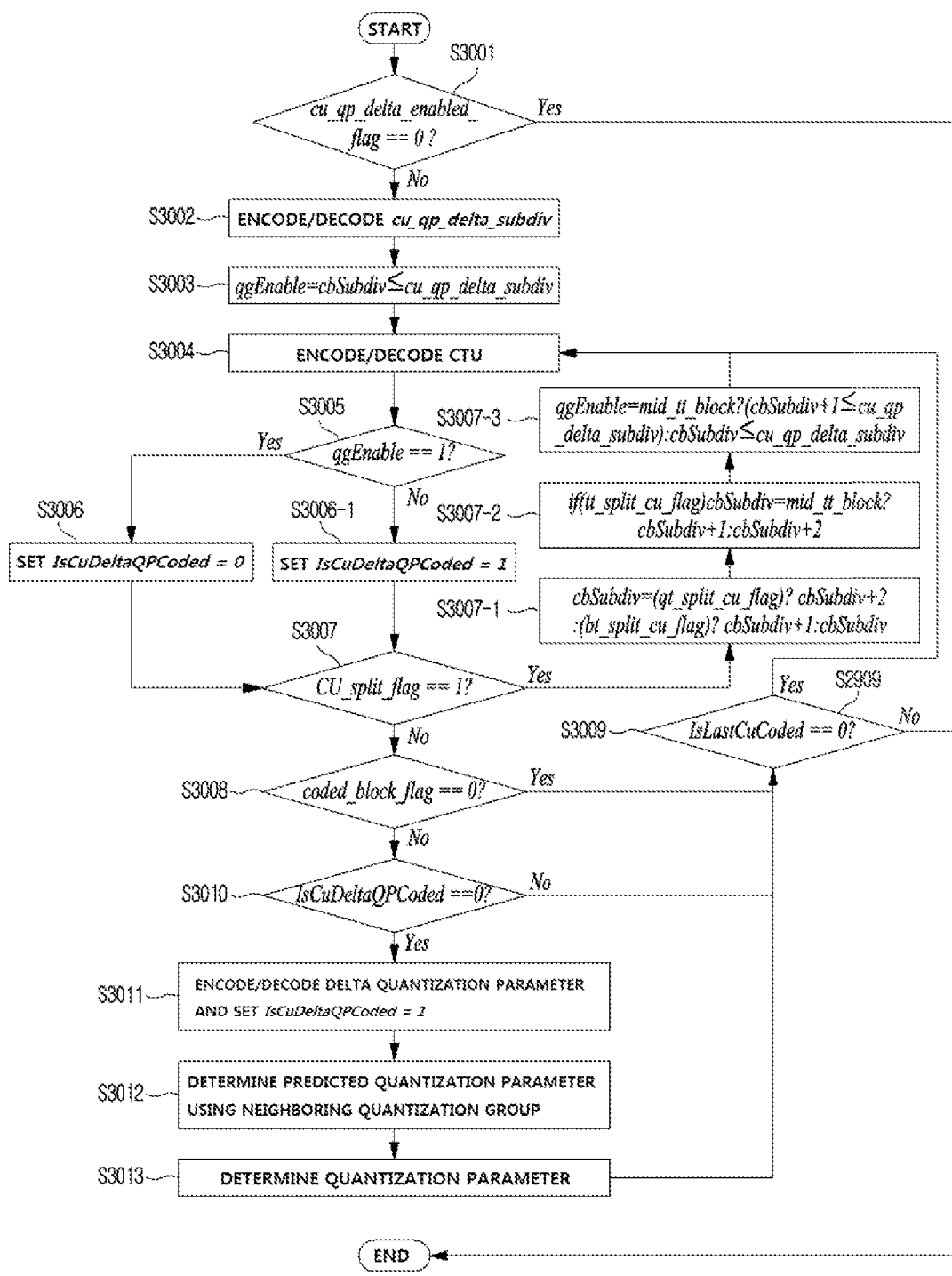
FIG. 30 is a diagram illustrating a method of determining a quantization parameter, using depth information of a quantization group according to a further embodiment of the present invention.

FIG. 30 is a diagram illustrating a method of determining a quantization parameter, using depth information of a quantization group according to a further embodiment of the present invention.

In step S3001, a flag cu_gp_delta_enabled_flag may be entropy-coded/entropy-decoded. When the cu_qp_delta_enabled_flag is a first value (Yes in FIG. 30), a delta quantization parameter may not be entropy-coded/entropy-decoded. On the other hand, when the cu_qp_delta_enabled_flag is a second value (No in FIG. 30), a delta quantization parameter may be entropy-coded/entropy-decoded.

When the cu_qp_delta_enabled_flag is the second value, diff_cu_qp_delta_subdiv which is the subdivision information of a quantization group may be entropy-coded/entropy-decoded in step S3002. Therefore, a basic unit on a basis of which signaling is performed during encoding/decoding may be set according to diff_cu_qp_delta_subdiv which is the subdivision information of a quantization group and/or according to a subdivision value of a CTU/CU/block.

The cu_gp_delta_subdiv which is the subdivision information of the quantization group may be entropy-coded/entropy-decoded in a picture parameter set (PPS). The cu_qp_delta_subdiv which is subdivision information of the quantization group may be encoded/decoded into a variable length.

In step S3003, qgEnable is a variable indicating a condition under which a delta quantization parameter can be transmitted. When a CTU is encoded/decoded, a cbSubdiv value, which is the subdivision value of the current block, may be initialized to zero. When the qgEnable has a first value, the delta quantization parameter may be entropy-coded/entropy-decoded. On the other hand, when the qgEnable has a second value, the delta quantization parameter may not be entropy-coded/entropy-decoded.

In step S3004, encoding/decoding on a CTU may be performed. In this step, the CTU may be recursively partitioned into coding units (CUs) and then encoded/decoded CU by CU. Here, the CU may mean at least one of a prediction unit (PU), a transform unit (TU), and a block. In this step, IsCuDeltaQPCoded may be set to a second value.

When the current qgEnable has the first value in step S3005 (Yes in FIG. 30), the IsCuDeltaQPCoded may be set to the first value in step S3006.

When the current qgEnable has the second value in step S3005, the IsCuDeltaQPCoded may be set to the second value in step S3006-1.

In step S3007, when a CU_split_flag is entropy-coded/entropy-decoded into the second value (Yes in FIG. 30), the CTU may be recursively partitioned into CUs. When the CU_split_flag is entropy-coded/entropy-decoded into the first value (No in FIG. 30) in step S3007, a coding block flag coded_block_flag may be entropy-coded/entropy-decoded.

When quadtree partitioning has been performed, the flag qt_split_cu_flag indicating whether the quadtree partitioning is performed may be set to a first value in step S3007-1. When the partitioning has not been performed, it may be set to a second value. When binary tree partitioning has been performed, the flag bt_split_cu_flag indicating whether the binary tree partitioning is performed may have a first value. When the partitioning has not been performed, it may be set to a second value. When a flag "qt_split_cu_flag" has a first value, the cbSubdiv is increased by two. When the flag "qt_split_cu_flag" has a second value, the cbSubdiv is increased by one. When having the second value, the cbSubdiv may not be increased.

When ternary tree partitioning has been performed, the flag tt_split_cu_flag indicating whether the ternary tree partitioning is performed may be set to a first value in step S3007-2. When the partitioning has not been performed, it may be set to a second value. When the flag "tt_split_cu_flag" has the first value, in a case where the current block is the middle block of a ternary tree, mid_tt_block may be set to a first value. In this case, the cbSubdiv may be increased by one. When the current block is not the middle bock of a ternary tree, the cbSubdiv may be increased by two.

When the mid_tt_block indicating the middle block of a ternary tree has a first value in step S3007-3, in a case where cbSubdiv+1 is less than or equal to cu_qp_delta_subdiv, qgEnable may be set to a first value. In a case where the cbSubdiv+1 is greater than the cu_qp_delta_subdiv, the qgEnable may be set to a second value. When the mid_tt_block has the second value, in a case where the cbSubdiv is less than or equal to the cu_qp_delta_subdiv, the qgEnable may be set to a first value. In a case where the cbSubdiv is greater than the cu_qp_delta_subdiv, the qgEnable may be set to a second value.

When the coding block flag is the first value (Yes in FIG. 30) in step S3008, the delta quantization parameter may not be entropy-coded/entropy-decoded. In step S3009, the flag IsLastCuCoded indicating whether or not the last CU in the CTU has been encoded/decoded may be checked.

When the IsLastCuCoded is the second value (No in FIG. 30) in step S3009, since the last CU has been encoded/decoded, the entropy-coding/entropy-decoding on the delta quantization parameter ends. When the IsLastCuCoded is the first value (Yes in FIG. 30), the next target CU is encoded/decoded.

In step S3008, when the coding block flag is the second value (No in FIG. 30), whether the IsCuDeltaQPCoded is set to the first value or the second value may be checked.

In step S3010, when the IsCuDeltaQPCoded is set to the second value (No in FIG. 30), the flag IsLastCuCoded indicating whether or not the last CU in the CTU has been encoded/decoded may be checked.

When the IsCuDeltaQPCoded is set to the first value (Yes in FIG. 30) in step S3010, the delta quantization parameter may be entropy-coded/entropy-decoded in step S3011, and then the IsCuDeltaQPCoded may be set to the second value.

In step S3012, a predicted quantization parameter may be determined using neighboring quantization groups.

In step S3013, the delta quantization parameter and the predicted quantization parameter may be added to determine the quantization parameter.

Next, in step S3009, the flag IsLastCuCoded indicating whether the last CU in the CTU has been encoded/decoded may be checked.

Here, the IsCuDeltaQPCoded may be set for each block or each quantization group. At this time, it is possible to check whether the delta quantization parameter is entropy-coded/entropy-decoded for each block or for each quantization group by using a flag such as IsCuDeltaQPCoded or a variable.

In the embodiment described above, the first value may be 0 and the second value may be 1. Conversely, the first value may be 1 and the second value may be 0.

FIGS. 31 and 32 are diagrams illustrating examples of syntax element information required for entropy-coding/entropy-decoding of delta quantization parameters according to one embodiment of the present invention.

A coding_quadtree( ) is a unit including at least one of syntax elements used to encode/decode a quadtree block structure. In this case, x0 and y0 may be coordinate values representing the top left position of a CU/block. Here, log2CbSize may be a value obtained by calculating a log2 function of the width or the height of a CU/block. Here, cqtDepth may represent the depth of the current CU/block. Here, treeType may represents the type of the tree of the current block.

Here, cqtDepth may represent the depth of the current CU/block. Here, cbSubdiv can represent a value obtained by multiplying the depth of the current depth by two times. In the case of a quadtree, since each of the width and the height of a block is reduced to the half, the subdivision value may be multiplied by two.

The subdivision information of the quantization group, cu_qp_delta_subdiv, may be compared with cuSubdiv to determine whether to transmit the delta quantization parameter. When the cu_qp_delta_subdiv is greater than or equal to the cbSubdiv, a delta quantization parameter value, CuQpDeltaVal, may be set to zero. When the cu_qp_delta_subdiv is smaller than the cbSubdiv, the CuQpDeltaVal may not be set to zero.

The qtsplit_cu_flag indicates whether the next sub-block is partitioned by a quadtree split. When the qtsplit_cu_flag has a second value, the next sub-block is partitioned by a quadtree split. When it has a first value, the next sub-block is not partitioned by a quadtree split.

When the qt_split_cu_flag has the second value, the coding_quadtree( ) may be 4 because a parent block is divided into four child blocks. In this case, it is possible to determine whether the block extends beyond the border of the picture by comparing the width (pic_width_in_luma_samples) and the height (pic_height_in_luma_samples) of the picture with the x1 and the y1, respectively.

Here, multi_type_tree( ) is a unit including at least one of syntax elements used to encode/decode a ternary tree block. In this case, the width and height of a CU, block, or tree can be obtained by 1<<log2CbSize. Where, << represents a left shift operation.

In the embodiment described above, the first value may be 0 and the second value may be 1. Conversely, the first value may be 1 and the second value may be 0.

Here, multi_type_tree( ) is a unit including at least one of syntax elements used to encode/decode a binary tree block or a ternary tree block. In this case, x0 and y0 may be coordinate values representing the top left position of a CU/block. In addition, cbWidth and cbHeight may represent the width and the height of the current CU/block to be encoded/decoded. Here, cqtDepth may represent the depth of the current CU/block. Here, mttDepth may represent the depth of a binary tree or a ternary tree of the current CU/block. Here, the cbSubdiv may represent the subdivision value of the current CU/block, and the qgEnable may be a flag indicating whether or not to transmit the delta quantization parameter. Here, partIdx may represent the index of the CU/block to be coded/decoded when the CU/Block is a binary tree or a ternary tree. Here, treeType may represent the type of the tree of the current block.

The subdivision information of the quantization group, cu_qp_delta_subdiv, may be compared with the cuSubdiv to determine whether to transmit the delta quantization parameter. When the qgEnable has the second vale. When the qgEnable 2 has the second value and the cu_qp_delta_subdiv is greater than or equal to the cbSubdiv, a delta quantization parameter value, CuQpDeltaVal, may be set to zero. When the qgEnable 1 has the first value and the cu_qp_delta_subdiv is less than the cbSubdiv, the CuQpDeltaVal may not be set to zero. When the qgEnable has the second value, the CuQpDeltaVal may not be set to zero.

The mtt_split_cu_flag may be a flag indicating whether to divide a block by a binary tree split or a ternary tree split. In this case, when the mtt_split_cu_flag indicates SPLIT_BT_VER, it may mean a vertical binary tree split. Similarly, SPLIT_BT_HOR may mean a horizontal binary tree split. In addition, when the mtt_split_cu_flag indicates SPLIT_TT_VER, it may mean a vertical ternary tree split. Similarly, when the mtt_split_cu_flag indicates SPLIT_TT_HOR, it may mean a horizontal ternary tree split.

When the current block is divided by binary tree partitioning, the cbSubdiv is increased by one. In addition, it is possible to determine whether the block extends beyond the border of the picture by comparing the width (pic_width_in_luma_samples) and the height (pic_height_in_luma_samples) of the picture with the x1 and the y1, respectively. In this case, FIG. 32 shows an example of vertical binary tree partitioning.

When ternary tree partitioning is performed, the flag value of the eqgEnable may be set. The subdivision information of the quantization group, cu_qp_delta_subdiv, may be compared with the cuSubdiv+2 to determine whether to transmit the delta quantization parameter. When the qgEnable has the second value and the cu_qp_delta_subdiv is greater than or equal to the cbSubdiv+2, the value of the qgEnable may be set to the second value. When the qgEnable 1 has the first value and the cu_qp_delta_subdiv is less than the cbSubdiv, the value of the qgEnable may be set to the first value. In this case, the set qgEnable value may be stored in the multi_type_tree( ) of a block that is partitioned by ternary tree partitioning. FIG. 32 shows an example of vertical ternary tree partitioning.

In the case of a ternary tree block, the subdivision value (cbSubdiv) of each of the left block and the right block may be increased by one, and the subdivision value (cbSubdiv) of the middle block may be increased by two.

Here, coding_unit( ) represents a unit of syntax elements used to encode/decode at least one piece of information on a CU/block.

In the embodiment described above, the first value may be 0 and the second value may be 1. Conversely, the first value may be 1 and the second value may be 0.

At least one of syntax elements, information, flags, and indexes entropy-coded in the encoder and entropy-decoded in the decoder may be encoded or decoded through at least one of binarization, debinarization, and entropy-coding/entropy-decoding. Here, for the binarization/debinarization and the entropy-coding/entropy-decoding, at least one of the following techniques may be used which include a signed 0-th order Exp_Golomb binarization/debinarization method (se(v)), a signed k-th order Exp_Golomb binarization/debinarization method (sek(v)), a 0-th order Exp_Golomb for positive integers with no sign (ue(v)), a k-th order Exp_Golomb binarization/debinarization method for positive integers with no sign (uek(v)), a fixed-length binarization/debinarization method (f(n)), a truncated Rice binarization/debinarization method or a truncated unary binarization/debinarization method (tu(v)), a truncated binary binarization/debinarization method (tb(v)), a context-adaptive arithmetic coding/decoding method (ae(v)), a byte-based bits string (b(8)), a binarization/debinarization method for integers with sign (i(n)), a binarization/debinarization method for positive integers with no sign (u(n)), and unary binarization/debinarization method.

According to the present invention, it is possible to provide an image encoding/decoding method and apparatus using quantization parameters.

According to the present invention, it is possible to provide an image encoding/decoding method and apparatus adaptively determining a suitable size of a block for which a delta quantization parameter is to be signaled, according to a block structure and according to size information of a quantization group encoded/decoded on a high-level, to improve signaling and coding efficiency of quantization parameters.

According to the present invention, it is possible to provide an image encoding/decoding method and apparatus that determine a quantization parameter for a current block using a quantization parameter of a neighboring quantization group, to reduce the number of bits required for encoding/decoding of a delta quantization parameter.

According to the present invention, it is possible to provide an image encoding/decoding method and apparatus capable of efficiently signaling delta quantization parameters for various blocks having different tree structures such as a binary tree and a ternary tree.

According to the present invention, it is possible to provide an image encoding/decoding method and apparatus capable of efficiently performing rate control on various blocks having different tree structures such as a binary tree and a ternary tree.

According to the present invention, it is possible to provide a recording medium storing a bitstream generated by the encoding/decoding method or apparatus according to the present invention.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. An image decoding method comprising:

decoding subdivision information of quantization group from a bitstream, the subdivision information indicating a maximum subdivision value of the quantization group;

in response to a subdivision value of a current block being equal to or smaller than the maximum subdivision value of the quantization group, setting quantization parameter coding information to a first value, the quantization parameter coding information indicating whether a quantization parameter is coded; and in response to the quantization parameter coding information being set to the first value, determining a delta quantization parameter of the current block, deriving a quantization parameter of the current block based on the delta quantization parameter, and setting the quantization parameter coding information to a second value, wherein the subdivision value is related to a ratio of areas between the current block and a coding tree block, and wherein the delta quantization parameter is determined based on absolute value information of the delta quantization parameter and sign information of the delta quantization parameter.

2. An image encoding method comprising:

determining a maximum subdivision value of quantization group;

determining a quantization parameter of a current block;

in response to a subdivision value of the current block being equal to or smaller than the maximum subdivision value of the quantization group, setting quantization parameter coding information to a first value, the quantization parameter coding information indicating whether a quantization parameter is coded;

in response to the quantization parameter coding information indicating the first value, encoding a delta quantization parameter of the current block and setting the quantization parameter coding information to a second value; and encoding subdivision information of the quantization group indicating the maximum subdivision value of the quantization group, wherein the subdivision value is related to a ratio of areas between the current block and a coding tree block, and wherein the delta quantization parameter is encoded by encoding absolute value information of the delta quantization parameter and sign information of the delta quantization parameter.

3. A computer-readable non-transitory recording medium storing a bitstream that is decoded by an image decoding method, wherein the bitstream contains subdivision information of quantization group indicating a maximum subdivision value of the quantization group and a delta quantization parameter of a current block, and wherein the image decoding method comprises:

in response to a subdivision value of the current block being equal to or smaller than the maximum subdivision value of the quantization group, setting quantization parameter coding information to a first value, the quantization parameter coding information indicating whether a quantization parameter is coded;

in response to the quantization parameter coding information indicating the first value, determining the delta quantization parameter of the current block, deriving a quantization parameter of the current block based on the delta quantization parameter, and setting the quantization parameter coding information to a second value, wherein the subdivision value is related to a ratio of areas between the current block and a coding tree block, and wherein the delta quantization parameter is determined based on absolute value information of the delta quantization parameter and sign information of the delta quantization parameter.

* * * * *